(12) United States Patent
Takahashi

(10) Patent No.: US 7,108,239 B2
(45) Date of Patent: Sep. 19, 2006

(54) CONTAINER HOLDER

(75) Inventor: Hideaki Takahashi, Yokohama (JP)

(73) Assignee: NIFCO Inc., Yokohama (JP)

( * ) Notice: Subject to any disclaimer, the term of this patent is extended or adjusted under 35 U.S.C. 154(b) by 361 days.

(21) Appl. No.: 10/690,647

(22) Filed: Oct. 23, 2003

(65) Prior Publication Data

US 2004/0079850 A1    Apr. 29, 2004

Related U.S. Application Data

(62) Division of application No. 10/301,699, filed on Nov. 22, 2002.

(30) Foreign Application Priority Data

Nov. 22, 2001   (JP) .......................... 2001-358043
Nov. 22, 2001   (JP) .......................... 2001-358044
Dec. 19, 2001   (JP) .......................... 2001-386636

(51) Int. Cl.
    *A47K 1/08*          (2006.01)

(52) U.S. Cl. ................ 248/311.2; 248/313; 297/188.7; 224/926

(58) Field of Classification Search ............ 248/313, 248/309.1, 310, 311.2, 550, 286.1, 298.1; 224/552, 553, 926, 281, 282; 297/188.15, 297/188.16, 188.17, 188.19
    See application file for complete search history.

(56) References Cited

U.S. PATENT DOCUMENTS

| | | | | |
|---|---|---|---|---|
| 4,981,277 A | * | 1/1991 | Elwell ..................... | 248/311.2 |
| 5,171,061 A | * | 12/1992 | Marcusen ............. | 297/188.17 |
| 5,228,611 A | * | 7/1993 | Yabuya ..................... | 224/281 |
| 5,375,805 A | * | 12/1994 | Sudak et al. ............ | 248/311.2 |
| 5,601,269 A | * | 2/1997 | Jankovic ................. | 248/311.2 |
| 5,671,877 A | * | 9/1997 | Yabuya ..................... | 224/282 |
| 5,673,891 A | * | 10/1997 | Fujihara et al. ......... | 248/311.2 |
| 5,791,616 A | * | 8/1998 | Volkmann et al. ....... | 248/311.2 |
| 5,876,007 A | * | 3/1999 | Lancaster et al. ....... | 248/311.2 |
| 5,887,775 A | * | 3/1999 | Sik ........................... | 224/552 |
| 6,024,395 A | * | 2/2000 | Kang ........................ | 296/37.8 |
| 6,092,775 A | * | 7/2000 | Gallant .................... | 248/311.2 |
| 6,230,948 B1 | * | 5/2001 | Steiger et al. ............. | 224/539 |
| 6,320,962 B1 | | 11/2001 | Eisenbraun | |
| 6,547,117 B1 | * | 4/2003 | Glovatsky et al. ......... | 224/539 |
| 6,817,584 B1 | * | 11/2004 | Ogura .................... | 248/311.2 |

FOREIGN PATENT DOCUMENTS

| | | |
|---|---|---|
| DE | 199 59 599 | 6/2000 |
| DE | 199 63 202 | 6/2001 |
| EP | 0633 162 | 1/1995 |
| FR | 2 758 299 | 7/1998 |
| JP | 08-230545 | 9/1996 |
| JP | 2000-313270 | 11/2000 |
| WO | WO 01/30608 | 5/2001 |

* cited by examiner

*Primary Examiner*—Kimberly Wood
(74) *Attorney, Agent, or Firm*—Manabu Kanesaka

(57) ABSTRACT

A container holder includes a member disposed in a closed position to be able to draw into an open position, a driving device attached to the member to move the member between the closed position and the open position, and a sensing device for sensing whether or not the member is drawn out for a predetermined amount from the closed position. A control device controls the driving device to cause the member to be housed when the sensing device senses that the member is not drawn out for a predetermined amount. Also, a container placed on a tray can be sensed assuredly regardless of vibration during a movement of a vehicle.

20 Claims, 37 Drawing Sheets

CONTAINER HOLDER

CROSS REFERENCE TO RELATED APPLICATION

This is a divisional application of a patent application Ser. No. 10/301,699 filed on Nov. 22, 2002.

BACKGROUND OF THE INVENTION AND RELATED ART STATEMENT

The present invention relates to a container holder or an ashtray provided so as to be capable of appearing and disappearing in and out of a compartment, i.e. vehicle compartment.

As drawer devices provided so as to be capable of appearing and disappearing in and out of a vehicle compartment, generally there are container holders, ash trays, and the like. There is a type that is drawn out or housed by sliding, but also, there is a type that automatically appears and disappears in and out of the vehicle compartment by pressing a switch.

For example, in the case of a container holder that automatically appears and disappears in and out of a container by pressing a switch, when the switch is pressed, a drive motor which drives the container holder to move is driven a driving force is transmitted to the container holder via a power transmission device connected to the motor, and the container holder moves.

In such a container holder, when torque above a specified value is applied to the power transmission device during a period until the container holder moves to a specified position, such as when there is an obstacle on a movement track of the container holder, torque above necessary amount is prevented from being applied to the drive motor by that the driving force is not transmitted inside the power transmission device.

In other words, when the container holder stops during a period before moving to the specified position, if the switch is not pressed, the container holder comes to be left inside the vehicle compartment in a state of a mid-course movement. In this state, when the container is placed on the container holder, there is a possibility that the desired effect of the container holder can not be fully obtained, and safety is a concern.

The container holder 400 shown in FIG. 32 has semicircular holders 404 which hold containers placed on trays 402, and semicircular support arms 406 which are placed opposite to the holders 404 and hold containers together with the holders 404.

The support arm 406 is connected to a slider 410 via a linkage member 408, and this slider 410 is coupled by a screw to a drive shaft 414 of a motor 412 such that it is capable of movement following the axial direction of the drive shaft 414 by driving of the motor 412. By this, the support arm 406 rotates around a pin 415 via the linkage member 408 such that it opens and closes with respect to the holder 404.

By such a construction, when a container is placed on a tray 402, the bottom of the container comes to contact with a switch 416 which is exposed by a through-hole 402A formed on the tray 402 and the switch turns on, the motor 412 is driven to rotate forward, and the slider 410 moves following the axial direction of the drive shaft 414 such that the support arm 406 comes to close via the linkage member 408. Therefore, the container placed on the tray 402 is gripped between the support arm 406 and the holder 404 and is held in a stable state.

Also, when the container that was placed on the tray 402 is removed, the bottom of the container is separated from the switch 416, the switch is turned off, and the motor 412 is driven to rotate in reverse. By this, the slider moves following the axial direction of the drive shaft 414, and the support arm 406 is opened via the linkage member 408. Therefore, the support arm 406 does not become a an obstacle when the container is placed on the tray 402.

However, because left and right support arms 406 are simultaneously opened and closed by causing one slider 410 to move by the motor 412, for example, when the container is placed on the right tray 402 and the right support arm 406 is closed, the left support arm 406 is also closed. Also, when the container is placed on the left tray 402, the support arm 406 becomes a hindrance and it may not be possible to place the container on the tray 402.

Also, in the state in which the containers are placed on the left and right trays 402, even when the container is removed from the right tray 402, the support arm is not opened because there is a container placed in the left tray 402. Therefore, it is difficult to place the removed container back into the right tray 402.

Furthermore, in case of a container in which a constricted part is formed on the outer perimeter, for example a cola bottle (not illustrated), when upwardly removing the container which was placed on the tray 402, there is a possibility that the container can not be removed if the outer perimeter of the container is caught on the support arm 406 before the switch 416 turns off.

Also, when the bottom of the container has a concave, the bottom of the container may not come to contact with the switch 416 which is provided on the tray 402, and there is a concern that the support arm 406 will not close even though the container is placed on the tray 402.

Furthermore, when a container that was placed on a tray 402 moves up and down due to vibration during running of the vehicle, the state in which the container is in contact with the switch 416 can not be maintained and the switch 416 repeatedly turns on and off, and a state in which the motor 412 is repeatedly driven to rotate forward and backward each time is a concern.

In consideration of the above facts, the present invention provides a drawer device in which a state of a mid-course movement can be avoided automatically when torque above a specified value is applied to the power transmission device during a period until moving to a specified position.

Furthermore, the present invention provides a container holder that can securely hold a container placed on a tray, and insertion and removal of the container are made smoothly regardless of the shape of the container.

Furthermore, the present invention provide a container holder that can assuredly sense a container that is placed on a tray regardless of vibration during running of the vehicle.

SUMMARY OF THE INVENTION

In the first aspect of the invention, a drawer member is provided so as to be capable of appearing and disappearing in and out of a vehicle compartment, and it appears and disappears in and out of the vehicle compartment by driving means. Whether or not this drawer member is drawn out a specified amount is sensed by sensing means, and when it is sensed by this sensing means that the drawer member is not drawn out a specified amount, control means controls the driving means to cause the drawer member to be housed.

For example, a switch, or the like, is disposed in a specified position as the sensing means such that the switch is turned on when the drawer member is drawn out a specified amount, and the drawer member is caused to be housed by the control means when the switch is not turned on. By this, the drawer device is not left inside the vehicle compartment in a mid-course of the movement. Therefore, it is safe because there is no situation in which the drawer is used in this state regardless of the mid-course of movement.

In the second aspect of the invention, the control means drives the driving means to cause the drawer member to be housed when torque above a specified value is applied to the driving means during the period until the drawer member moves to a specified position.

By this, for example, when the torque above the specified value is applied to the driving means during the period until the drawer member moves to the specified position, such as when there is an obstacle on the movement track of the drawer member, by the fact that the drawer member is housed by the control means, the drawer member is not left inside the vehicle compartment in the mid-course of movement, and also torque above necessity is not applied to the driving means.

In the third aspect of the invention, it is sensed as to whether or not the drawer member is drawn out the specified amount. Thus, it is judged whether or not the operation of the drawer member is normal at the specified position by sensing whether or not the drawer member was drawn out within a predefined time.

In the fourth aspect of the invention, a change of the torque applied to the driving means is sensed by the sensing means by a change of electrical current. Thus, it is judged as to whether or not torque above the specified value is applied to the driving means by sensing the change of electrical current.

In the fifth aspect of the invention, container receiving parts are formed on a main arm on the left and right in the width direction of a vehicle. Also, the main arm is made to be able to appear and disappear in and out of the vehicle compartment by first driving means, and a tray that is provided independently corresponding to each of the receiving parts on the left and right in the width direction of the vehicle moves in linkage.

Meanwhile, an adjusting member that is provided independently corresponding to each of the receiving parts on the left and right in the width direction of the vehicle holds the container placed on the tray together with the receiving part. Also, the adjusting member is made to be able to move toward the container placed on the tray by second driving means.

Thus, by providing the tray and the adjusting member independently corresponding to each of the receiving parts on the left and right in the width direction of the vehicle, for example, when the container is placed on the right tray, the right adjusting member moves toward the container and holds the container together with the receiving part. On the other hand, because the left adjusting member does not move, a container can be smoothly placed on the left tray.

Also, when the container is removed from the right tray in a state in which the containers are placed on the left and right trays, the left adjusting member does not move because the left tray has the container placed, but because the right adjusting member moves toward the direction away from the container, it is easy to place the removed container when placing it back on the right tray.

Furthermore, by moving the adjusting member and holding the container together with the receiving part, it differs from the case in which the container is held simply by the force of a spring, or the like, in that the container can be securely held by a holding force that is roughly equal regardless of the size of the container.

Also, even if the sizes of the containers which are placed respectively on each tray are different, the containers can be securely held by the receiving parts and adjusting members for each tray fitting the sizes of the containers.

In the sixth aspect of the invention, a sub arm is supported so as to be capable of swaying on the main arm, and this sub arm sways together with the movement of the adjusting member. By this, the sub arm is opened in the state in which the container is not placed on the tray, and when the container is placed on the tray, the sub arm sways to be closed accompanying the movement of the adjusting member.

Accordingly, for example, when the container is removed from the right tray in a state in which the containers are placed on the left and right trays, the left adjusting member does not move because the left tray has the container placed, and the sub arm is in a closed state, but the right adjusting member moves toward the direction away from the container and the sub arm is moved to be opened. Therefore, when placing the removed container back on the right tray, it is easy to place because the sub arm is open.

In the seventh aspect of the invention, when the container is placed on the tray, the tray switch is operated by the movement of the tray. The second driving means is driven by the control means to close the sub arm when this tray switch is turned on, and to open the sub arm when it is turned off.

Thus, by operating the tray switch by the movement of the tray, because it is judged as to whether or not the container was placed on the tray by the weight of the container, and the placement or non-placement of the container can be sensed assuredly.

In the eighth aspect of the invention, forcing means that forces the sub arm toward the closing direction is provided such that the sub arm is capable of swaying toward the direction opposite to the force of the forcing means when the sub arm is in the closed state.

Therefore, even when the container placed on the tray has a shape in which a constricted part is formed on the outer perimeter, for example a cola bottle, the container can be easily removed by causing the sub arm to sway toward the direction opposite to the force to be opened.

In the ninth aspect of the invention, when the adjusting member is closed and meets with the container, the control means returns the adjusting member for a specified amount. By this, a slight gap is provided with the container held by the receiving part and the adjusting member, and the container is made easier to remove.

In the tenth aspect of the invention, it is made such that the main arm is caused to be housed by the control means when torque above a specified value is applied to the first driving means during the period until the main arm moves toward a specified position inside the vehicle compartment. By this, it is safe because the main arm is not left in a stopped state in a mid-course of movement toward the specified position inside the vehicle compartment.

In the eleventh aspect of the invention, it is made such that the main arm is caused to stop by the control means when torque above the specified value is applied to the first driving means during the period until the main arm moves toward a specified position inside the vehicle compartment.

By this, it is safe because the main arm is not forcefully pushed out toward the inside of the vehicle compartment regardless of torque above the specified value being applied to the first driving means, and torque above necessity is not applied to the first driving means.

In the twelfth aspect of the invention, the main arm is made immovable when the tray switch is in the turned-on state. By this, for example, even if the main switch which drives the first driving means is accidentally pressed regardless of the fact that the container is held on the tray, the placed container does not move to the side because the main arm does not rotate.

In the thirteenth aspect of the invention, the first driving means has a first planetary gear fixed to the main arm. This first planetary gear is made such that a rotational force is applied by a first motor, and when the rotational force is applied by the first motor, the first planetary gear revolves around a first fixed gear, and the main arm rotates.

The second driving means has a second planetary gear fixed to the adjusting member. This second planetary gear is made such that a rotational force is applied by a second motor, and when the rotational force is applied by the second motor, the second planetary gear revolves around a second gear fixed to the main arm and is capable of rotation integrally with the main arm.

By this, when the first motor is driven, the first planetary gear revolves around the first fixed gear and the main arm rotates, and in addition, the second gear rotates via the main arm, the second planetary gear which engages this second gear is caused to revolve, and the adjusting member is caused to rotate. Also, when the second motor is driven in the state in which driving of the first motor is stopped, the planetary gear revolves around the second gear stopped via the main arm which has stopped rotation, and the adjusting member rotates.

In the fourteenth aspect of the invention, container receiving parts are provided on the main arm, and holding members that hold the containers together with these receiving parts are made to be movable toward the containers by the first driving means.

Here, the container receiving parts are provided with sensing means that contactlessly senses the container placed between the receiving part and the holding member, and when it is sensed by this sensing means that the container is placed between the receiving part and the holding member, the first driving means is driven by the control means to move the holding member toward the container, and the container is held by the receiving part and the holding member.

Thus, by providing the contactless sensing means to sense whether or not the container is placed between the receiving part and the holding member, even if the container moves up and down due to vibration during running of the vehicle, the sensing means is not influenced by this. That is, the container placed between the receiving part and the holding member can be assuredly sensed regardless of the vibration during running of the vehicle.

In the fifteenth aspect of the invention, a photoelectric sensor that projects light toward the side or the bottom of a container is used as the sensing means. By causing light projected from the light projecting body to be transmitted or reflected, it can be sensed as to whether the container is placed between the receiving part and the holding member by the change of luminous energy received by the light receiving body.

In the sixteenth aspect of the invention, an ultrasonic sensor that emits ultrasonic waves toward the side or the bottom of the container is used as the sending means. By causing ultrasonic waves which are emitted from the wave transmitting body to be reflected and causing them to be received by the wave receiving body, it can be sensed as to whether or not the container is placed between the receiving part and the holding member by the time required from when the ultrasonic waves are emitted by the wave transmitter to when the ultrasonic waves are received by the wave receiver.

In the seventeenth aspect of the invention, the main arm is caused to appear and disappear in and out of the vehicle compartment by the second driving means. Therefore, it is convenient because the main arm does not have to appear and disappear in and out of the vehicle compartment by a manual operation.

In the eighteenth aspect of the invention, it is made such that the main arm is caused to be housed by the control means when torque above a specified value is applied to the second driving means during the time until the main arm moves to a specified position inside the vehicle compartment. By this, it is safe because the main arm is not left in a stopped state in a mid-course of movement toward the specified position inside the vehicle compartment.

In the nineteenth aspect of the invention, the sub arm is supported so as to be capable of swaying on the main arm, and this sub arm sways together with the movement of the holding member. By this, when the sub arm is opened in a state in which the container is not placed between the receiving part and the holding member, the container is placed, and the sub arm sways so as to be closed accompanying the movement of the holding member.

In the twentieth aspect of the invention, forcing means that forces the sub arm toward the closing direction is provided such that the sub arm is capable of swaying toward the direction opposing the force of the forcing means when the sub arm is in the closed state.

Therefore, even when the container that is placed between the receiving part and the holding member has a shape in which a constricted part is formed on the outer perimeter, for example a cola bottle, the container can be easily removed by causing the sub arm to sway toward the direction opposing the force and to be opened.

DETAILED DESCRIPTION OF PREFERRED EMBODIMENTS

Figure 1:
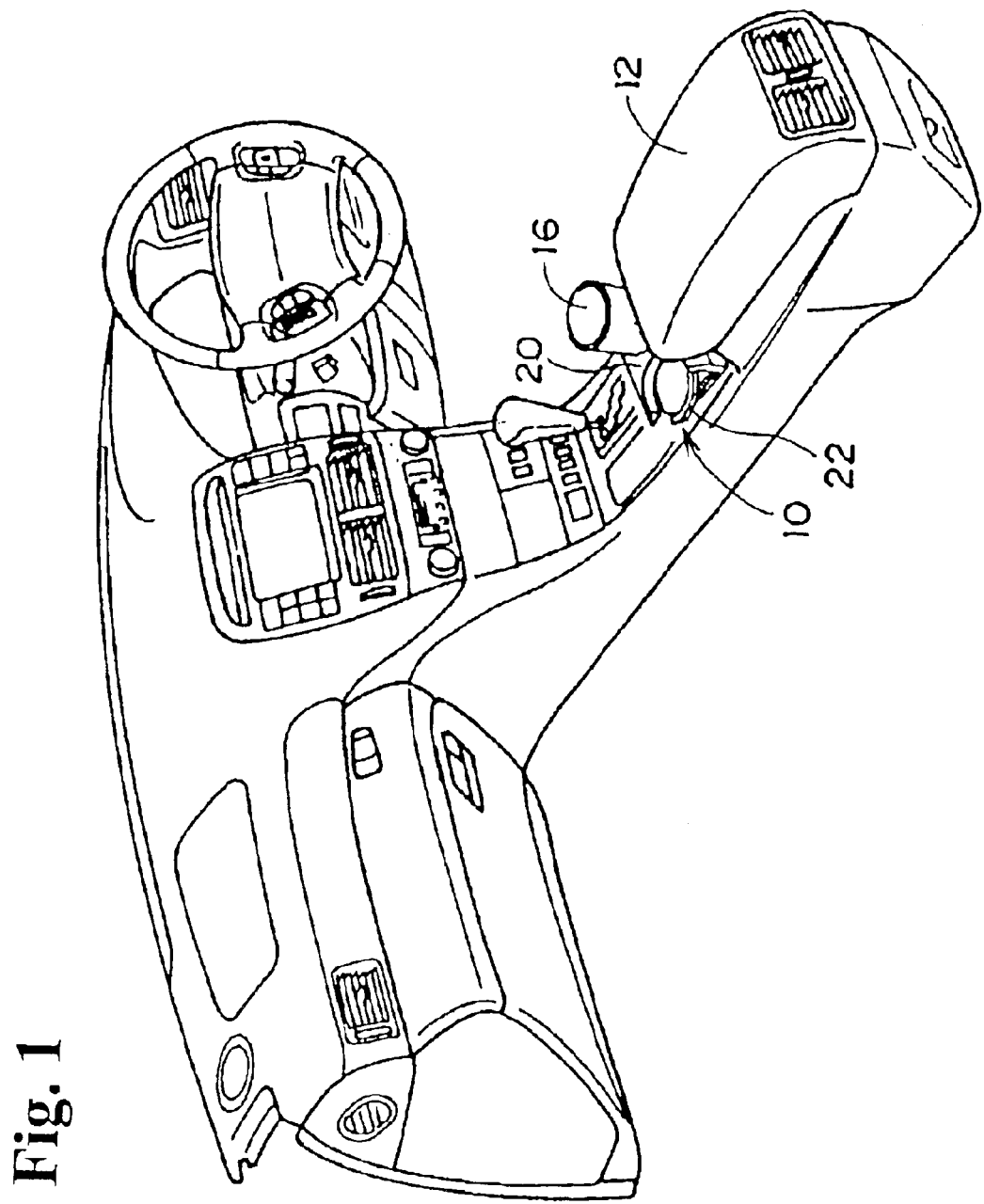
FIG. 1 is an explanatory drawing showing a placement inside a vehicle compartment of a container holder pertaining to an embodiment of the present invention.
Figure 2:
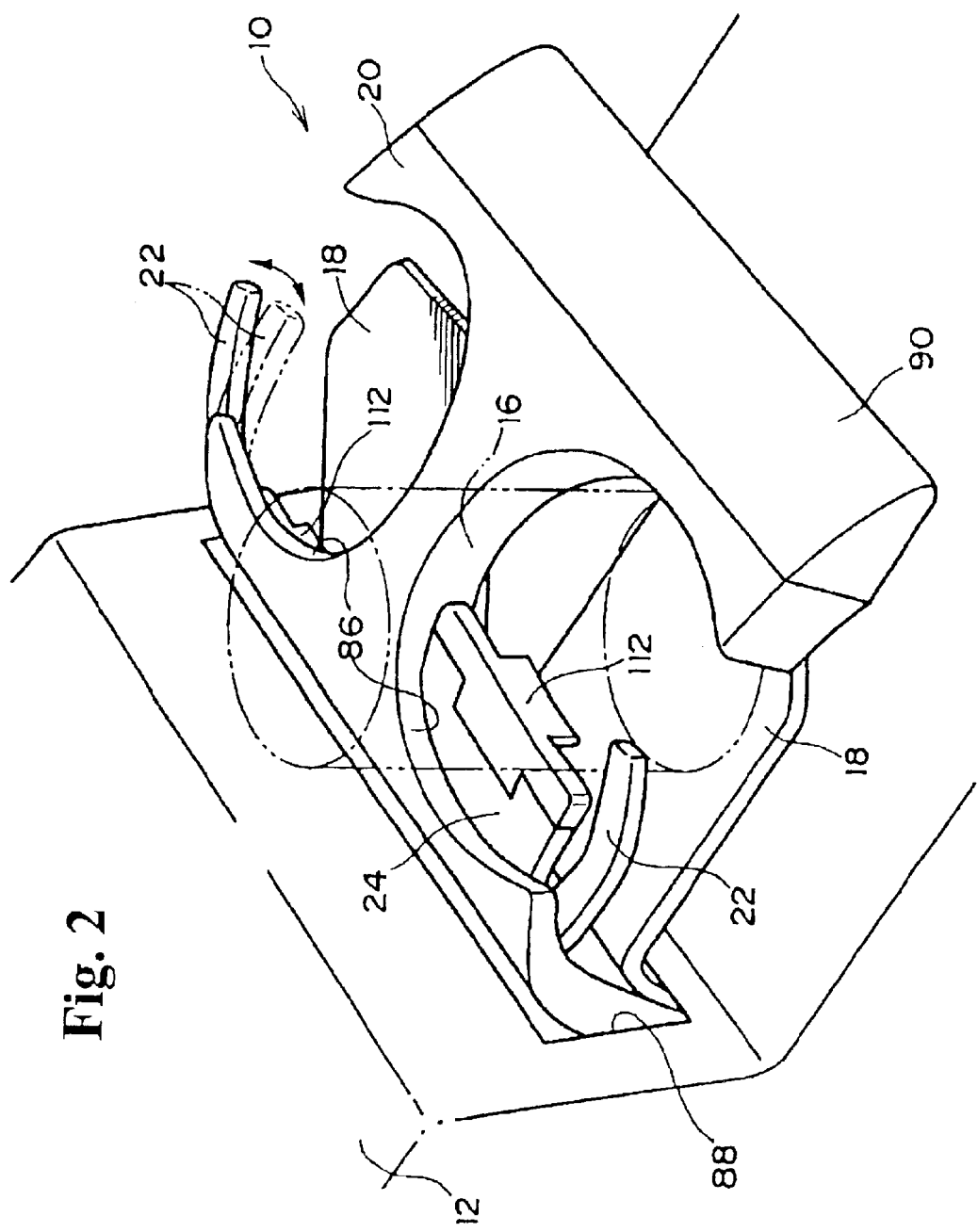
FIG. 2 is a perspective view showing the state in which the container holder pertaining to the present invention has appeared inside the vehicle compartment.

FIG. 1 and FIG. 2 show a container holder 10 pertaining to the present invention. This container holder is disposed so as to be capable of being housed inside a housing part 14 (see FIG. 9) of a console box 12 which is placed between a driver seat and a front passenger seat of a vehicle.

The container holder 10 is largely divided into a tray 18 on which a container 16 is placed, a main arm 20 which holds a container 16 placed on the tray 18, a sub arm 22 which is supported so as to be capable of swaying on the main arm 20, and an adjusting arm 24 which causes the sub arm 22 to sway and also holds a container 16 together with the main arm 20.

Figure 7:
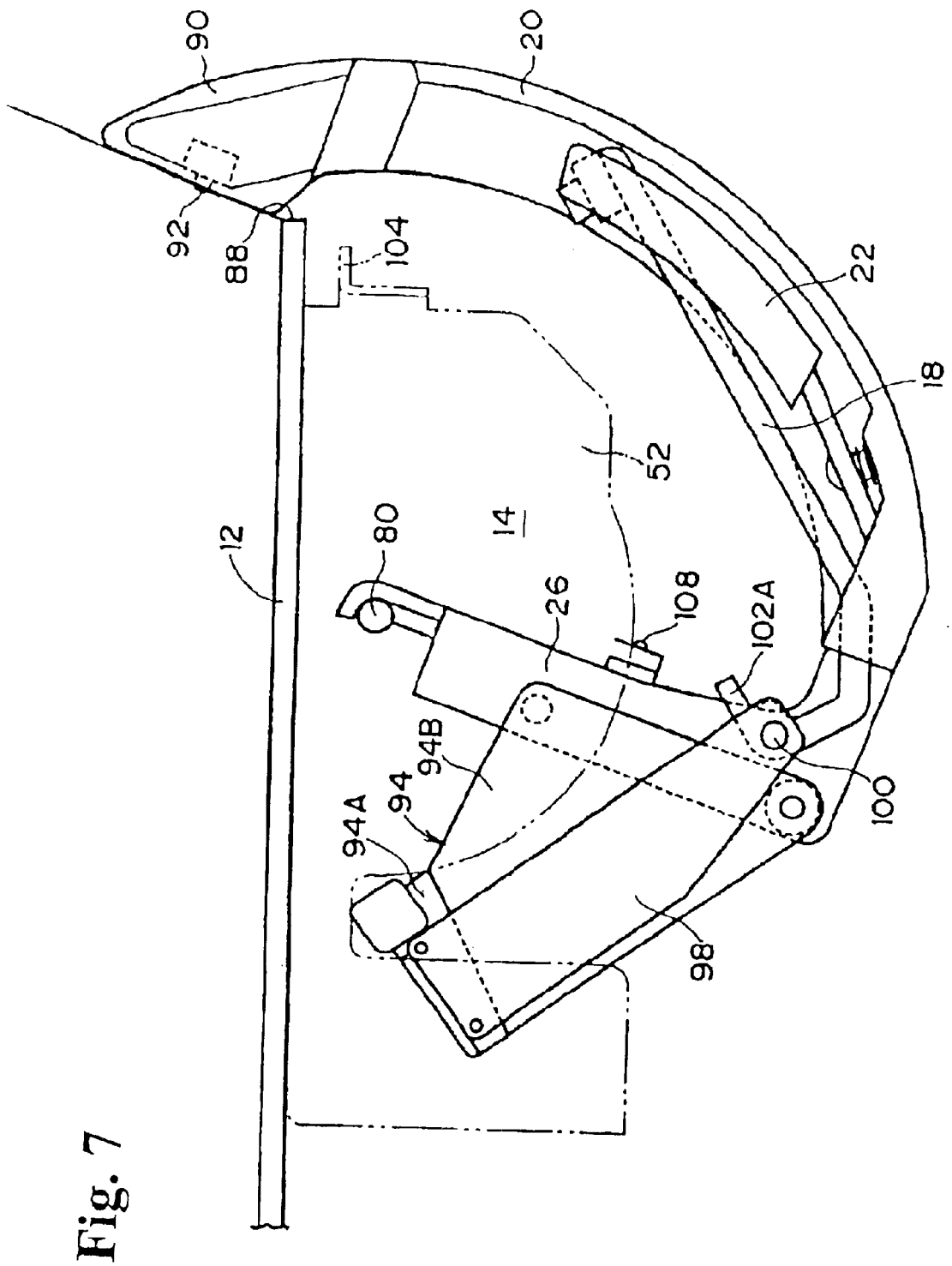
FIG. 7 is an explanatory drawing showing a main base plate and a main arm, sub arms, trays, assisting plates, and sub assisting plates which rotate via the main base plate, which are constituents of the container holder pertaining to the present invention.

As shown in FIG. 2 and FIG. 7, the main arm 20 is roughly arc-shaped in section, and it appears and disappears, i.e. move in and out of the vehicle compartment while drawing an arc. On the rear end part of this main arm 20, a main base plate 26 which is roughly L-shaped in section is connected.

Figure 3:
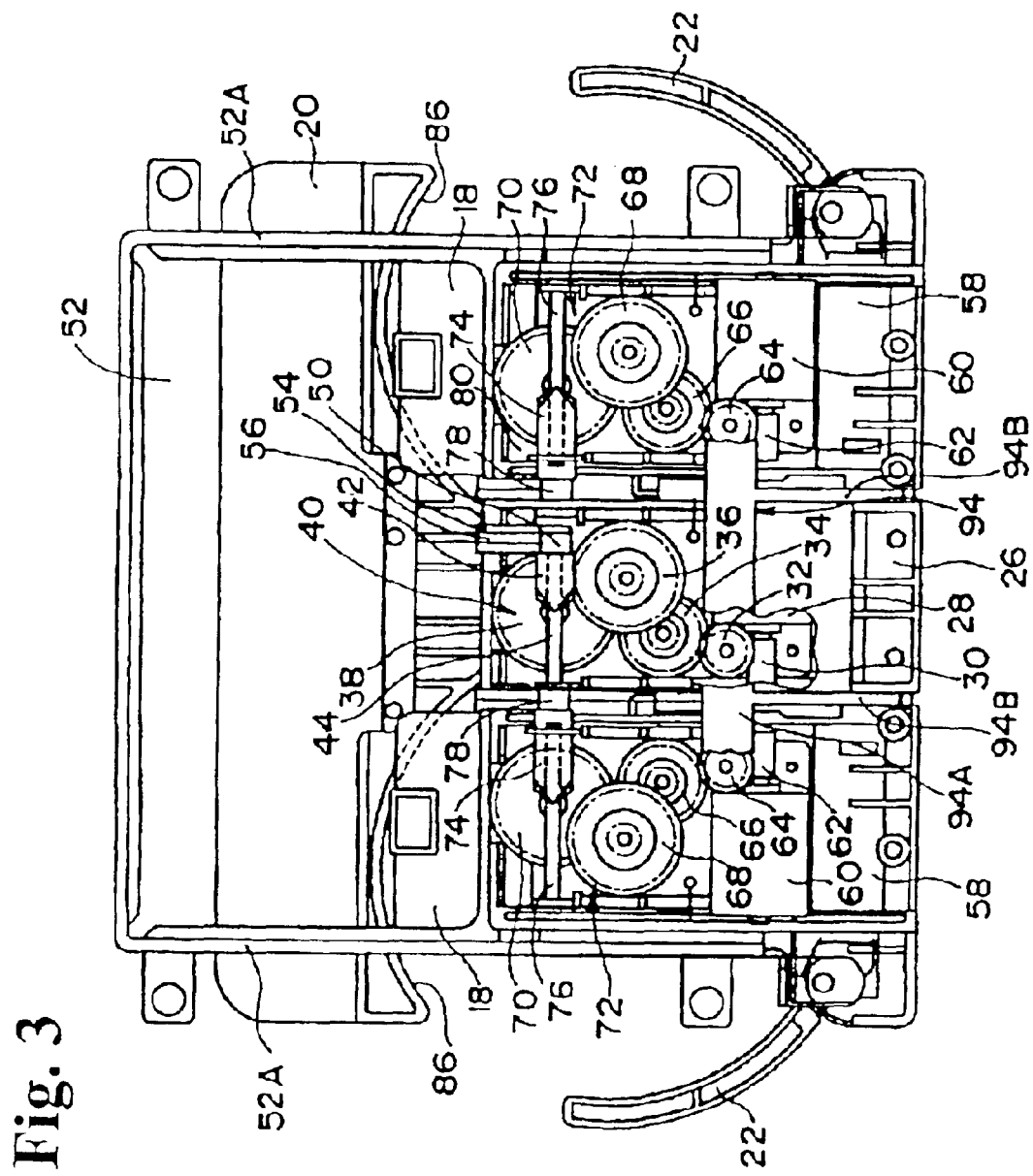
FIG. 3 is an underside view showing a drive system of the container holder pertaining to the present invention.

On this main base plate 26, as shown in FIG. 3, a main motor 28 is disposed and is directly coupled with a worm 30 provided on the main base plate 26 such that the rotational force from the main motor 28 is transmitted to the worm 30.

The rotational force transmitted to the worm 30 is changed in the direction of the rotational axis via a worm gear not illustrated, and is transmitted to gears 32 and 34 placed on the same axis, (illustrations of small-diameter gears that are hidden by large-diameter gears are omitted) which are provided on the main base plate 26. Also, the rotational force transmitted to the gear 34 is transmitted to a gear 38 via a torque limiter 36.

Here, when torque above a specified value is applied in the gear array 40 which is constituted by gears 32 and 34, the torque limiter 36 slips such that the rotational force is not transmitted to the gear 38. By this, it is made such that torque above necessity is not applied to the main motor 28.

The gear 38 to which the rotational force was transmitted via the torque limiter 36 again changes the direction of the rotational axis by an umbrella gear 42, and transmits the rotational force to a planetary gear 50 which is integrally formed with the umbrella gear 42.

Figure 4:
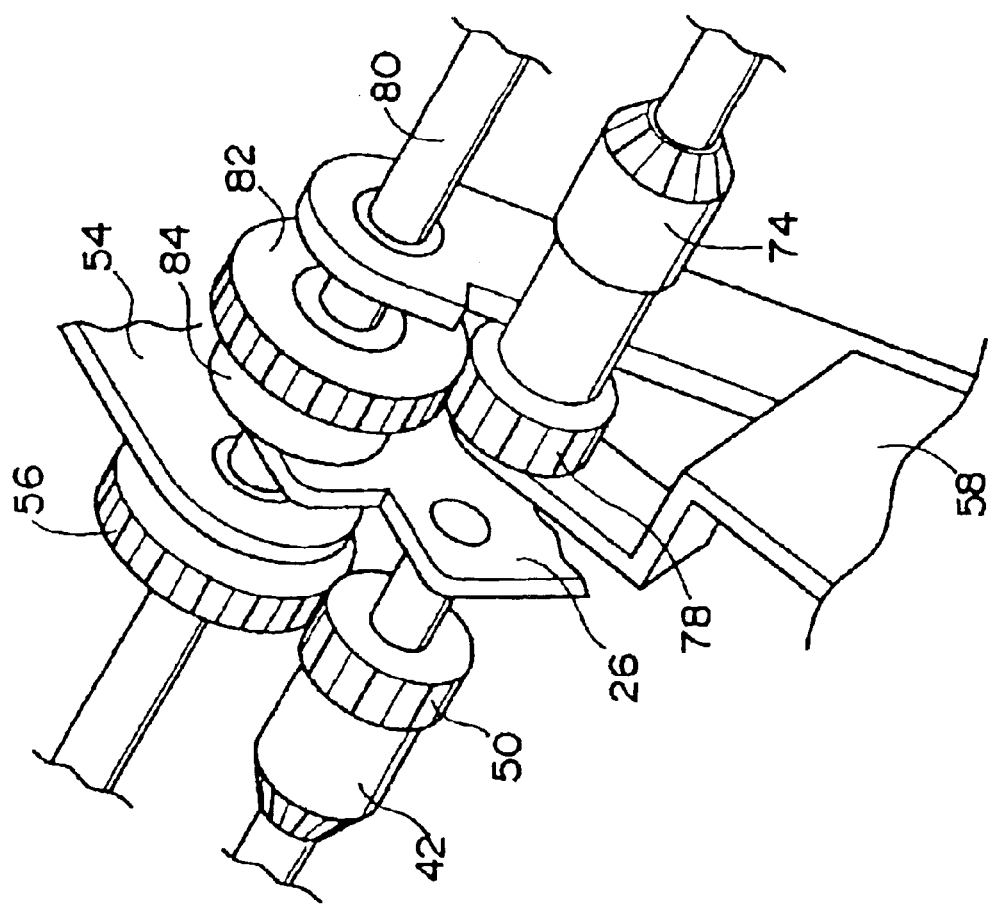
FIG. 4 is a perspective view showing a part of the drive system of the container holder pertaining to the present invention.

Meanwhile, as shown in FIG. 3 and FIG. 4, a fixed shaft 80 is fixed on two side plates 52A of a base box 52 placed inside the housing part 14 (see FIG. 9), and the center of the fixed shaft 80 is supported by a support plate 54 which extends from the base box 52.

A fixed gear 56 is fixed to the support plate 54. The planetary gear 50 engages the fixed gear 56, and when the rotational force is transmitted to the planetary gear 50 by the rotation of the main motor 28, the planetary gear 50 revolves around the fixed gear 56. By this, the main base plate 26 rotates around the fixed axis 80 via the planetary gear 50.

Therefore, when the main motor 28 is driven to rotate forward or backward, the main base plate 26 causes the main arm 20 to rotate toward the direction of appearing inside the vehicle compartment or disappearing i.e. being housed, via the planetary gear 50 which revolves around the fixed gear 56.

Figure 8:
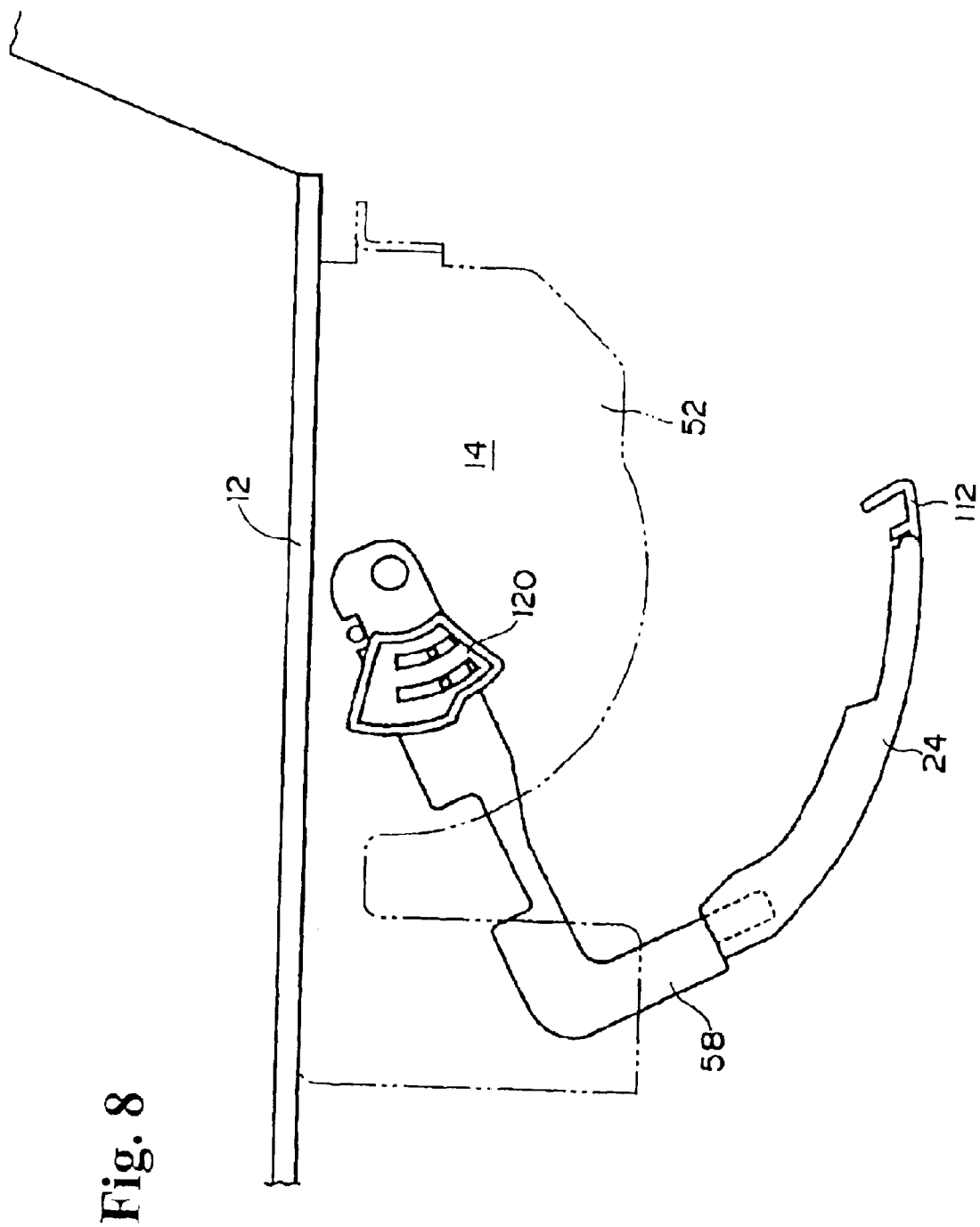
FIG. 8 is an explanatory drawing showing an adjusting base plate and an adjusting arm and an adjusting plate which rotate via the adjusting base plate, which are constituents of the container holder pertaining to the present invention.

Meanwhile, as shown in FIG. 2 and FIG. 8, the adjusting arm 24 is roughly arc-shaped in section, wherein each one is placed on the left and right in the width direction of the vehicle, and each appears and disappears in and out of the vehicle compartment while drawing an arc. On the rear end of each adjusting arm 24, an adjusting base plate 58 which is roughly L-shaped in section is respectively connected.

As shown in FIG. 3 and FIG. 4, an adjusting motor 60 is disposed for each adjusting base plate 58, and the rotational force of the adjusting motor 60 is transmitted independently. On this adjusting motor 60, a worm 62 which is provided on the adjusting base plate 58 is directly coupled such that the rotational force from the adjusting motor 60 is transmitted.

The rotational force transmitted to the worm 62 is transmitted to gears 64 and 66 placed on the same axis, (illustrations of small-diameter gears that are hidden by large-diameter gears are omitted) which are provided on the adjusting base plate 58 via a worm gear not illustrated, and the rotational force is transmitted to a gear 70 via a torque limiter 68.

Here, when torque above a specified value is applied in this gear array 72, the torque limiter 68 slips such that the rotational force is not transmitted to the gear 70. By this, it is made such that torque above necessity is not applied to the adjusting motor 60. Also, the gear 70 to which the rotational force was transmitted via the torque limiter 68 transmits the rotational force to a planetary gear 78 which is integrally formed with an umbrella gear 74.

Here, on each adjusting motor 60, an electrical current detector (not illustrated) which detects the electrical current passing through the adjusting motor 60 is respectively connected such that the change of torque applied to the adjusting motor 60 is detected by detecting the amount of electrical current passing through the adjusting motor 60. Therefore, when torque above necessity is applied to the adjusting motor 60, the amount of electrical current passing through the adjusting motor 60 rises.

Thus, by detecting the amount of electrical current passing through the adjusting motor 60, the fact that a container 16 has come to contact with an adjusting plate 112 (to be described later) which is provided on the front end of the adjusting arm 24 is determined by that change of the electrical current.

On the other hand, the planetary gear 78 engages an adjusting gear 82 which is transfixed so as to be capable of rotation on the fixed shaft 80 which is fixed to the base box 52, and in the state in which the adjusting gear 82 is incapable of rotation (to be described later), the planetary gear 78 revolves around the adjusting gear 82, and causes the adjusting base plate 58 to rotate inside the base box 52 around the fixed shaft 80.

Incidentally, on both sides of the base part of the main base plate 26, rollers 84 which are transfixed so as to be capable of rotation on the fixed shaft 80 are respectively fixed, and it rotates around the fixed shaft 80 together with the rotation of the main base plate 26. The adjusting gear 82 is integrally formed respectively on each roller 84, and it rotates integrally with the main base plate 26.

Therefore, when the main motor 28 is driven and the planetary gear 50 rotates via the gear array 40 and revolves around the fixed gear 56 and the main base plate is driven, the adjusting gear 82 rotates and the planetary gear 78 which engages the adjusting gear 82 revolves. By this, the left and right adjusting base plates 58 respectively rotate inside the base box 52 around the fixed shaft 80.

Also, when driving of the main motor 28 is stopped and the rotation of the main base plate 26 is stopped, the roller 84 which is fixed to the main base plate 26 and the adjusting gear 82 become incapable of rotation. In this state, when the adjusting motor 60 is driven, the planetary gear 78 rotates via the gear array 72, and by this, the planetary gear 78 revolves around the adjusting gear 72, and the adjusting base plate 58 rotates.

That is, when the main motor 28 is driven, the main base plate 26 and the left and right adjusting base plates 58 rotate, and when the adjusting motor 60 is driven in the state in which driving of the main motor 28 is stopped, the adjusting base plate 58 rotates.

Figure 5:
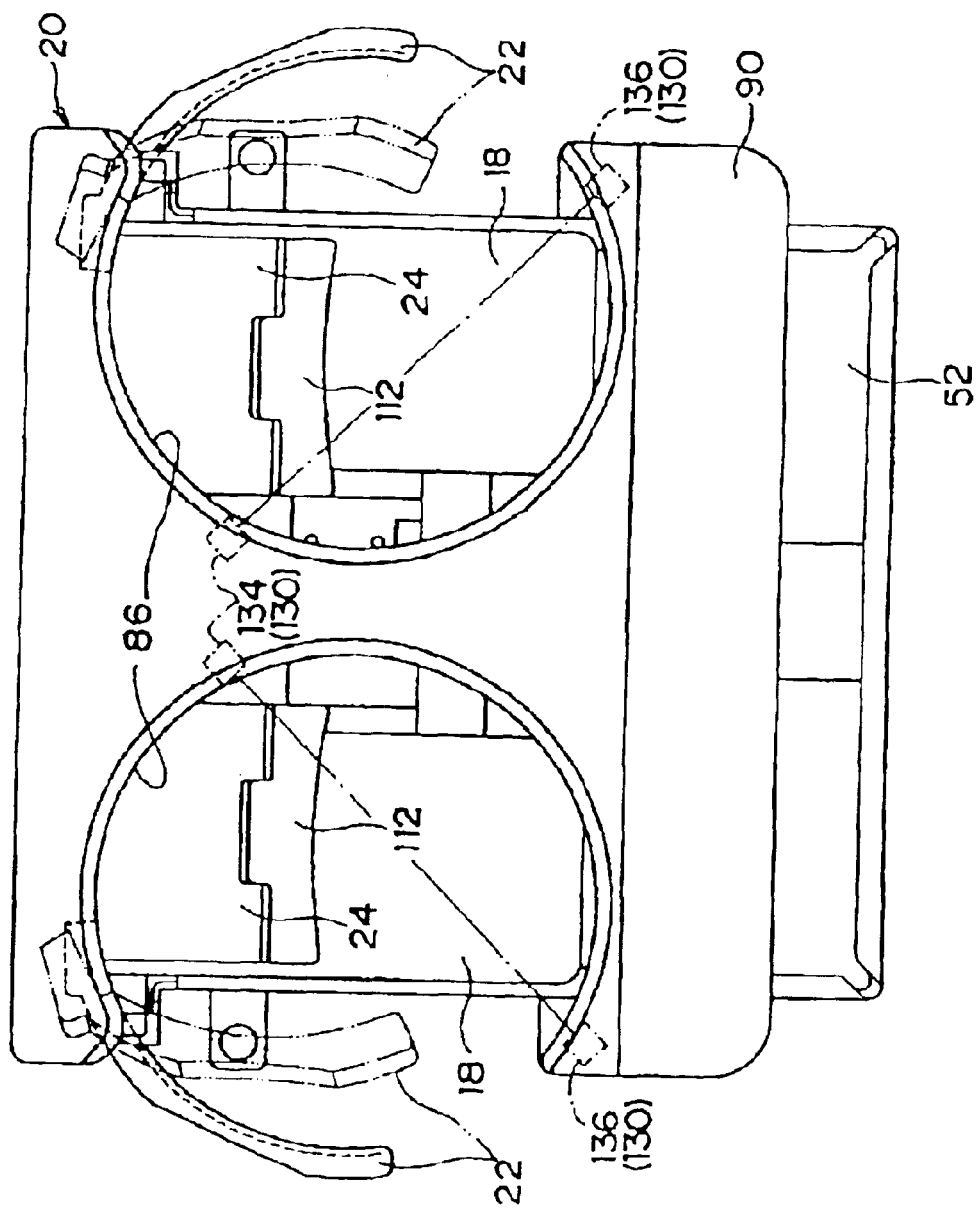
FIG. 5 is a plan view showing the state in which the container holder pertaining to the present invention has appeared inside the vehicle compartment.

Incidentally, as shown in FIG. 2, FIG. 5, and FIG. 7, on the main arm 20, a holder 86 is provided respectively on the left and the right in the width direction of the vehicle. This holder 86 is formed as an arc viewed horizontally, and both sides in the width direction of the main arm 20 are open. Also, on both sides of the rear end of the main arm 20, the sub arms 22 are respectively supported, and each is made capable of swaying at the opening in the width direction of the main arm 20.

Meanwhile, a pass-through slot 88 is formed on the console box 12, and the main arm 20 and the sub arms 22 become capable of appearing inside the vehicle compartment by passing through this pass-through slot 88. At this time, it is made such that the sub arms 22 pass through the pass-through slot 88 in a closed state, and they are opened after passing through the pass-through slot 88 (to be described later).

Here, a cosmetic plate 90 is formed on the front end of the main arm 20, and the pass-through slot 88 becomes capable of being closed by this cosmetic plate 90. A main switch 92 is disposed on the cosmetic plate 90 such that the main motor 28 (see FIG. 3) is driven when this main switch 92 is pressed.

Also, as shown in FIG. 3 and FIG. 7, an assisting plate 94 is attachable on the main base plate 26 which is driven by the main motor 28. This assisting plate 94 has a pair of fins 94B extending outward from a plate-shaped stand 94A and facing opposite each other, and the tips of these fins 94B are fixed on the left and right in the width direction of the main base plate 26.

By this, the assisting plate 94 rotates integrally with the main base plate 26. Also, the undersides of the adjusting base plates 58 which are placed on the left and right of the main base plate 26 respectively become capable of contacting with the stand 94A (see FIG. 9).

Therefore, as described previously, when the main motor 28 is driven, the main base plate 26 and the left and right adjusting base plates 58 become capable of rotation, but the adjusting base plates 58 are supported by the assisting plate 94.

Figure 9:
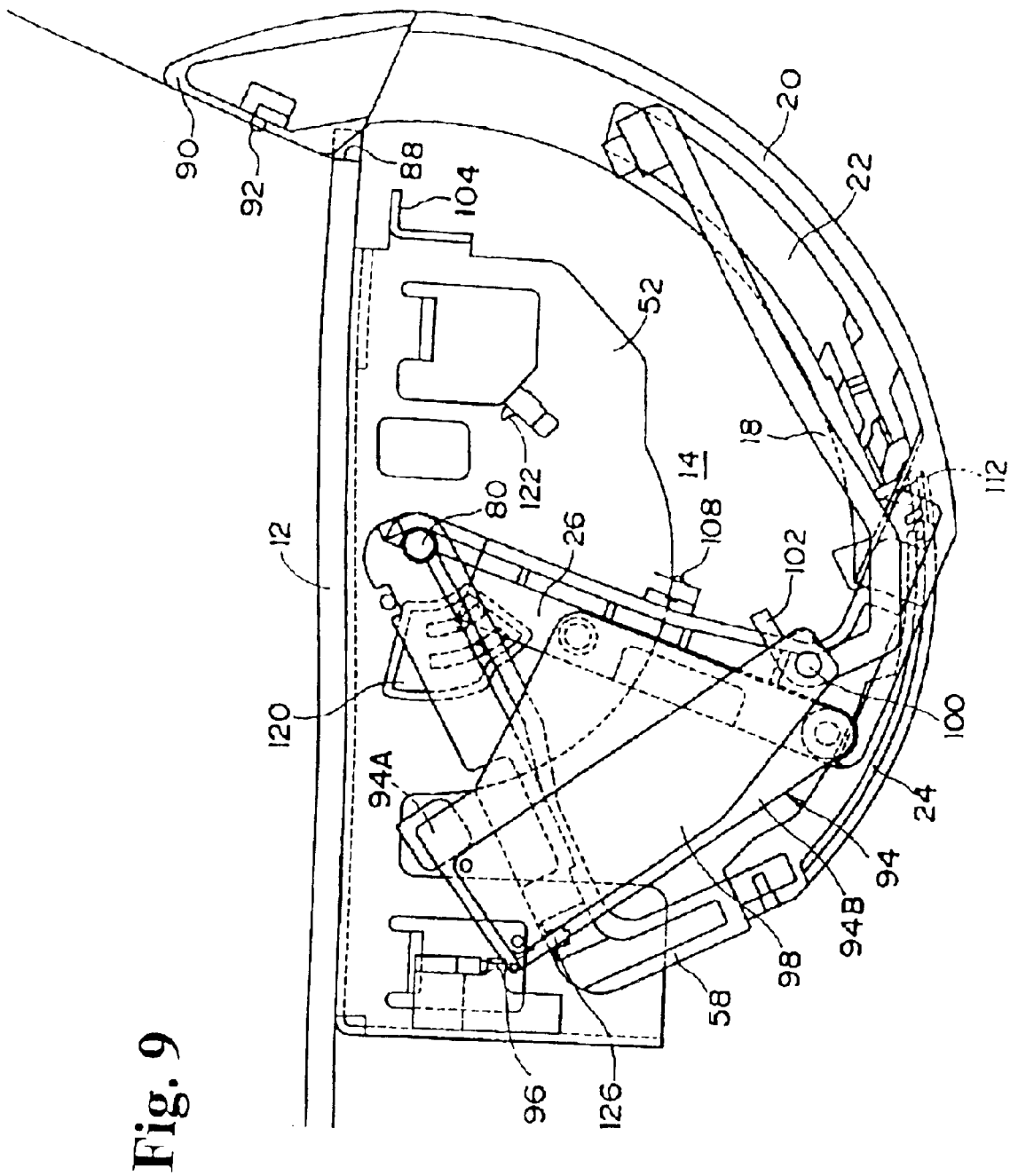
FIG. 9 is a generalized sectional view showing the operation of the container holder pertaining to the present invention, and it shows the state in which the container holder is housed.

Meanwhile, as shown in FIG. 7 and FIG. 9, on the base box 52, a close switch 96 is disposed on top of the movement track of the assisting plate 94, and the assisting plate 94 becomes capable of contact in the state in which the container holder 10 is housed in the housing part 14.

Also, on the left and right of the stand 94A of the assisting plate 94, a pair of sub assisting plates 98 which is roughly rectangularly shaped plates is fixed such that they rotate integrally with the main base plate 26 via the assisting plate 94. A shaft 100 is fixed to these sub assisting plates 98, and the trays 18 are supported to be capable of rotation.

Here, the tray 18 is provided independently on the left and right for each holder 86 (see FIG. 2 and FIG. 5), a tray torsion spring not illustrated is respectively installed on the base part of the tray 18, and it forces the tray 18 toward the main arm 20.

Figure 11:
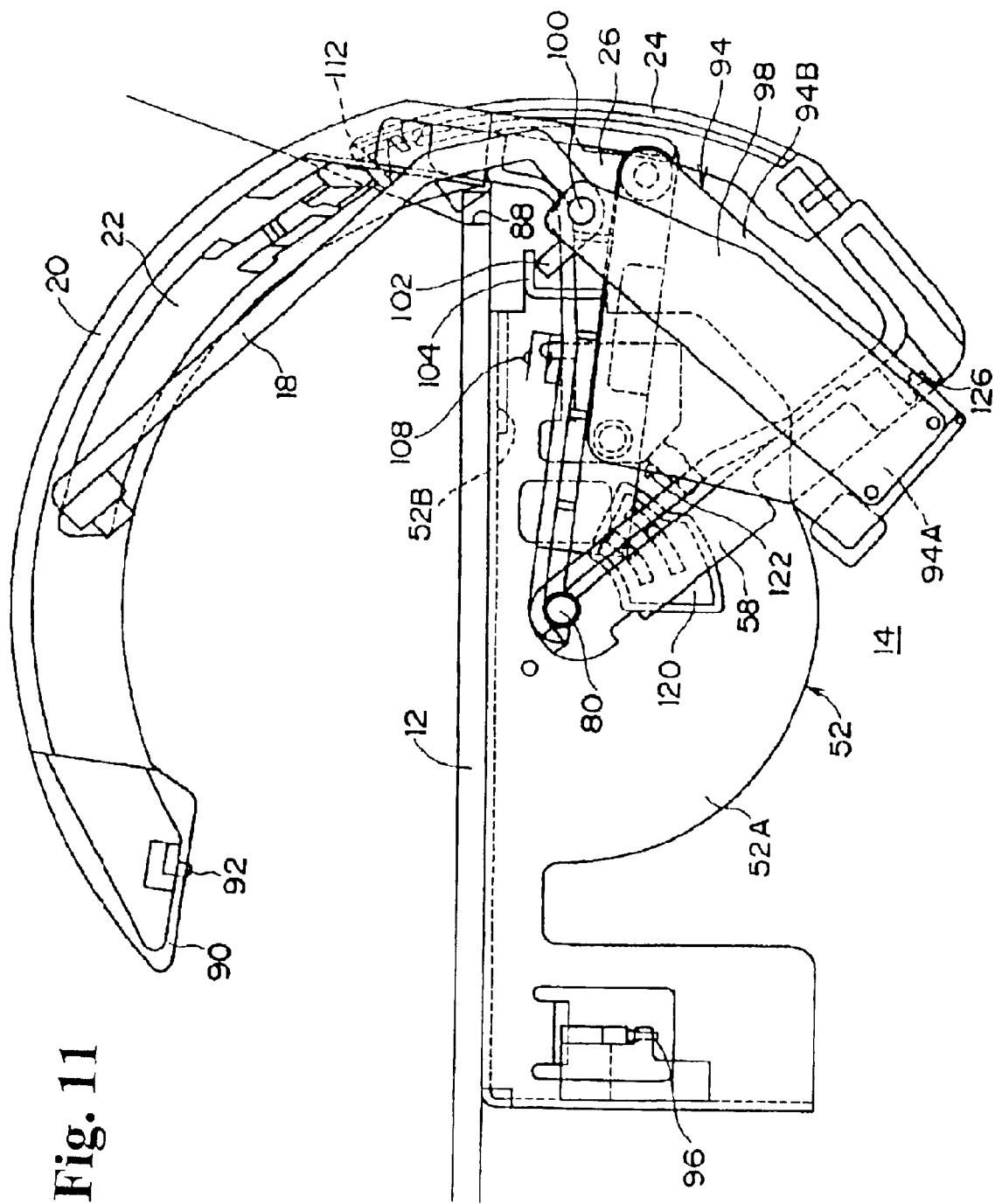
FIG. 11 is a generalized sectional view showing the operation of the container holder pertaining to the present invention, and it shows the state in which the container holder is in the mid-course of appearing inside the vehicle compartment or being housed.
Figure 12:
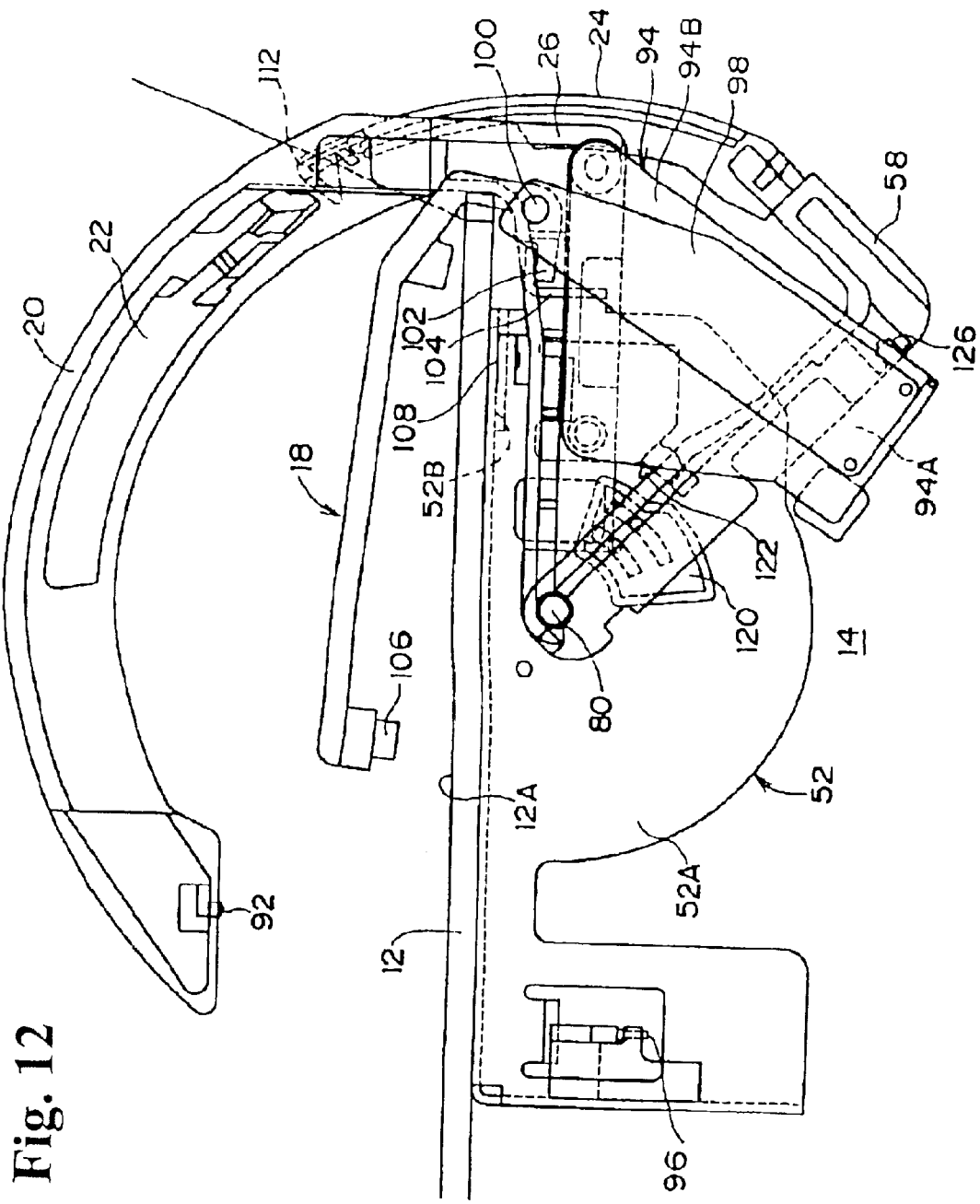
FIG. 12 is a generalized sectional view showing the operation of the container holder pertaining to the present invention, and it shows a standby state.

Also, a contact piece 102 extends outward respectively from the base part of the tray 18, and when the tray 18 is rotated for a specified angle, as shown in FIG. 11 and FIG. 12, it contacts a protruding piece 104 which is formed on the base box 52, and by the rotation of the main base plate 26, the tray 18 comes to rotate around the shaft 100 based on the protruding piece 104 toward the direction opposing the force of the tray torsion spring.

Figure 14:
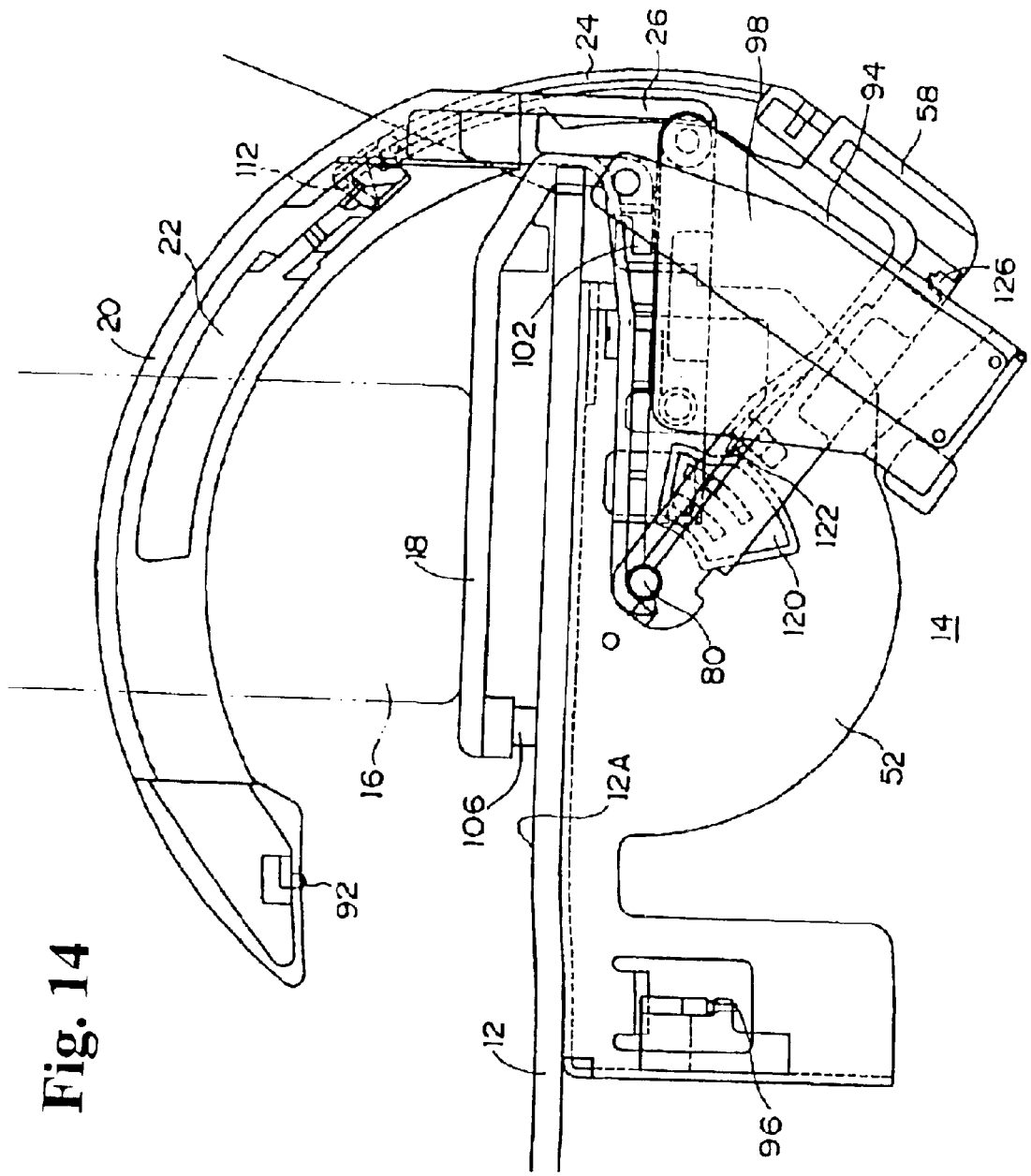
FIG. 14 is a generalized sectional view showing the operation of the container holder pertaining to the present invention, and it shows the state in which the container is being placed on the tray.

By this, the tray 18 is placed beneath the main arm 20, and it becomes capable of placing the container 16. However, in this state, the tray 18 is not placed parallel to the upper surface 12A of the console box 12, and a gap appears between the upper surface 12A of the console box 12 and the contact part 106 which is placed to protrude on the front end of the tray by the force of the tray torsion spring. As shown in FIG. 14, the contact part 106 of the tray 18 contacts with the upper surface 12A of the console box 12 in the state in which the container 16 is placed (horizontal state).

Figure 10:
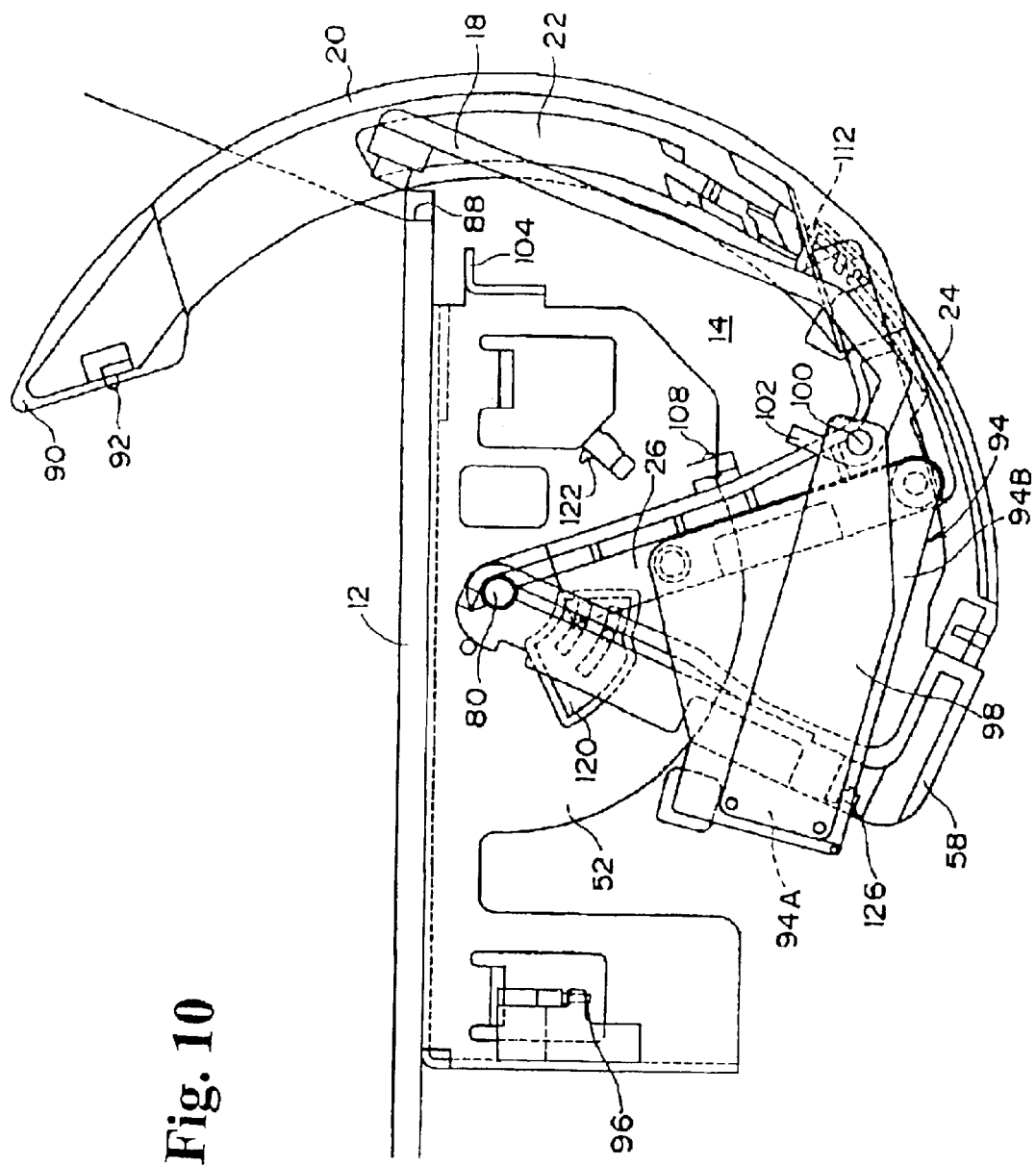
FIG. 10 is a generalized sectional view showing the operation of the container holder pertaining to the present invention, and it shows the state in which the container holder is in a mid-course of appearing inside the vehicle compartment or being housed.

Meanwhile, as shown in FIG. 10 to FIG. 12, an open switch 108 is disposed on the upper surface of the main base plate 26, and it contacts with the ceiling surface 52B of the base box 52 such that the open switch 108 is pressed in the state in which the main base plate 26 is rotated for a specified angle.

As shown in FIG. 12, when this open switch 108 is turned on, driving of the main motor 28 is stopped, and rotations of the main arm 20, sub arms 22, trays 18, adjusting base plates 58, and adjusting arms 24 are stopped via the main base plate 26 (below, this state is called "standby 1 state"). In addition, the two adjusting motors 60 are driven and the state of contact with the assisting plate 94 is released.

Figure 17:
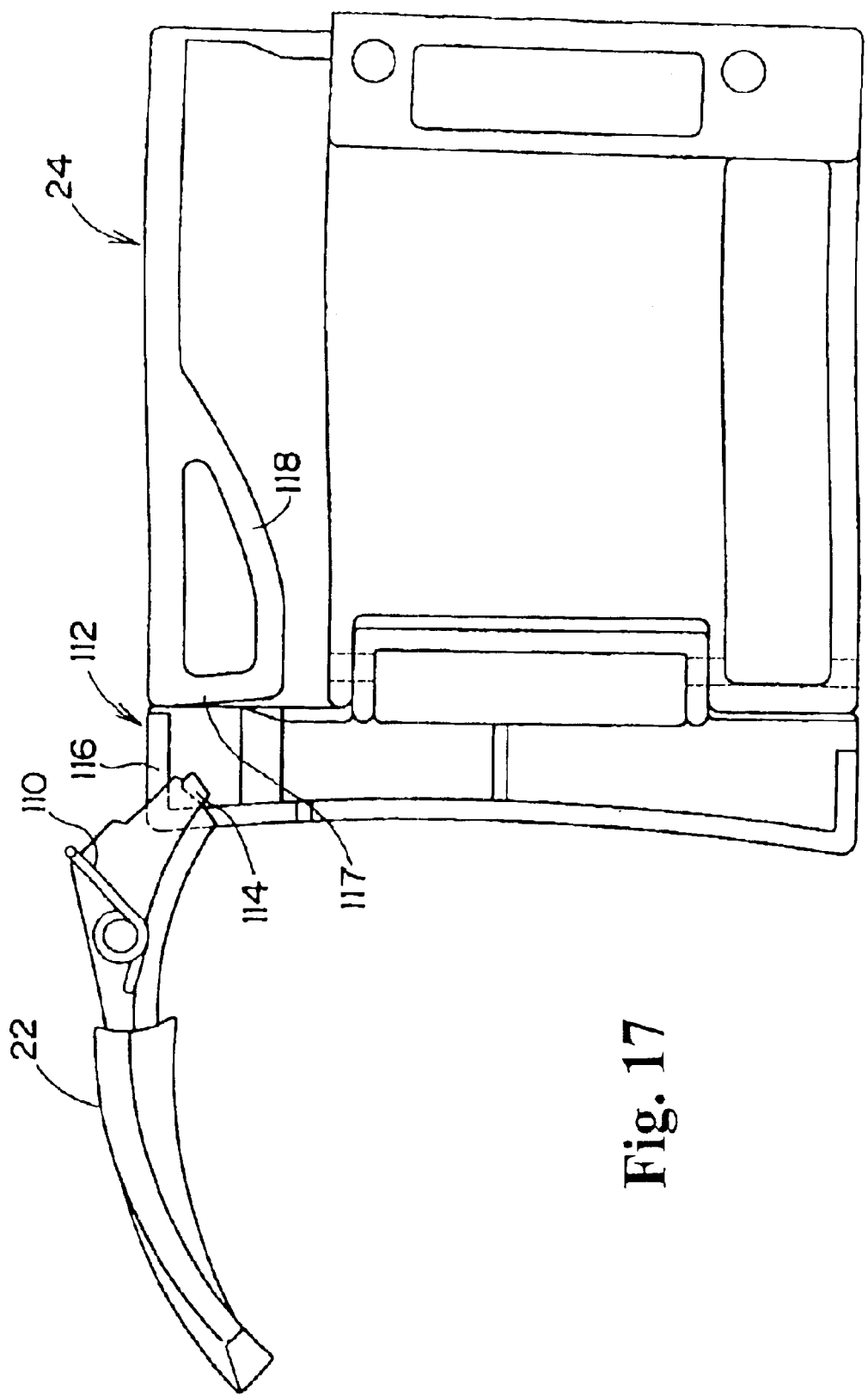
FIG. 17 is an underside view showing the operation of the container holder pertaining to the present invention, and it shows the state in which the sub arm is closed.

Incidentally, as shown in FIG. 17, one end of a torsion spring 110 is installed on the base part of the sub arm 22, the other end of the torsion spring 110 is installed on the main arm 20, and the sub arm 22 is forced toward the closing direction.

Here, as shown in FIG. 8, on the front end of the adjusting arm 24 which is connected to the adjusting base plate 58, the adjusting plate 112 which is roughly bracket shaped in section with the opening downward is attached to be capable of rotating upward on the adjusting arm 24 in the state in which it has appeared at a specified position inside the vehicle compartment.

Figure 18:
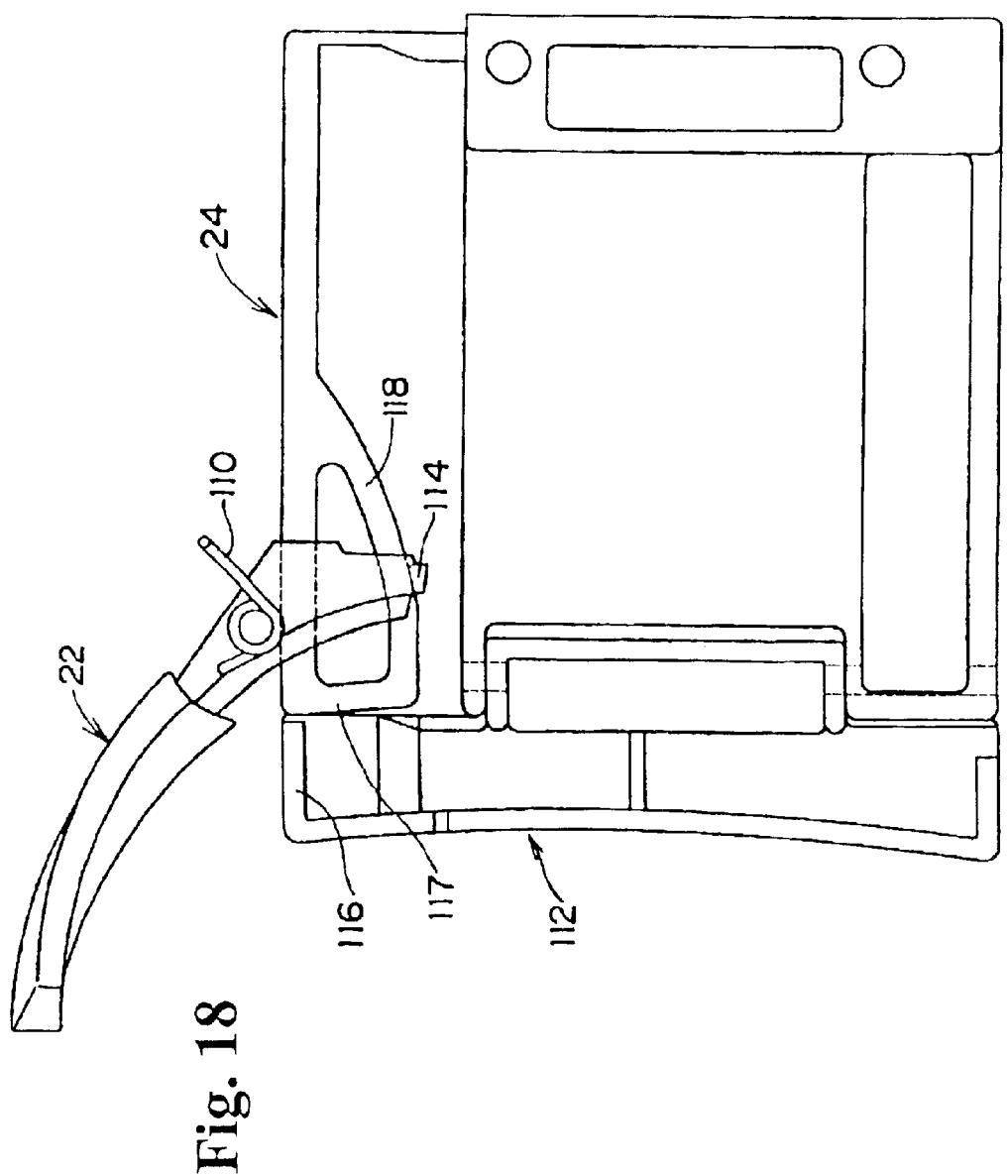
FIG. 18 is an underside view showing the operation of the container holder pertaining to the present invention, and it shows the state in which the sub arm is open.

Meanwhile, as shown in FIG. 17, a coupling part 114 is formed on the base part of the sub arm 22, and by rotation of the adjusting arm 24, it is guided by a wall part 116 which is formed on the adjusting plate 112, and after it contacts with a guide wall 117 which is formed on the front end of the adjusting arm 24, it is guided by the guide wall 117 and couples with a cam wall 118. By this, as shown in FIG. 18, the sub arm 22 sways from the closed state to the open state.

Incidentally, an adjusting arm switch 122 which is fixed to the inner wall of the base box 52 is placed on the movement track of an adjusting plate 120 which is attached to the adjusting base plate 58.

Figure 13:
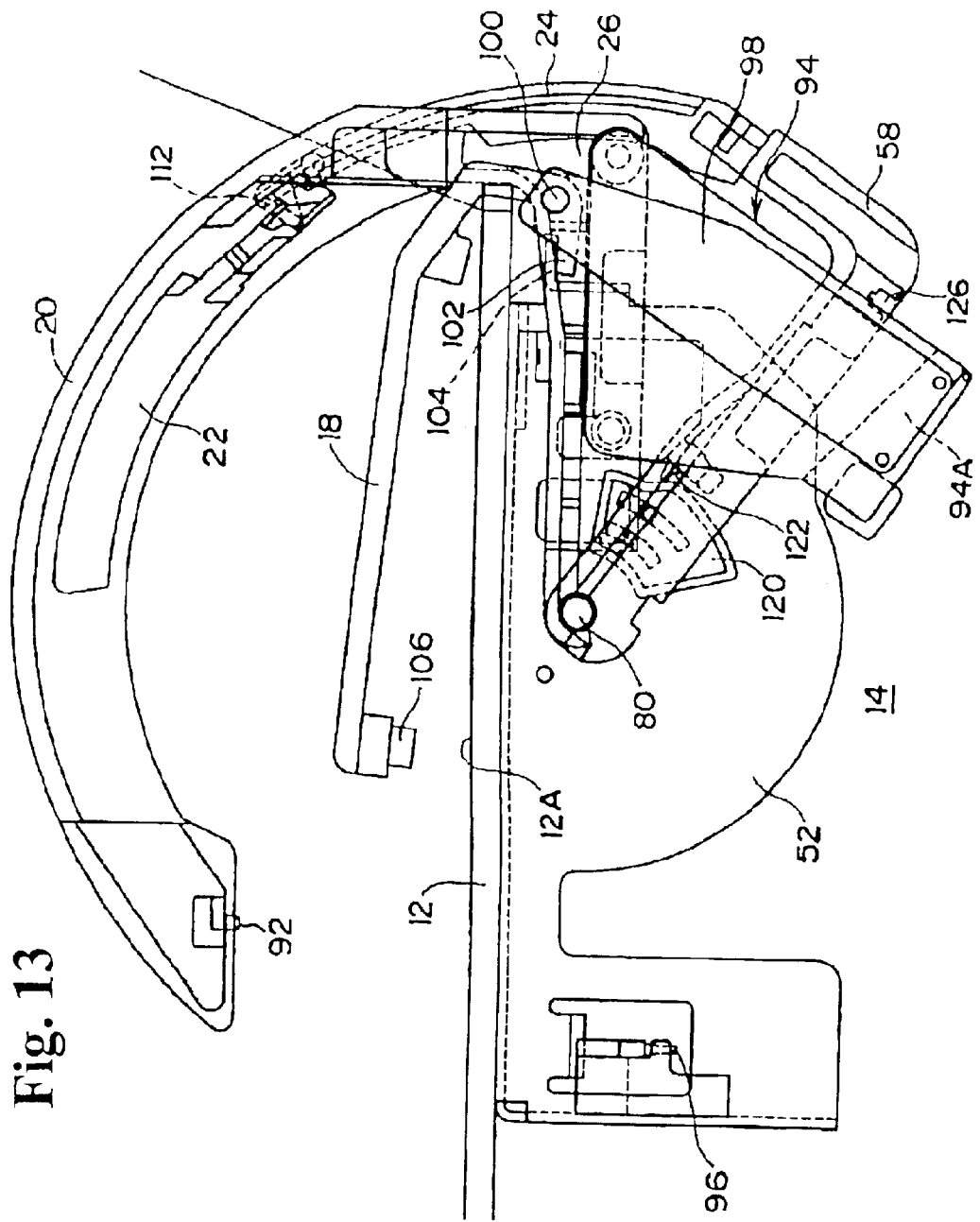
FIG. 13 is a generalized sectional view showing the operation of the container holder pertaining to the present invention, and it shows another standby state.

It is made such that the adjusting plate 120 contacts with the adjusting arm switch 122 in the state in which the sub arm 22 is completely open, as shown in FIG. 2 and FIG. 13, and when this adjusting arm switch 122 is turned on, the adjusting motor 60 (see FIG. 3) is stopped, and it comes to a state in which a container 16 can be placed on the tray (below, this state is called "standby 2 state").

Here, because the trays 18 are provided independently with each other corresponding to the holders 86, when the container 16 is placed on the tray 18 in the standby 2 state, as shown in FIG. 14, only the tray 18 on the side on which the container 16 was placed sinks by the weight of the container 16, and the tray 18 comes to the horizontal state with the contact part 106 of the tray 18 contacting with the upper surface 12A of the console box 12.

Because it is determined as to whether or not the container 16 is placed on the tray 18 by moving the tray 18 and operating a tray switch 124 by the weight of the container 16, the placement or non-placement of the container 16 can be assuredly sensed.

Meanwhile, on the main base plate 26, the tray switch 124 is disposed respectively corresponding to each tray 18 such that the tray switch 124 is pressed by the contact piece 102 which is provided on the side of the tray 18 in the state in which the tray 18 is placed horizontally.

When this tray switch 124 is turned on, the adjusting motor 60 (see FIG. 3) is further driven to rotate forward. By this, as shown in FIG. 18, the adjusting arm 24 rotates and the coupling part 114 of the sub arm 22 is guided to the cam wall 118, and the sub arm 22 sways toward the closing direction, and as shown in FIG. 2 and FIG. 14, the container 16 is held by the holder 86, adjusting plate 112, and sub arm 22 (below, this state is called "holding state").

Thus, by providing the tray 18 and the adjusting arms 24 independently on the left and right in the width direction of the vehicle corresponding to each holder 86, for example as shown in FIG. 2, when the container 16 is placed on the left tray 18, the left adjusting arm 24 rotates, and the left sub arm 22 sways and is closed.

On the other hand, because the right adjusting arm 24 does not rotate, the right sub arm 22 does not sway and remains in the open state (solid line). Accordingly, the container 16 can be placed smoothly on the right tray 18.

Meanwhile, as shown in FIG. 5 and FIG. 5, a photoelectric sensor 130 is capable of being disposed on the holder 86 of the main arm 20. This photoelectric sensor 130 is constituted by a light projector 134 and a light receiver 136, and they are placed opposite to each other for each holder 86.

The light projector 134 and light receiver 136 are respectively fixed to stands 132 which are formed as a crank shape in section, and the light projector 134 and light receiver 136 are fixed to the underside of the holder 86 via these stands 132. Also, through-holes 86A are formed on the parts of the holder 86 where the light emitting element or light receiving element (both not illustrated) of the light projector 134 and the light receiver 136 are placed such that the projected light can pass through.

Thus, by disposing the photoelectric sensor 130 in the holder 86, when it becomes in the standby 2 state, the photoelectric sensor 130 is activated, light is projected from the light projector 134, and the projected light is received by the light receiver 136.

Therefore, when the container 16 is placed on the tray 18 in the standby 2 state (when the container 16 is placed between the holder 86 and the sub holder 22), because the light projected from the light projector is blocked and the light does not reach the light receiver 136, it is recognized that the container was placed on the tray 18.

Also, the light receiver 136 is made to be able to detect the amount of received light, and by control means not illustrated, when it is determined that the amount of received light over the amount of light projected by the light projector 134 is less than a specified value, it is recognized that the container 16 has been placed on the tray 18. Thus, by detecting the amount of light received by the light receiver 136, even when the container 16 is transparent, the presence or absence of a container 16 placed on the tray 18 can be assuredly sensed.

Figure 15:
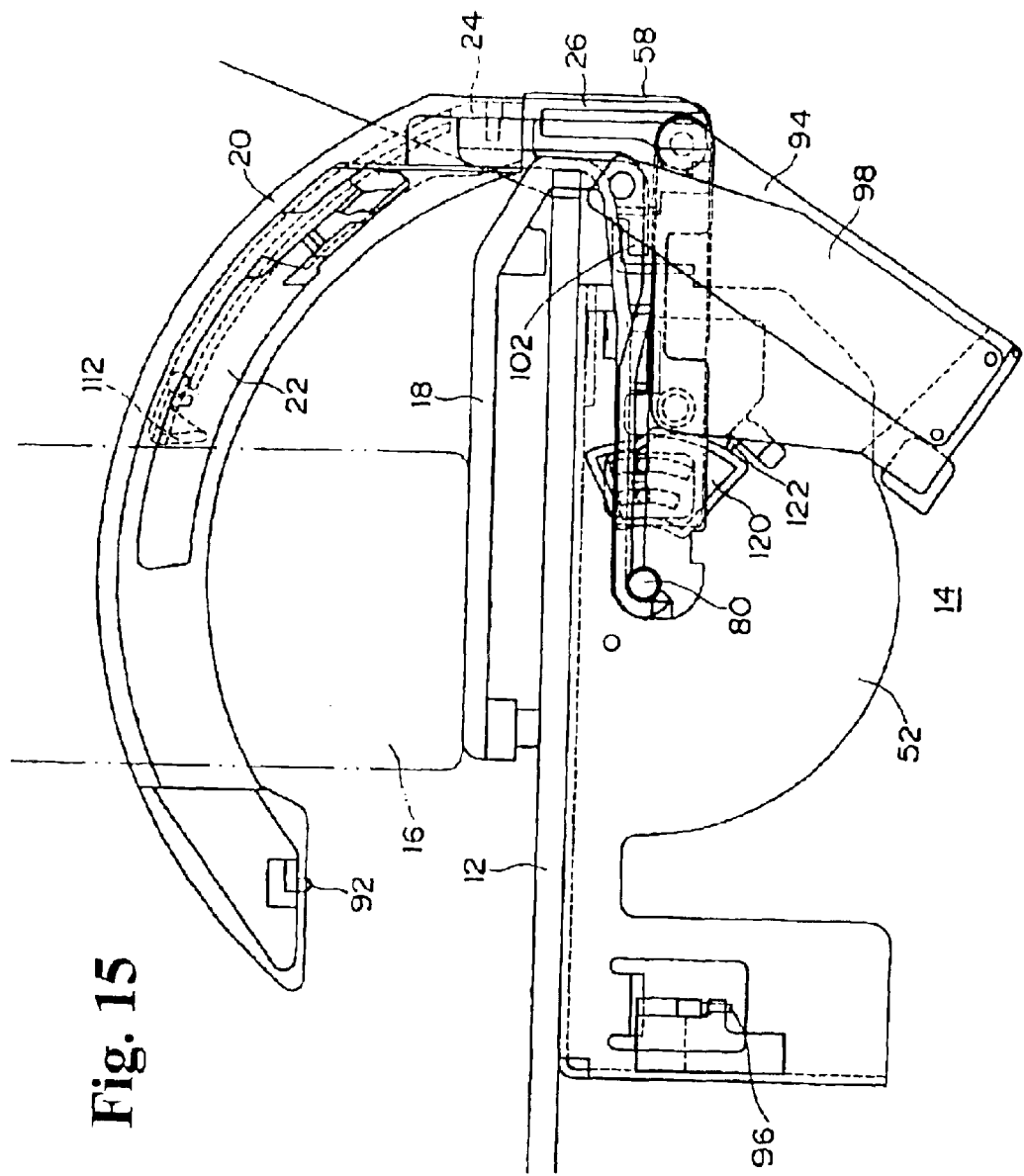
FIG. 15 is a generalized sectional view showing the operation of the container holder pertaining to the present invention, and it shows the holding state.
Figure 19:
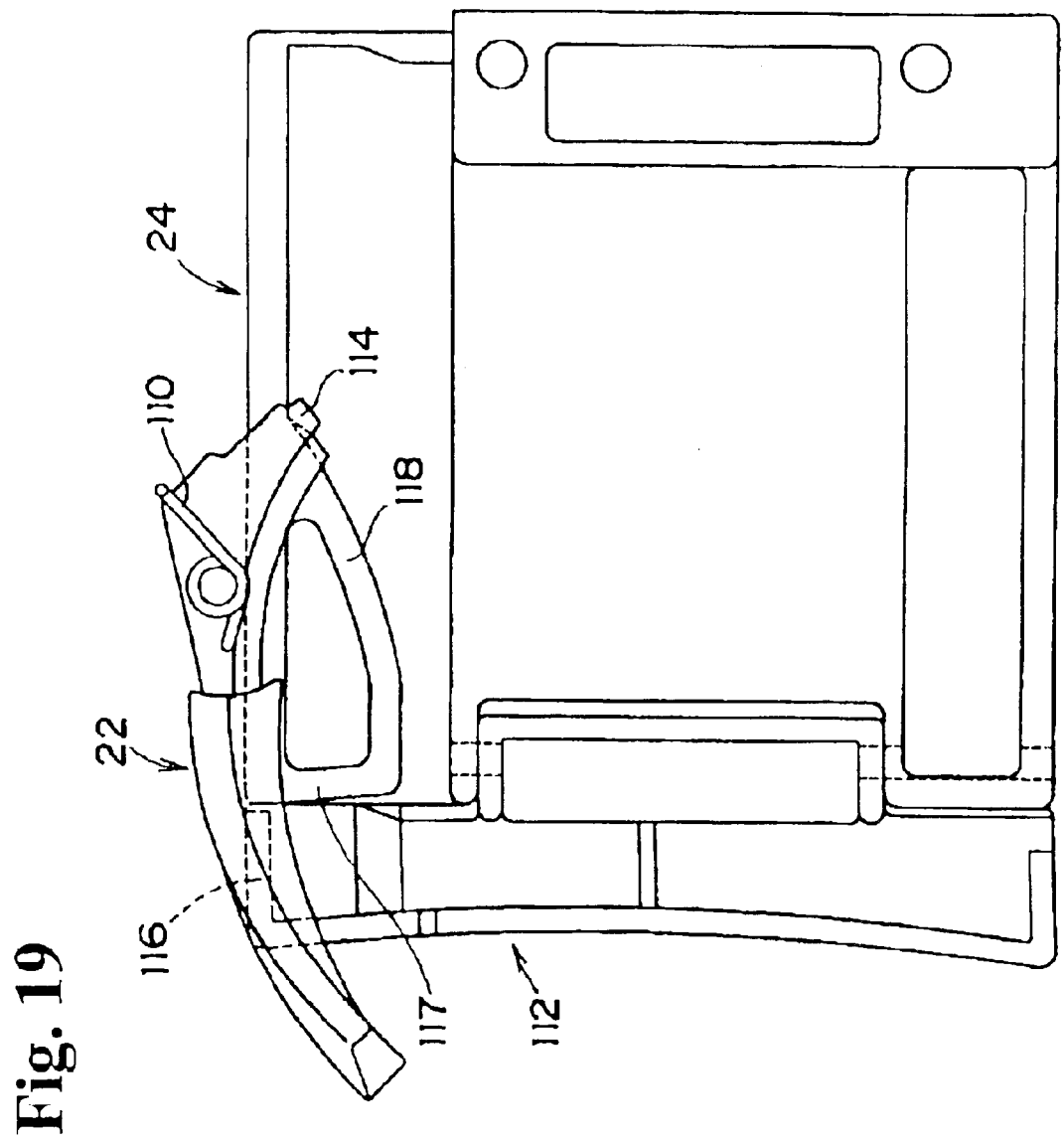
FIG. 19 is an underside view showing the operation of the container holder pertaining to the present invention, and it shows the state in which the sub arm is closed.

Here, when the container is placed on the tray 18 and it is determined that the amount of light received by the light receiver 136 is less than the specified value, the adjusting motor 60 (see FIG. 3) is further driven to rotate forward. By this, as shown in FIG. 19, the adjusting arm 24 rotates and the coupling part 114 of the sub arm 22 is guided to the cam wall 118, and the sub arm 22 sways toward the closing direction. And as shown in FIG. 2 and FIG. 15, the container 16 is held by the holder 86, adjusting plate 112, and sub arm 22 (below, this state is called "holding state").

Thus, by providing the tray 18 and the adjusting arm 24 independently on the left and right in the width direction of the vehicle corresponding to each holder 86, for example as shown in FIG. 5, when the container 16 (see FIG. 2) is placed on the left tray 18, it is determined that the amount of light received by the light receiver 136 which is placed on the side of the left holder 86 is less than the specified value, the left adjusting arm 24 rotates, and the left sub arm 22 sways and is closed.

On the other hand, because the light projected from the light projector 134 is received without change by the light receiver 136 which is placed in the right holder 86, the state in which it is recognized that the container 16 is not placed between the light projector 134 and the light receiver 136 is maintained, and the right adjusting arm 24 does not rotate. Therefore, the right sub arm 22 does not sway and remains in the open state (solid line), and the container 16 can be placed smoothly on the right tray 18.

Also, when the container 16 is removed from the right tray 18 in the state in which the containers 16 were placed on the left and right trays, the light projected from the projector 134 is received without change by the light receiver 136 on the right, and it is recognized that the container 16 is not placed. Therefore, the right adjusting arm 24 rotates, and the sub arm 22 sways and is opened.

On the other hand, because the container 16 is placed on the left tray 18, the light projected by the light projector 134 remains in the blocked state at the left light receiver 136, and the sub arm 22 is in the closed state. Therefore, when the container 16 is placed back on the right tray 18, it is easy to place because the sub arm 22 is open.

According to the above construction, by making it such that whether or not the container 16 is placed on the tray 18 can be sensed by using the photoelectric sensor 130, even when the container 16 moves up and down due to vibration during running of the vehicle, the photoelectric sensor 130 is not influenced by this. That is, the container 16 that is placed on the tray 18 can be assuredly sensed regardless of the vibration during running of the vehicle.

Also, by the fact that the sub arm 22 is caused to sway by the adjusting arm 24 and the adjusting plate 112 holds the container 16 cooperatively with the sub arm 22, it differs from the case in which the container 16 is held by the force of a spring, or the like. And, the container 16 can be held by a holding force that is roughly equal regardless of the size of the container (to be described later).

Furthermore, even if the sizes of the containers 16 which are placed respectively in the trays 18 are different, the containers 16 can be securely held by the holders 86 and the adjusting plates 112 in the respective trays 18 by fitting the sizes of the containers 16.

Figure 20:
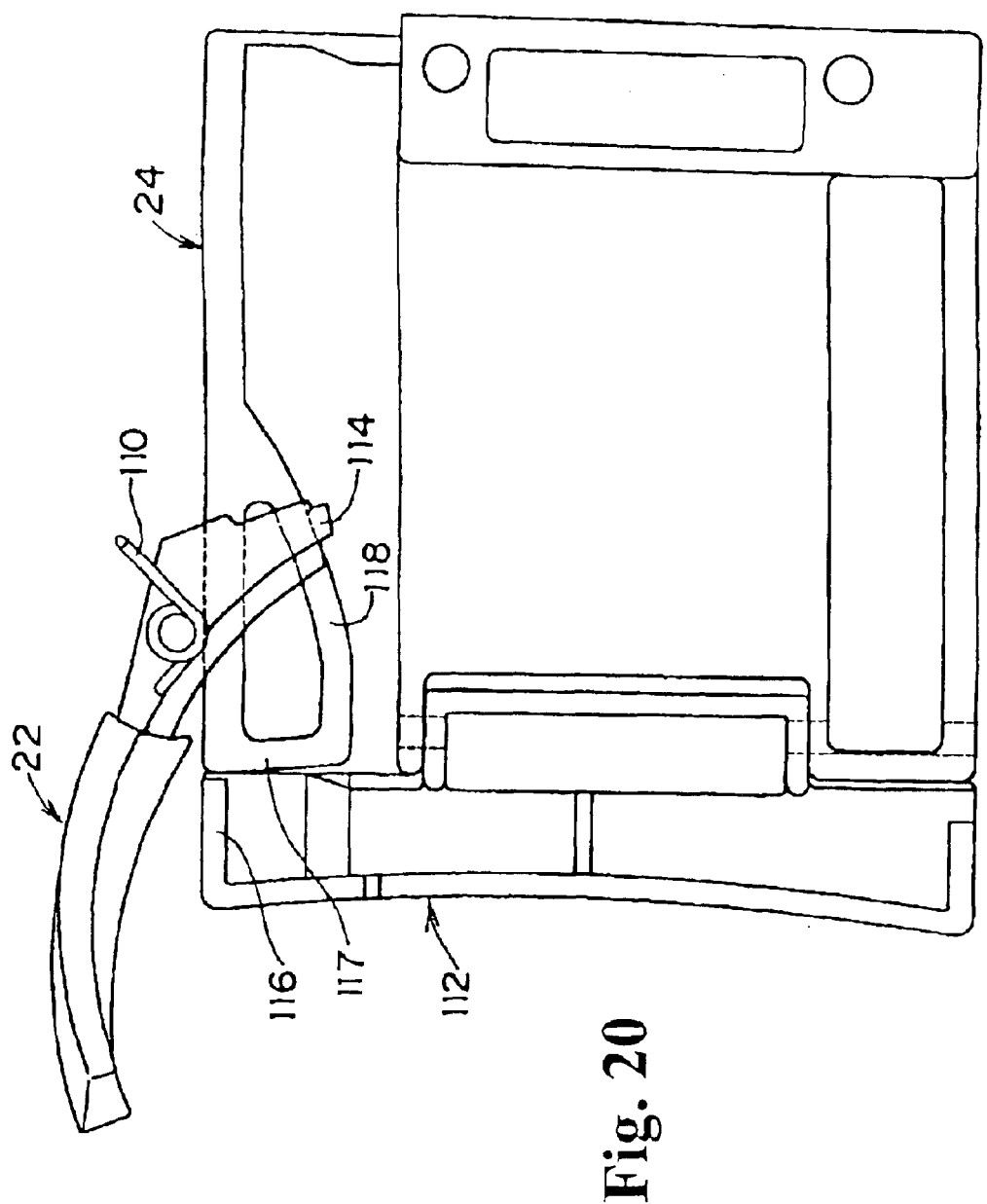
FIG. 20 is an underside view showing the operation of the container holder pertaining to the present invention, and it shows the state in which the sub arm is open in opposition to the force of a torsion spring.
Figures 1, 21:
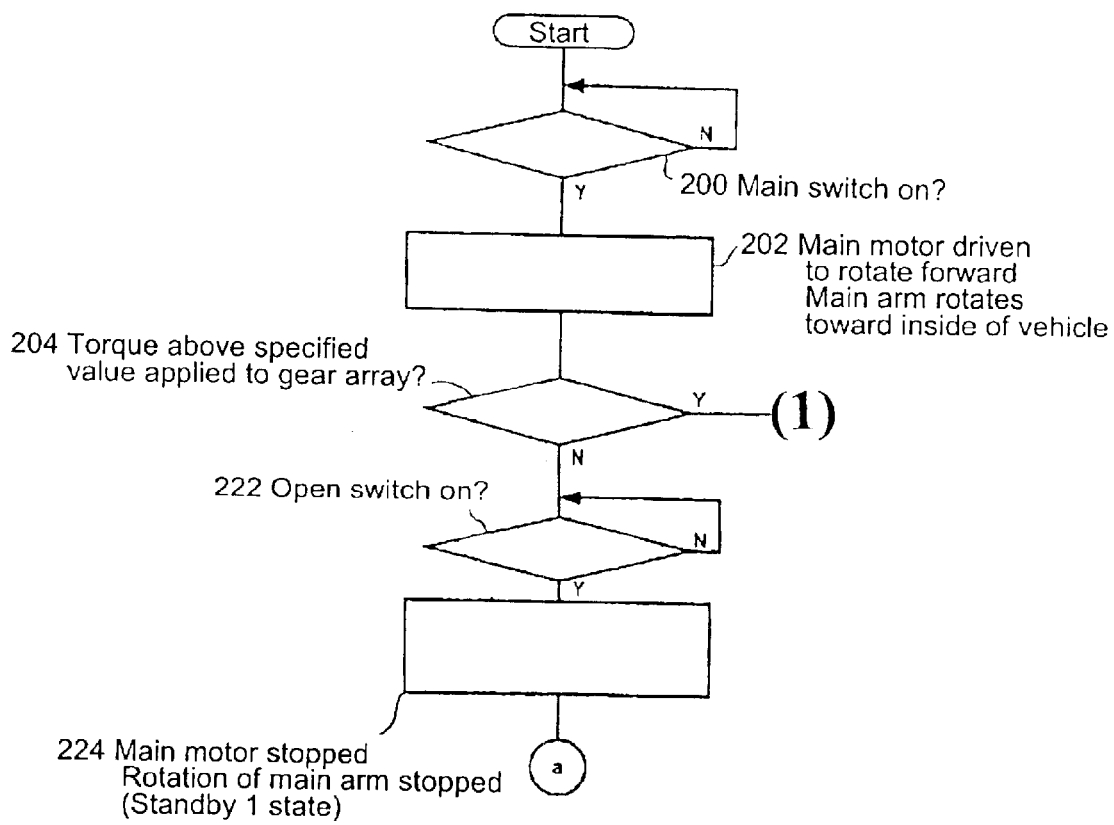
FIG. 21 is a flow chart showing the operation of the container holder pertaining to the present invention.
Figures 2, 21:
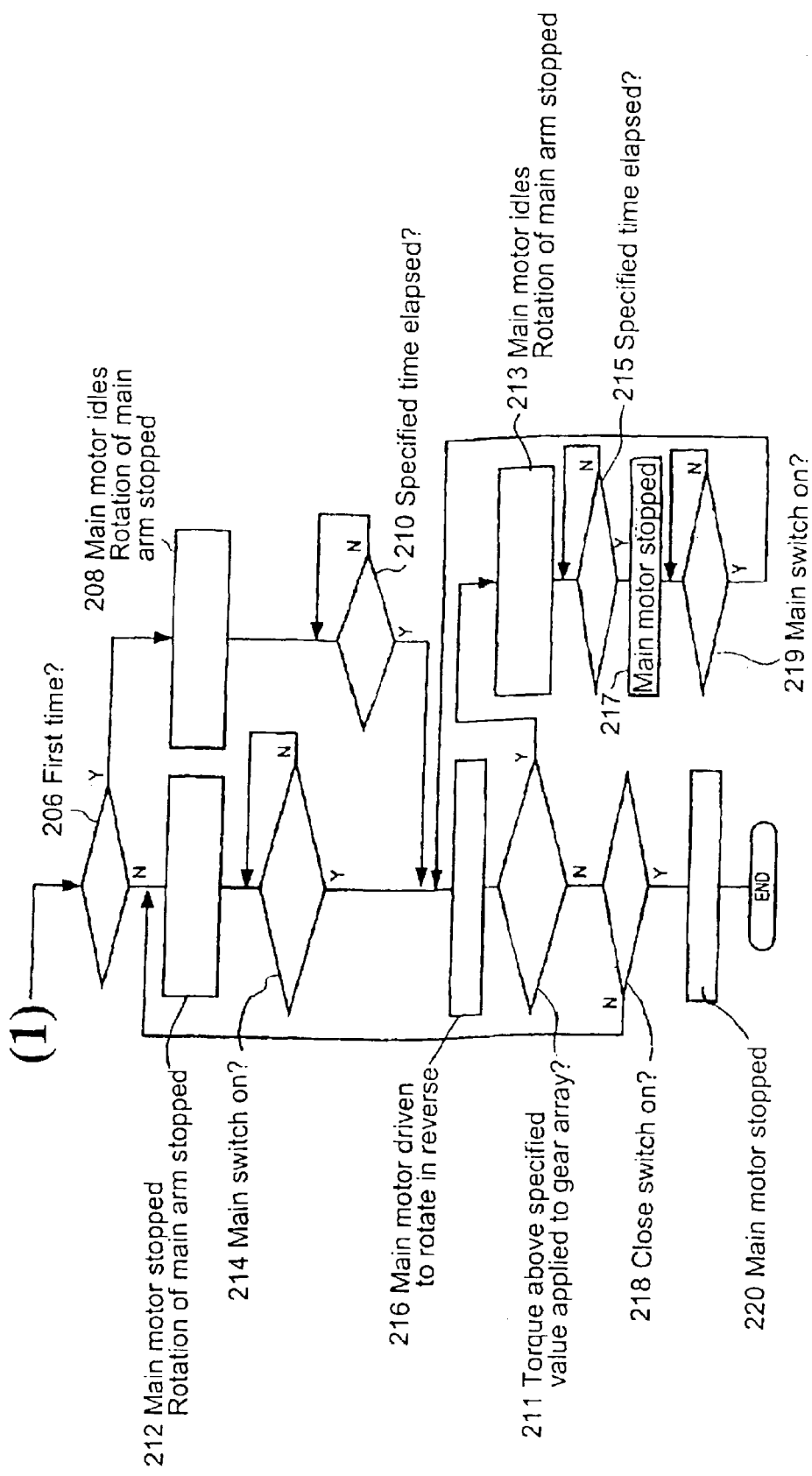
Figures 1, 22:
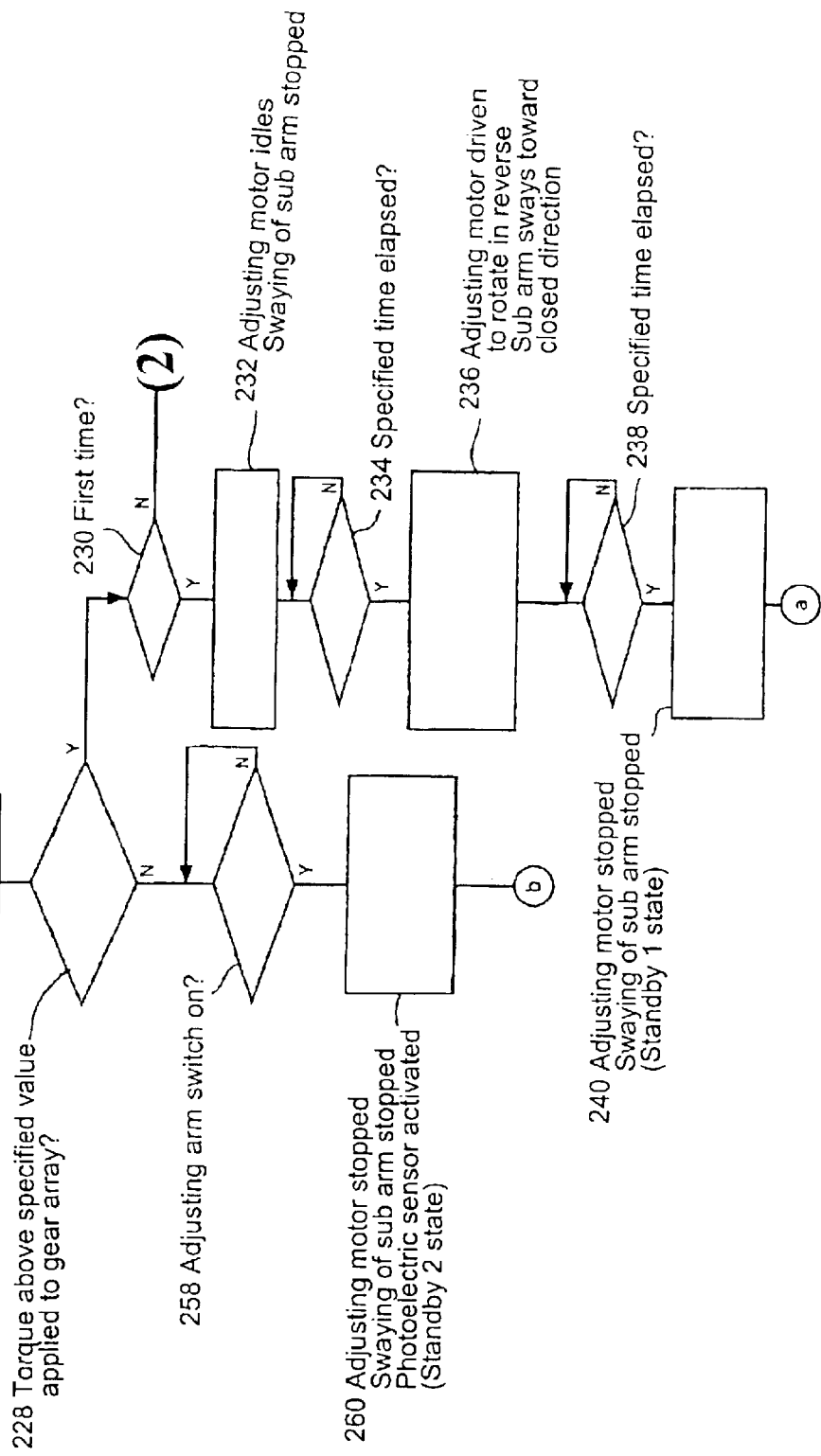
FIG. 22 is a flow chart showing the operation of the container holder pertaining to the present invention.
Figures 2, 22:
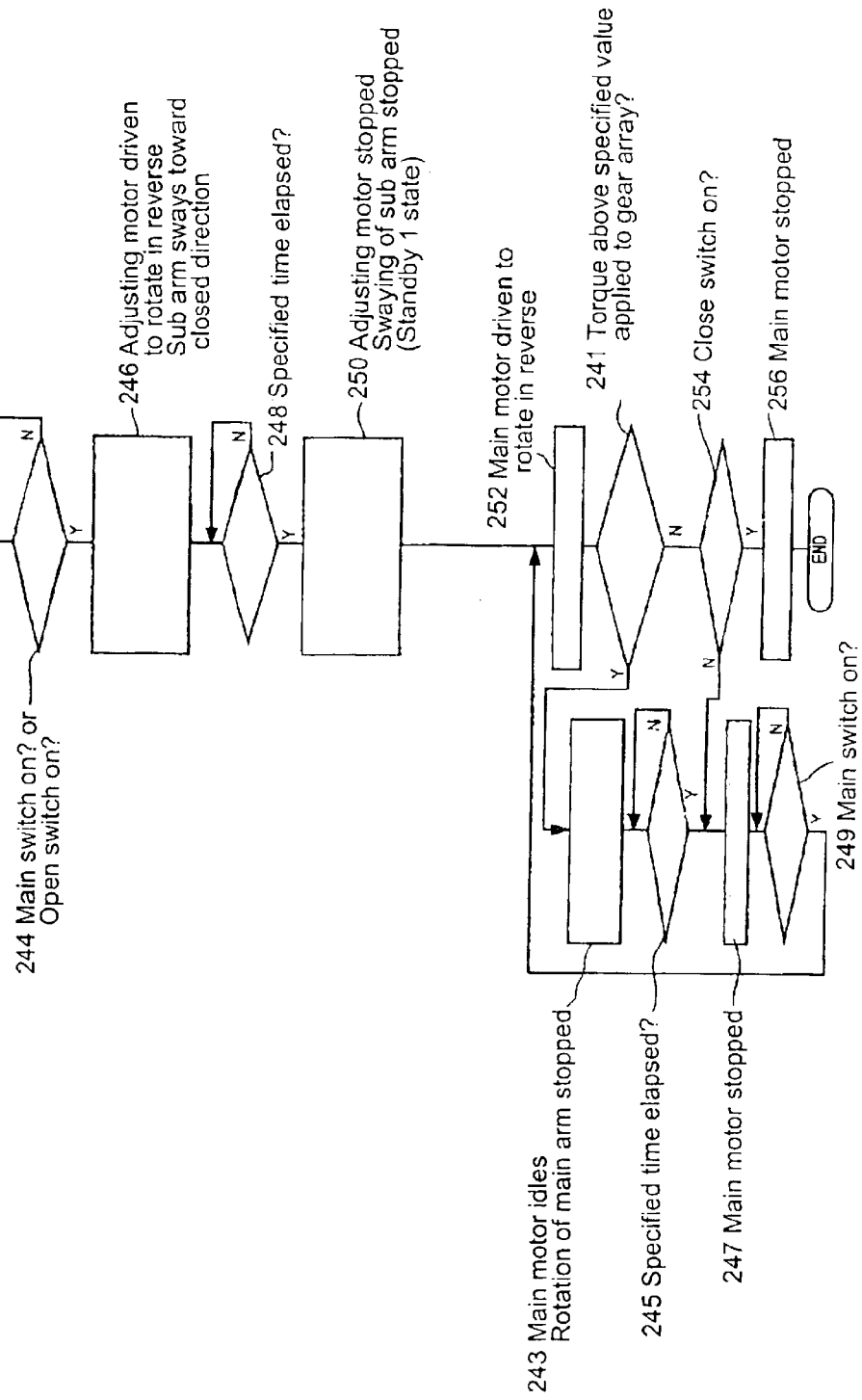
Figure 23:
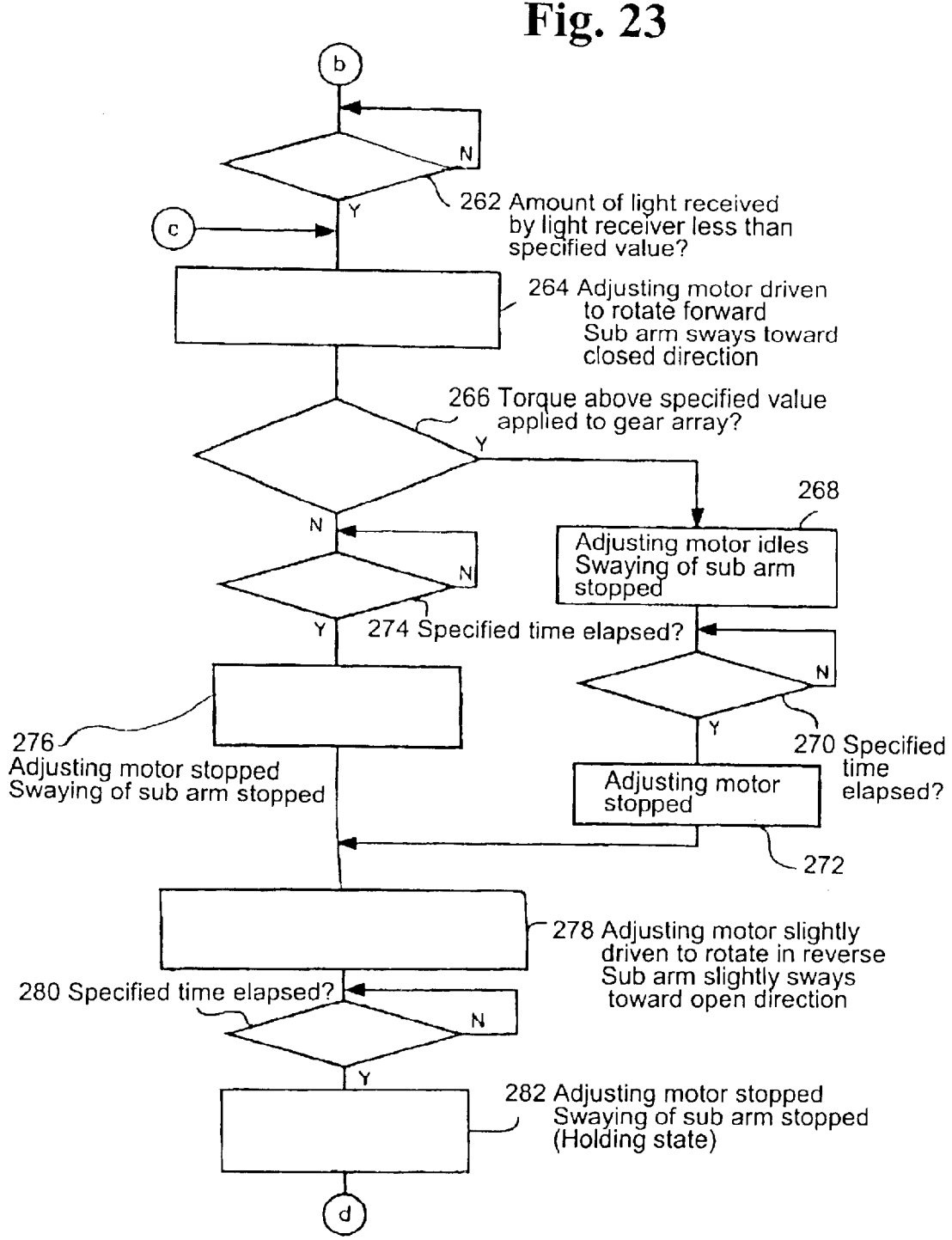
FIG. 23 is a flow chart showing the operation of the container holder pertaining to the present invention.
Figures 1, 24:
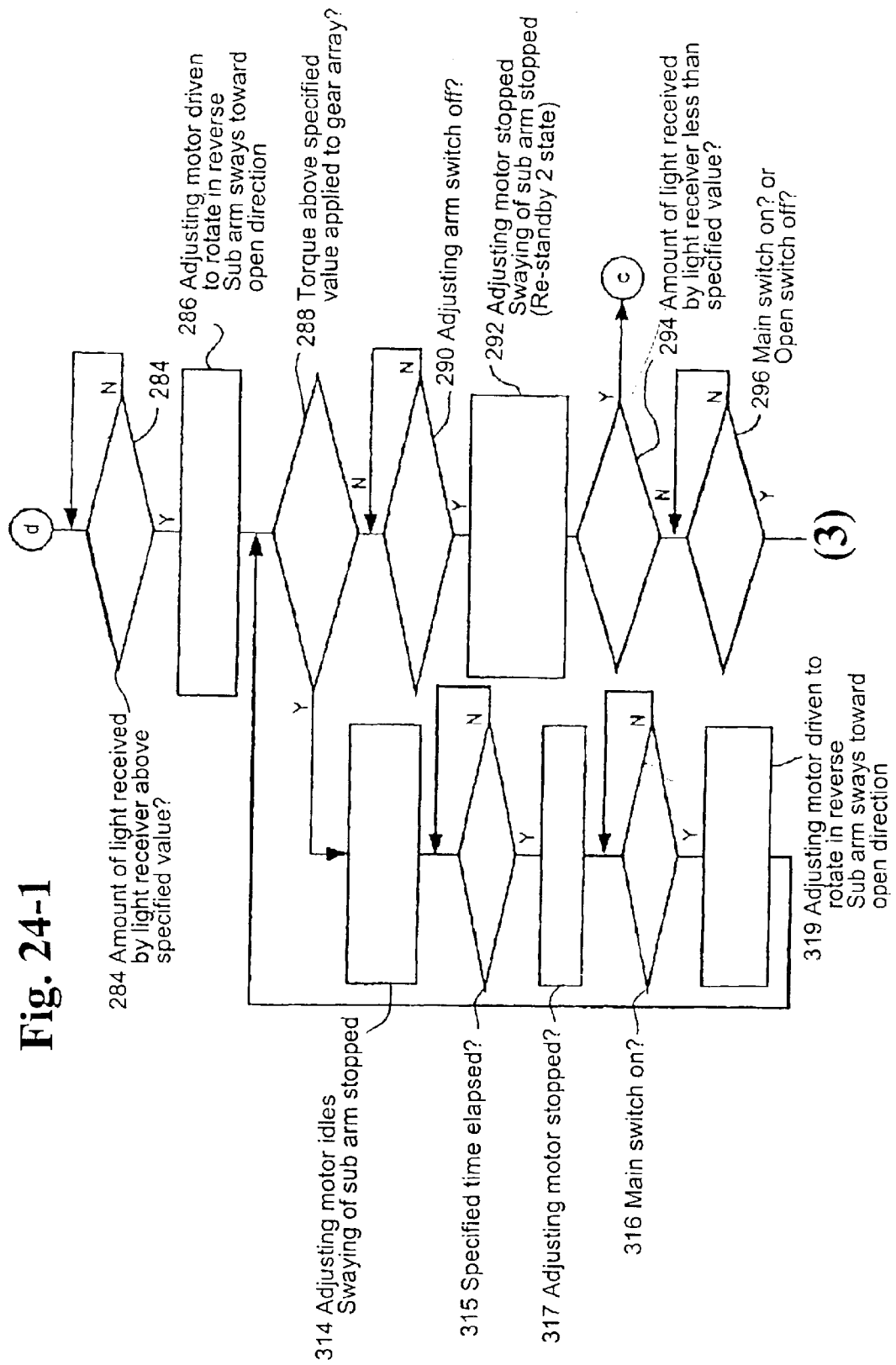
FIG. 24 is a flow chart showing the operation of the container holder pertaining to the present invention.
Figures 2, 24:
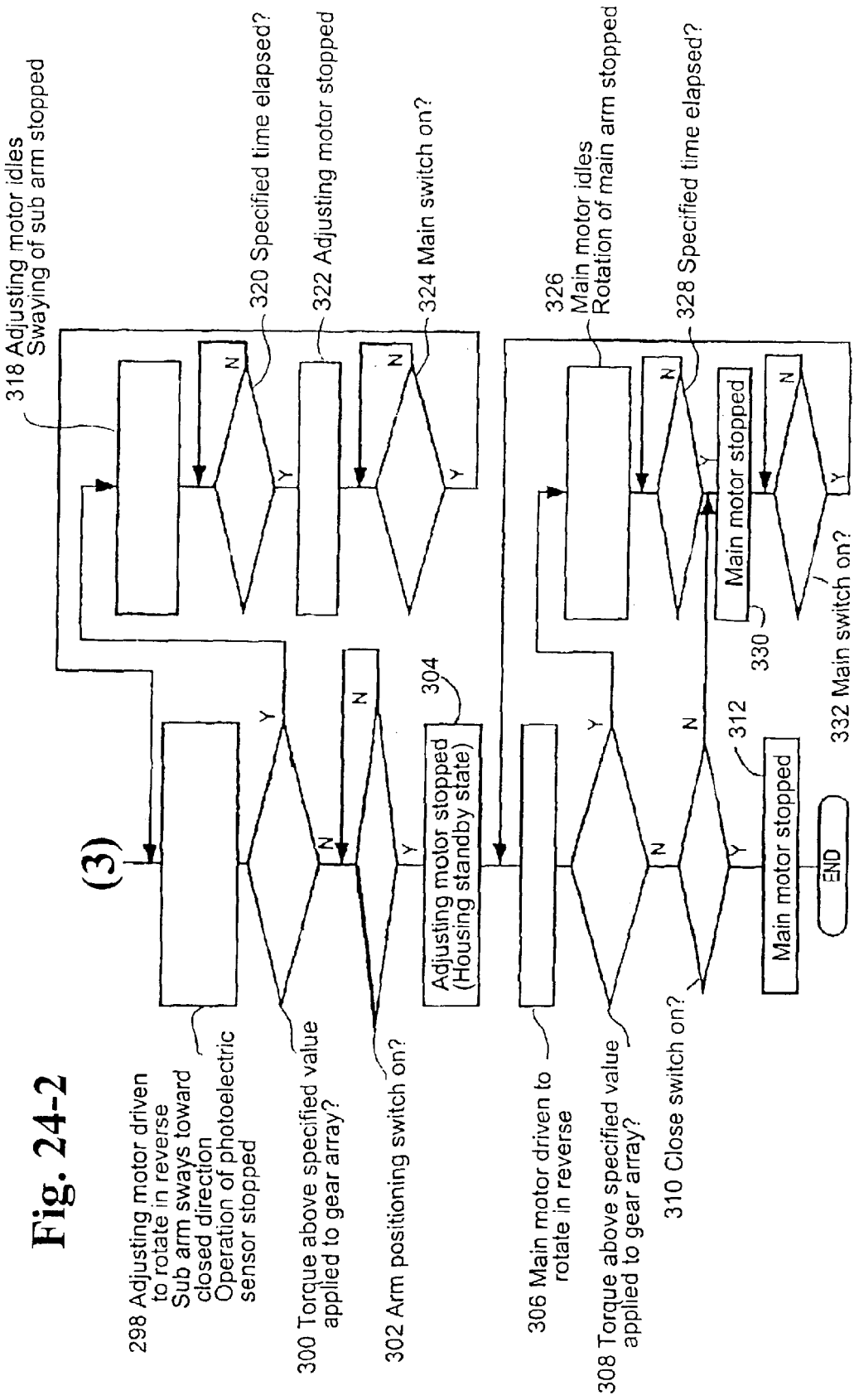

Here, when the sub arm 22 is in the closed state, as shown in FIG. 20, it is made such that the coupling part 114 of the sub arm 22 can sway toward the direction opposing the force of the torsion spring 110 following the cam wall 118, and sub arm 22 can be opened for a specified amount.

By this, even when a container forms a constriction by the outer perimeter, for example a cola bottle (not illustrated), the container can be easily removed by causing the sub arm 22 to sway in the direction opposing the force of the torsion spring 110.

Also, the front end of the adjusting plate 112 becomes capable of rotating upward on the adjusting arm 24. By this, in the case of a cola container, it can be made easier to remove the container not only by the swaying of the sub arm 22, but also by the rotation of the adjusting plate 112.

Meanwhile, as shown in FIG. 15, the adjusting plate 112 which is attached to the front end of the adjusting arm 24 is made to be able to contact with the perimeter wall of the container. Therefore, when the adjusting arm 24 and the adjusting plate 112 rotate via the adjusting base plate 58, the container contacts the holder 86.

Also, the cam wall 118 (see FIG. 17) is made such that the sub arm 22 can be opened and closed quickly with a slight stroke. By this, by quickly closing the sub arm 22 in the holding state, when the container 16 which is placed on the tray 18 is pushed against the holder 86 by the adjusting plate 112, by the fact that the container 16 is held by the sub arm 22 with the holder 86, the movement of the container 16 is assisted such that the container 16 does not turn or fall on the tray.

Incidentally, in the holding state, the main motor 28 is controlled so as not to be driven even if the main switch 92 is pressed, and when the main switch 92 is accidentally pressed regardless of the fact that the container 16 is placed on the tray 18, it is made such that there is no situation in which the main arm 20 is caused to rotate and the container 16 turns or falls on the tray.

Figure 16:
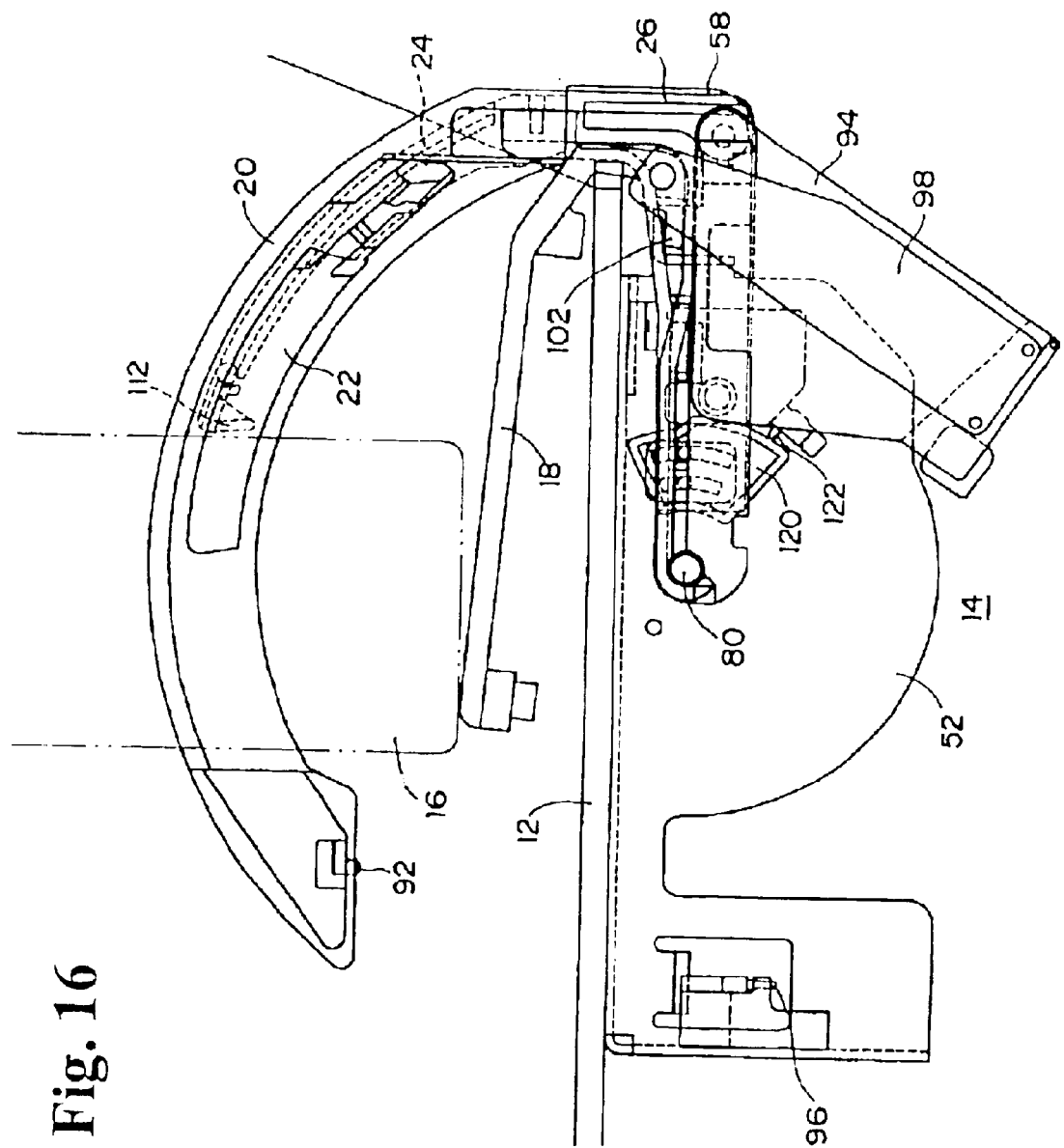
FIG. 16 is a generalized sectional view showing the operation of the container holder pertaining to the present invention, and it shows the state in which the container which was placed on the tray is being removed.

Meanwhile, when the container holder 10 is to be housed, the container 16 is removed from the container holder 10 and the tray 18 is restored to the original state. As shown in FIG. 16, the contact piece 102 of the tray 18 is separated from the tray switch 124, and the tray switch 124 turns off.

Also, in case the container holder 10 is to be housed, when the container is removed from the container holder 10, because the light projected by the light projector 134 is not blocked at the light receiver 136 on the right, the amount of received light by the light receiver 136 becomes above a specified value, and it is recognized that a container 16 is not placed between the light projector 134 and the light receiver 136.

Therefore, as shown in FIG. 2 and FIG. 13, the adjusting motor 60 (see FIG. 3) is driven to rotate in reverse and the sub arm 22 sways toward the open direction, and in addition, the adjusting plate 120 is separated from the adjusting arm switch 122 and the adjusting arm switch 122 turns off, and just as in the standby 2 state, it becomes such that the container 16 can be placed on the tray 18 (below, this state is called "re-standby 2 state").

When the main switch 92 is pressed in this re-standby 2 state, the operation of the photoelectric sensor 130 is stopped by the control means, and at the same time, the adjusting motor 60 (see FIG. 3) is driven to rotate in reverse, and as shown in FIG. 2 and FIG. 12, the sub arm 22 is caused to be closed by having removed the container 16.

Here, by rotating the adjusting base plate 58, the adjusting base plate 58 approaches the stand 94A of the assisting plate 94. An arm positioning switch 126 is provided on the underside of the adjusting base plate 58 such that the arm positioning switch 126 is pressed by the stand 94A in the state in which the adjusting base plate 58 has contacted with this stand 94A. When this arm positioning switch 126 is turned on, the adjusting motor 60 stops (below, this state is called "housing standby state").

Next, the main motor 28 (see FIG. 3) is driven to rotate in reverse, and as shown in FIG. 10, the main base plate 26 and the left and right adjusting base plates 58 rotate toward the direction to be housed inside the housing part 14.

As shown in FIG. 9, when the container holder 10 is housed inside the housing part 14, the pass-through slot 88 is closed by the cosmetic plate 90 which is installed on the front end of the main arm 20, and in addition, the assisting plate 94 contacts the close switch 96, and the close switch 96 is turned on. By this, the driving of the main motor 28 is stopped.

Next, the operation of the container holder pertaining to the present mode is explained following the flow charts shown in FIG. 21 to FIG. 24 and referring to FIG. 3.

As shown in FIG. 9, first, when the main switch 92 which is provided on the cosmetic plate 90 placed inside the vehicle compartment is pressed, in step 200, it is recognized by a control device not illustrated that the main switch 92 was turned on.

By this, in step 202, the main motor 28 is driven to rotate forward. Therefore, the planetary gear 50 shown in FIG. 4 revolves around the fixed gear 56 and the main base plate 26 rotates, and in addition, the planetary gears 78 revolve by the adjusting gears 82 via the main base plate 26 and the adjusting base plates 58 rotate, and as shown in FIG. 11, the main arm 20, trays 18, and adjusting arms 24 rotate and they appear inside the vehicle compartment.

Next, in step 204, it is determined as to whether or not torque above a specified value was applied to the gear array 40, and when the torque above the specified value was applied to the gear array 40 via the main arm 20 and the main base plate 26, such as when there is an obstacle on the movement track of the main arm 20, in step 206, it is determined as to whether or not the number of times in which torque above the specified value was applied to the gear array 40 in the course of step 200 to step 204 is one time (it was defined as one time in the present embodiment, but the number of times can be freely set).

When the number of times in which torque above the specified value was applied to the gear array 40 in the course of step 200 to step 204 is one time, in step 208, the main motor 28 idles and the rotation of the main arm 20 is stopped via the main base plate 26. Also, in step 210, when it is determined that the specified time has elapsed, in step 216, the main motor 28 is driven to rotate in reverse.

By this, the main arm 20, trays 18, adjusting base plates 58, and adjusting arms 24 rotate toward the housing direction via the main base plate 26, the container holder 10 which is constituted by the main arm 20, and the like, is housed (see FIG. 9), and the close switch 96 which is disposed on the base box 52 is pressed by the assisting plate 94.

Also, in step 218, when it is recognized that the close switch 96 was turned on, in step 220, the driving of the main motor 28 is stopped and the operation ends.

On the other hand, when the number of times in which torque above the specified value was applied to the gear array 40 in the course of step 200 to step 204 is two times, in step 212, the driving of the main motor 28 is stopped. By this, the rotation of the container holder 10 is stopped via the main base plate 26.

In this state, the main switch 92 is pressed, and in step 214, when it is recognized that the main switch 92 was turned on, in step 216, the main motor 28 is driven to rotate in reverse, and in step 218, when it is recognized that the close switch 96 was turned on, the container holder 10 is housed (see FIG. 9). Here, in step 218, when it is not recognized that the close switch 96 was turned on, the flow is moved to the operations from step 212.

On the other hand, before the housing state shown in FIG. 9, in step 211, when torque above the specified value was applied to the gear array 40, in step 213, the main motor 28 idles. By this, the main arm 20 and the like rotate via the main base plate 26.

Also, in step 215, when it is recognized that the specified time has elapsed, in step 217, the main motor 28 is stopped, and in this state, when the main switch 92 is pressed, in step 219, it is recognized that the main switch 92 was turned on, and it becomes in the housing standby state shown in FIG. 12. Also, the flow is moved to the operations from step 216, and the container holder 10 is housed inside the housing part 14 (see FIG. 9).

Incidentally, when the main motor 28 is being driven to rotate forward and when the operation was performed normally without application of torque above the specified value to the gear array 40, in the course that the main arm 20, trays 18, adjusting base plates 58, and adjusting arms 24 rotate via the main base plate 26, the contact pieces 102 which are formed on the base parts of the trays 18 contact the protruding pieces 104 of the base box 52.

By this, as shown in FIG. 12, the trays 18 rotate around the shafts 100 together with the rotations of the sub assisting plates 98, the trays 18 are placed beneath the main arm 20 in the state in which they are placed inside the vehicle compartment, and placement of a container 16 becomes possible.

At this time, the open switch 108 which is disposed on the upper surface of the main base plate 26 is pressed by contacting with the ceiling surface 52B of the base box 52. This open switch 108 is pressed, and in step 222, when it is recognized that it was turned on, in step 224, the driving of the main motor 28 is stopped.

By this, the rotations of the main arm 20, trays 18, adjusting base plates 58, and adjusting arms 24 are stopped via the main base plate 26. In this state, the container holder 10 is placed at the specified position inside the vehicle compartment. Also, at this time, the sub arms 22 are in the closed state (standby 1 state).

Next, in step 226, the adjusting motors 60 are driven to rotate forward. By this, as shown in FIG. 13, FIG. 17, and FIG. 18, the adjusting base plates 58 rotate, and the sub arms 22 are caused to sway toward the open direction by the cam walls 118 which are formed on the adjusting arms 24.

Also, in step 228, it is determined as to whether or not torque above the specified value was applied to the gear arrays 72, and when torque above the specified value was applied to the gear arrays 72 via the adjusting arms 24, in step 230, it is determined as to whether or not the number of times in which the torque above the specified value was applied to the gear arrays 72 in the course of step 226 to step 228 is one time (it is one time in the present embodiment, but the number of times can be freely set).

When the number of times in which the torque above the specified value was applied to the gear arrays 72 in the course of step 226 to step 228 is one time, in step 232, the adjusting motors 60 idle, and the swaying of the sub arms 22 is stopped via the adjusting base plates 58 and the adjusting arms 24.

Also, in step 234, when it is determined that a specified time has elapsed, in step 236, the adjusting motors 60 are driven to rotate in reverse, and the sub arms 22 are caused to sway toward the closing direction.

Next, in step 238, when it is determined that the specified time has elapsed, in step 240, the adjusting motors 60 are stopped, the swaying of the sub arms 22 is stopped, and it returns to the standby 1 state (see FIG. 12). By this, the operations from step 226 are performed again.

On the other hand, when the number of times in which torque above the specified value was applied to the gear arrays 72 in the course of step 226 to step 228 is two times, in step 242, the driving of the adjusting motors 60 are stopped.

By this, the swaying of the sub arms 22 is stopped via the adjusting base plates 58 and the adjusting arms 24. In this state, when the main switch 92 is pressed, in step 244, it is recognized that the main switch 92 was turned on, and in step 246, the adjusting motors 60 are driven to rotate in reverse, and the sub arms 22 sway toward the closing directions.

Here, in the standby 1 state (see FIG. 12), when the main arm 20 is pressed toward the housing direction for convenience, the main base plate 26 becomes capable of some swaying toward the housing direction via the main arm 20. By this, the open switch 108 which is disposed on the upper surface of the main base plate 26 may be separated from the ceiling surface 52B of the base box 52 and the open switch 108 may be turned off.

Therefore, in step 244, in addition to being recognized that the main switch 92 was turned on, when it is recognized that the open switch 108 was turned off, in step 246, the adjusting motors 60 are driven to rotate in reverse, and the sub arms 22 sway toward the closing directions.

Next, in step 248, when it is determined that the specified time has elapsed, in step 250, the driving of the adjusting motors 60 is stopped, the swaying of the sub arms 22 is stopped, and it returns to the standby 1 state for the time (see FIG. 12).

Next, in step 252, the main motor 28 is driven to rotate in reverse, and the main arm 20, trays 18, adjusting base plates 58, and adjusting arms 24 rotate toward the housing direction via the main base plate 26. By this, as shown in FIG. 9, the container holder 10 is housed and the close switch 96 is pressed by the assisting plate 94, and in step 254, when it is recognized that the close switch 96 was turned on, in step 256, the driving of the main motor 28 is stopped and the operation ends.

Here, before the housing state, in step 241, when torque above the specified value was applied to the gear array 40, in step 243, the main motor 28 idles. By this, the rotation of the main arm 20, and the like, is stopped via the main base plate 26.

Also, in step 245, when it is determined that the specified time has elapsed, in step 247, the main motor 28 is stopped. In this state, when the main switch 92 is pressed, in step 249, it is recognized that the main switch 92 was turned on, it becomes in the housing standby state shown in FIG. 12, the flow is moved to the operations from step 252, and the container holder 10 is housed inside the housing part 14 (see FIG. 9).

Here, in step 254, when it is not recognized that the close switch 96 was turned on, the main motor 28 is stopped by step 247, and when it is recognized by step 249 that the close switch 96 was turned on, the flow is moved to the operations from step 252.

On the other hand, when the adjusting motors 60 are being driven to rotate forward and when the operation was performed normally without torque above the specified value being applied to the gear arrays 72, as shown in FIG. 13 and FIG. 18, the sub arms 22 become completely open via the adjusting base plates 58 and the adjusting arms 24, and the adjusting plates 120 which are attached to the adjusting base plates 58 contact with the adjusting arm switches 122 which are fixed to the inner walls of the base box 52.

Also, in step 258, when it is recognized that these adjusting arm switches 122 were turned on, in step 260, the driving of the adjusting motors 60 is stopped and the swaying of the sub arms 22 is stopped in the completely open state, and in addition, the light projectors 134 (see FIG. 6) and the light receivers 136 (see FIG. 6) which constitute the photoelectric sensors 130 are activated, i.e. standby 2 state.

Figure 6:
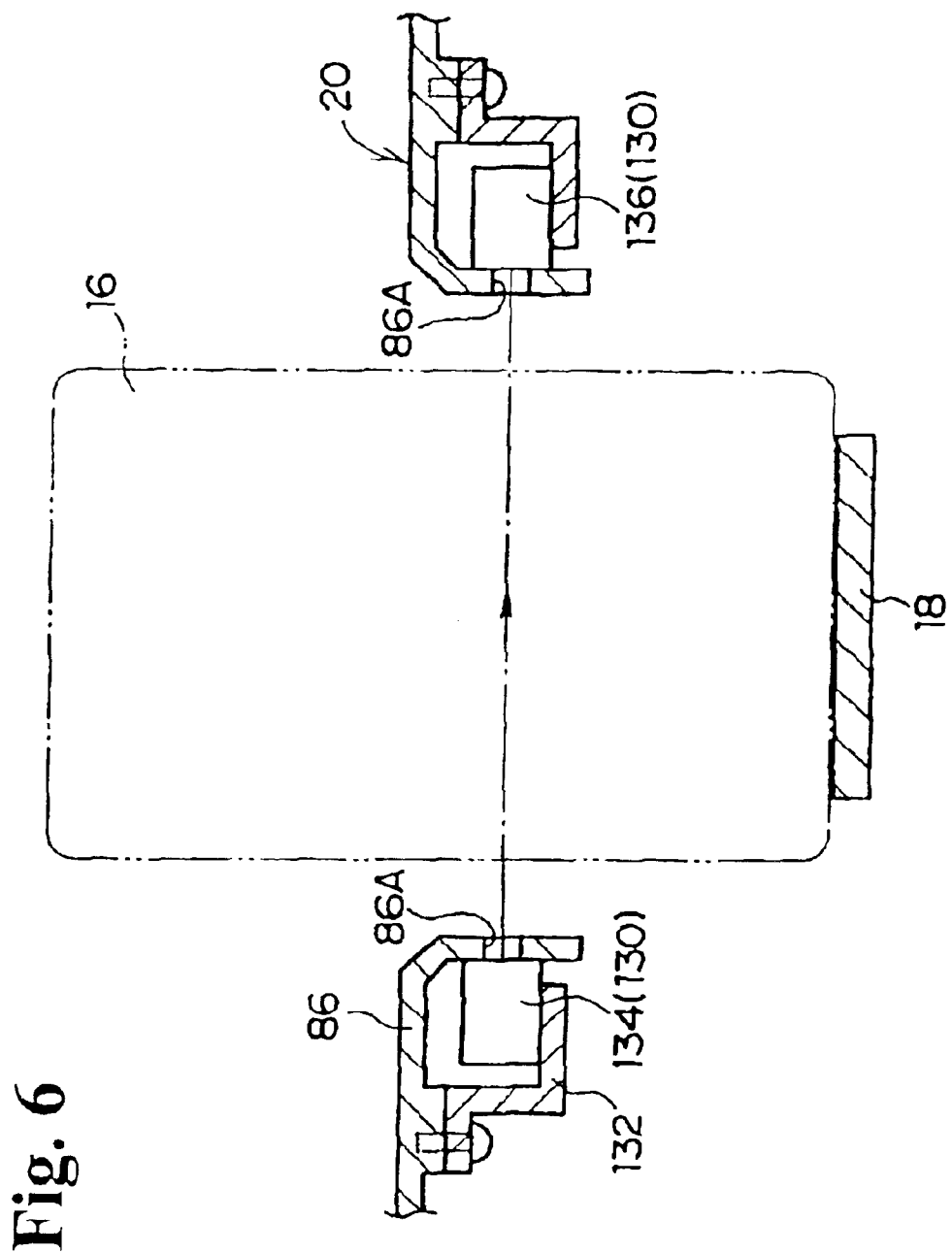
FIG. 6 is a generalized sectional view showing the state in which a photoelectric sensor is disposed in the container holder pertaining to the present invention.

Next, as shown in FIG. 6 and FIG. 14, when the container 16 is placed on the tray 18, the light projected from the light projector 134 is blocked by the container 16, and when it is determined by step 262 that the amount of light received by the light receiver 136 is less than a specified value, in step 264, the adjusting motor 60 is further driven to rotate forward (see FIG. 15).

Or, when the container 16 is placed on the tray 18, the tray 18 sinks by the weight of the container 16, and the tray switch 124 which is disposed on the main base plate 26 is pressed by the contact piece 102 which is placed on the side of the tray 18 which has sunk.

Also, when it is recognized by step 262 that the tray switch 124 was turned on, in step 264, the adjusting motor 60 is further driven to rotate forward (see FIG. 15).

By this, the planetary gear 78 shown in FIG. 4 revolves around the adjusting gear 82, the rotation of which is stopped via the main base plate 26, the adjusting arm 24 rotates via the adjusting base plate 58 on which the planetary gear 78 is fixed, and the sub arm 22 sways toward the closing direction (see FIG. 19).

Also, in step 266, in the course of step 262 to step 266, when torque above the specified value was applied to the gear array 72 such as when the adjusting plate 112 which is attached to the front end of the adjusting arm 24 has come to contact with the container 16 which was placed on the tray 18, in step 268, the adjusting motor 60 idles, and the swaying of the sub arm 22 is stopped via the adjusting base plate 58 and the adjusting arm 24.

Next, in step 270, when it is determined that the specified time has elapsed, in step 272, the driving of the adjusting motor 60 is stopped, and in step 278, the adjusting motor 60 is slightly driven to rotate in reverse. By this, the sub arm 22 slightly sways toward the open direction, and in addition, the adjusting arm 24 slightly returns toward the housing direction. In step 280, when it is determined that the specified time has elapsed, in step 282, the driving of the adjusting motor 60 is stopped, the swaying of the sub arm 22 is stopped, and in addition, the rotation of the adjusting arm 24 is stopped (holding state).

Here, in step 278, by slightly driving the adjusting motor 60 to rotate in reverse and slightly returning the adjusting arm 24 toward the housing direction, when removing the container 16 which is held between the holder 86 and the adjusting plate 112, the container 16 can be taken out easily.

Also, in the holding state, when the main switch 92 is accidentally pressed regardless of the fact that the container 16 is being held on the tray 18, the main motor 28 is controlled so as not to be driven, so that the main arm does not rotate 20, and the placed container 16 does not turn over.

On the other hand, in case the adjusting motor 60 is being driven to rotate forward and the operation was performed normally without applying above specified torque to the gear array 72, in step 274, when it is determined that a specified time has elapsed, in step 276, the driving of the adjusting motor 60 is stopped, the swaying of the sub arm 22 is stopped, and in addition, the rotation of the adjusting arm 24 is stopped. Also, through steps 278 to 282, the container holder 10 becomes in the holding state.

Here, the specified time in step 274 is set as the time until the sub arm 22 contacts the container 16, imagining the container having the narrowest external dimensional measurement (not illustrated) among the containers 16 to be held by this container holder 10.

Also, in the case of a container that is thicker than this container (not illustrated), when the adjusting plate 112 contacts the container, in step 266, it becomes that torque above a specified value is applied to the gear array 72 via the adjusting plate 112. By this, the force to hold the container 16 by the holder 86 and the adjusting plate 112 becomes roughly equal.

As shown in FIG. 16, when the container 16 which was placed on the tray 18 is removed, in step 284, it is recognized that the tray switch 124 was turned off, and in step 286, the adjusting motor 60 is driven to rotate in reverse.

Or, as shown in FIG. 16, when the container 16 which was placed on the tray 18 is removed, the light projected from the light projector 134 (see FIG. 6) is received without being changed by the light receiver 136 (see FIG. 6), and in step 284, when it is determined that the amount of light received by the light receiver 136 is above the specified value, in step 286, the adjusting motor 60 is driven to rotate in reverse. By this, as shown in FIG. 3 and FIG. 18, the sub arm 22 sways toward the open direction via the adjusting base plate 58 and the adjusting arm 24.

Also, in step 288, it is determined as to whether or not torque above the specified value was applied to the gear array 72 in the course of step 286 to step 288, and when the operation was performed normally without torque above the specified value being applied to the gear array 72, the adjusting plate 120 which is attached to the adjusting base plate 58 is separated from the adjusting arm switch 122 which is fixed on the base box 52, and the adjusting arm switch 122 is turned off.

Next, in step 290, when it is recognized that the adjusting arm switch 122 was turned off, in step 292, the driving of the adjusting motor 60 is stopped, and the swaying of the sub arm 22 is stopped (re-standby 2 state).

In this re-standby 2 state (see FIG. 14 and FIG. 15), when the container 16 is placed back on the tray 18, the tray switch 124 is pressed by the contact piece 102, and when it is recognized by step 294 that the tray switch 124 was turned on, the flow moves to the operations from step 264.

On the other hand, in the re-standby 2 state, when the container 16 is not placed on the tray 18, because the tray switch 124 is turned off, in step 294, it is recognized that the tray switch 124 is not on.

Or, in this re-standby 2 state (see FIG. 6, FIG. 14, and FIG. 15), when the container 16 is placed back on the tray 18, the light projected from the light projector 134 is blocked by the container 16, and when it is determined by step 294 that the amount of light received by the light receiver 136 is less than the specified value, the flow moves to the operations from step 264.

On the other hand, in the re-standby 2 state, when the container 16 is not placed on the tray 18, the light projected from the light projector 134 is received without being changed by the light receiver 136, and in step 294, it is determined that the amount of light received by the light receiver 136 is less than the specified value.

In this state, when the main switch 92 is pressed and it is recognized by step 296 that the main switch 92 was turned on, in step 298, the adjusting motors 60 are driven to rotate in reverse. By this, as shown in FIG. 12, the sub arms 22 sway toward the closing directions together with the rotations of the adjusting arms 24. Also, at this time, the operations of the light projectors 134 and the light receivers 136 which constitute the photoelectric sensors 130 are stopped.

Here, in the re-standby 2 state as well, just as in the standby 1 state, when the main arm 20 is pressed toward the housing direction, the open switch 108 may become turned off. Therefore, in step 296, in addition to being recognized that the main switch 92 was turned on, when it is recognized that the open switch 108 was turned off, in step 298, the adjusting motors 60 are driven to rotate in reverse, and the sub arms 22 sway toward the closing direction.

Also, in step 300, it is determined as to whether or not torque above the specified value was applied to the gear arrays 72, and when the operation was performed normally without applying torque above the specified value to the gear arrays 72, as shown in FIG. 12, the arm positioning switches 126 which are provided on the adjusting base plates 58 are pressed by the stands 94A of the assisting plate 94.

By this, when it is recognized by step 302 that the arm positioning switches 126 were turned on, in step 304, the adjusting motors 60 are stopped (housing standby state).

Also, in step 306, the main motor 28 is driven to rotate in reverse, and as shown in FIG. 10, the main arm 20, trays 18, adjusting base plates 58, and adjusting arms 24 rotate toward the housing direction via the main base plate 26.

At this time, in step 308, it is determined as to whether or not torque above the specified value was applied to the gear array 40, and when the operation was performed normally without applying torque above the specified value to the gear array 40, as shown in FIG. 9, the container holder 10 is housed, and the close switch 96 is pressed by the assisting plate 94.

Next, in step 310, when it is recognized that the close switch 96 was turned on, in step 312, the driving of the main motor 28 is turned off and the operation ends. Here, in step 310, when it is not recognized that the close switch 96 was turned on, the main motor 28 is stopped by step 330, and when it is recognized by step 332 that the close switch 96 was turned on, the flow is moved to the operations from step 306.

On the other hand, in step 288, as shown in FIG. 16, when torque above the specified value was applied to the gear array 72 after the container 16 which was placed on the tray 18 was removed, in step 314, the adjusting motor 60 idles, and the swaying of the sub arm 22 toward the open direction is stopped.

Also, in step 315, when it is determined that the specified time has elapsed, in step 317, the driving of the adjusting motor 60 is stopped. In case the main switch 92 is pressed in this state, in step 316, when it is recognized that the main switch 92 was turned on, in step 319, the adjusting motor 60 is driven to rotate in reverse. By this, as shown in FIG. 13 and FIG. 18, the sub arm 22 sways toward the open direction via the adjusting base plate 58 and the adjusting arm 24.

Also, before it comes to the housing standby state shown in FIG. 12, in step 300, when torque above the specified value was applied to the gear array 72, in step 318, the adjusting motor 60 idles, and the swaying of the sub arm 22 toward the closing direction is stopped. Also, in step 320, when it is determined that the specified time has elapsed, in step 322, the driving of the adjusting motor 60 is stopped.

The main switch 92 is pressed in this state, and in step 324, when it is recognized that the main switch 92 was turned on, it becomes in the housing standby state, and the flow is moved to the operations from step 298.

Furthermore, before it comes to the housing state shown in FIG. 9, in step 308, when torque above the specified value was applied to the gear array 40, in step 326, the main motor 28 idles. By this, the rotation of the main arm 20, and the like, is stopped via the main base plate 26.

Also, in step 328, when it is determined that the specified time has elapsed, in step 330, the main motor 28 is stopped. In this state, when the main switch 92 is pressed, in step 332, it is recognized that the main switch 92 was turned on, it comes to the housing standby state shown in FIG. 12, the flow is moved to the operations from step 306, and the container holder 10 is housed inside the housing part 14 (see FIG. 9).

According to the construction as above, by controlling such that determination is made as to whether or not torque above the specified value is applied to the gear arrays 40 and 72 for each operation, safety is ensured such that the container holder 10 is not forcefully pushed out. Also, since torque above the necessary value is not applied to the gear arrays 40 and 72 in this manner, damage to the container holder 10 is prevented and the life can be made longer.

Also, by controlling by the control device such that the main arm 20 is stopped when torque above the specified value is applied two or more times to the gear array 40 during the period before the main arm 20 moves to the specified position inside the vehicle compartment, the main motor 28 as the second driving means ca be prevented from continuing to rotate.

Figure 25:
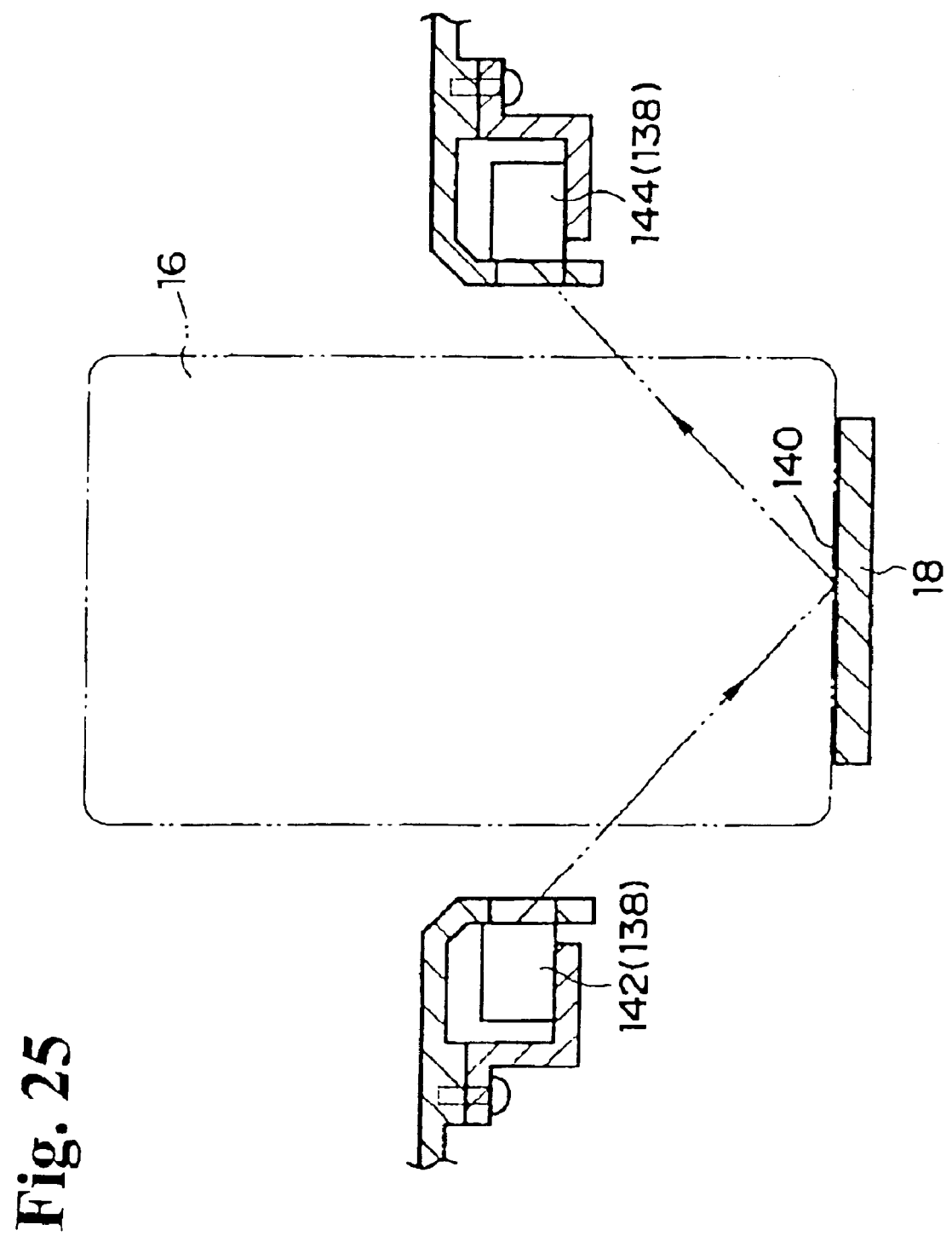
FIG. 25 is a generalized sectional view showing another example of a photoelectric sensor disposed in the container holder pertaining to the present invention.

Here, the presence or absence of the container 16 on the tray 18 was sensed as shown in FIG. 6 by using the projection type photoelectric sensor 130, but the method of disposing of the photoelectric sensor 130 is not limited to this. For example, as shown in FIG. 25, it also may be made such that a reflective plate 140 is placed on the tray 18, the light emitting element or the light receiving element (respectively not illustrated) of the light projector 142 and the light receiver 144 are disposed to face the reflective plate, and the light projected from the light projector 142 is reflected by the reflective plate 140 and is received by the light receiver 144. By this, the distance that the light travels is made longer, and even if it is a highly transparent container 16, the transmissivity can be lowered and the amount of light received by the light receiver 144 can be decreased. Also, it is not limited to the transmission type photoelectric sensor, and a reflection type photoelectric sensor also may be used.

Figure 26:
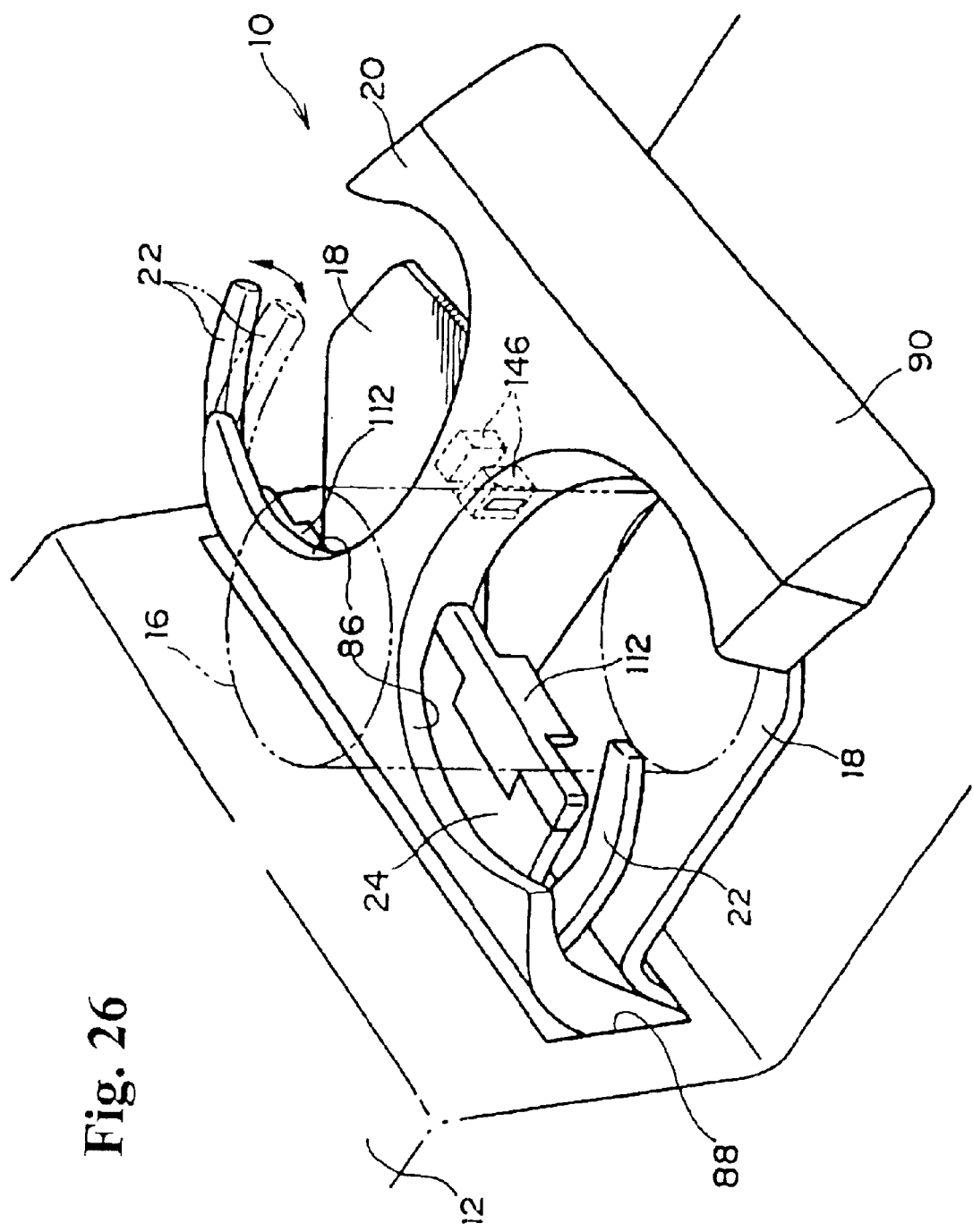
FIG. 26 is a perspective view showing the state in which an ultrasonic sensor is disposed in the container holder pertaining to the present invention.
Figure 27:
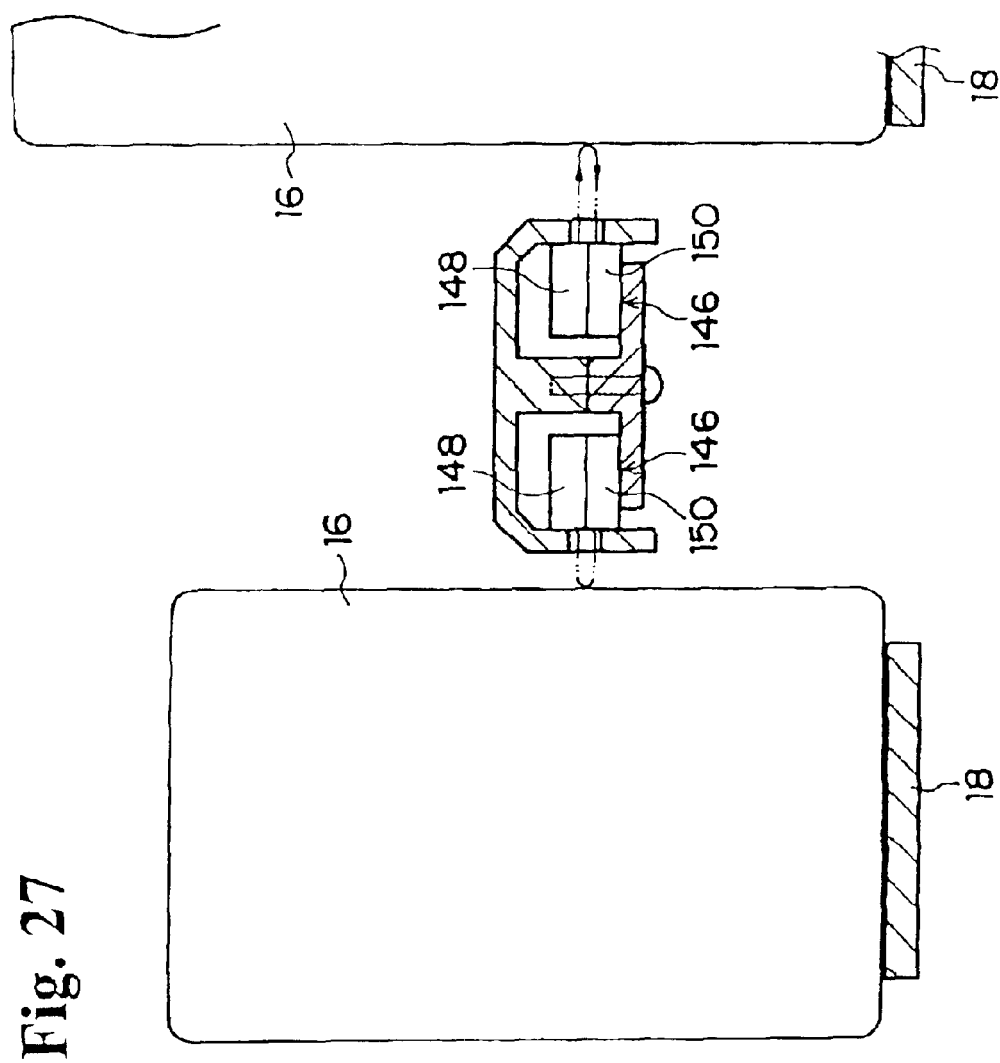
FIG. 27 is a generalized sectional view showing the state in which the ultrasonic sensor is disposed in the container holder pertaining to the present invention.
Figure 28:
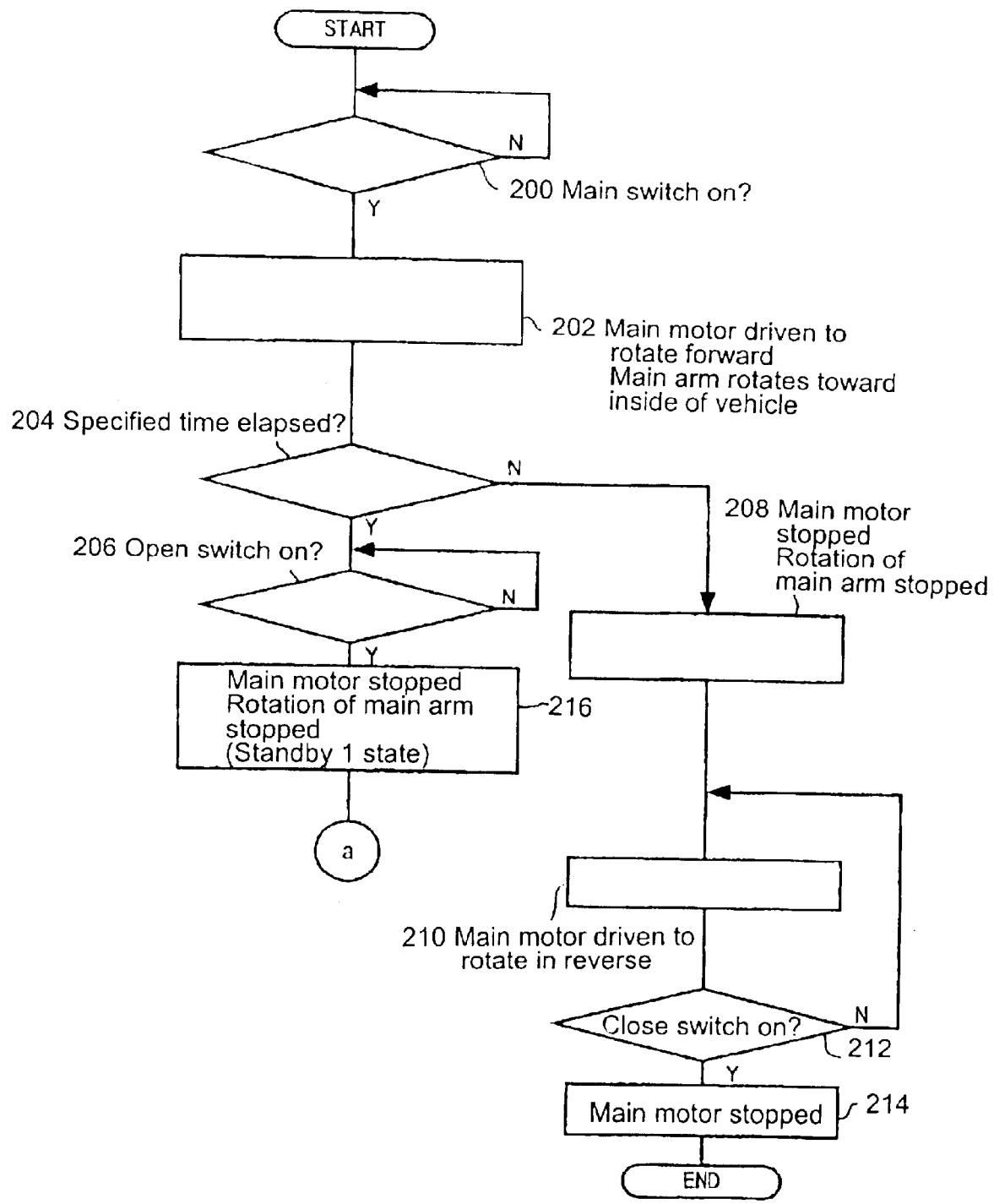
FIG. 28 is a flow chart showing the operation of the container holder in which the drawer device pertaining to the present invention is applied.
Figures 1, 29:
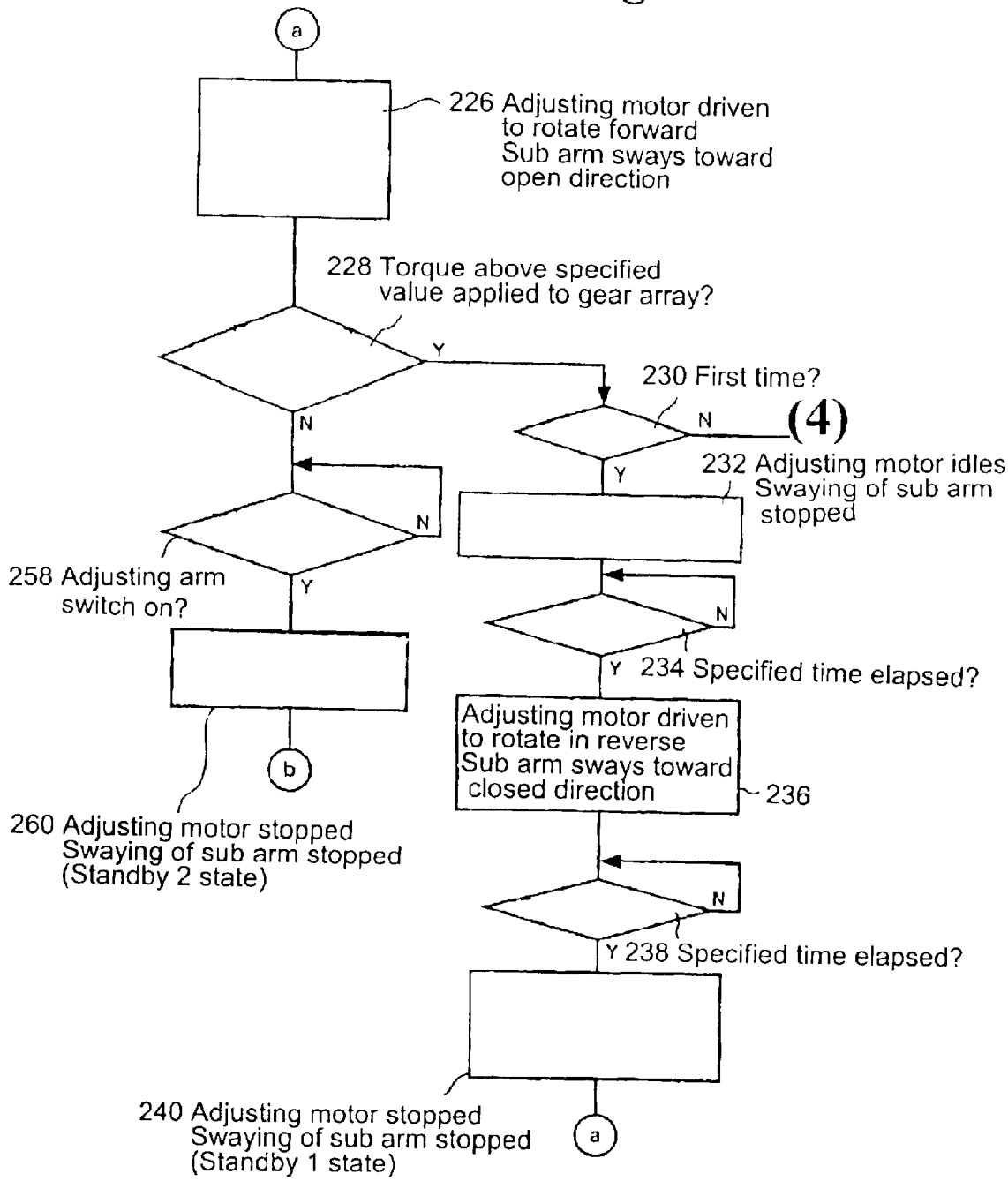
FIG. 29 is a flow chart showing the operation of the container holder in which the drawer device pertaining to the present invention is applied.
Figures 2, 29:
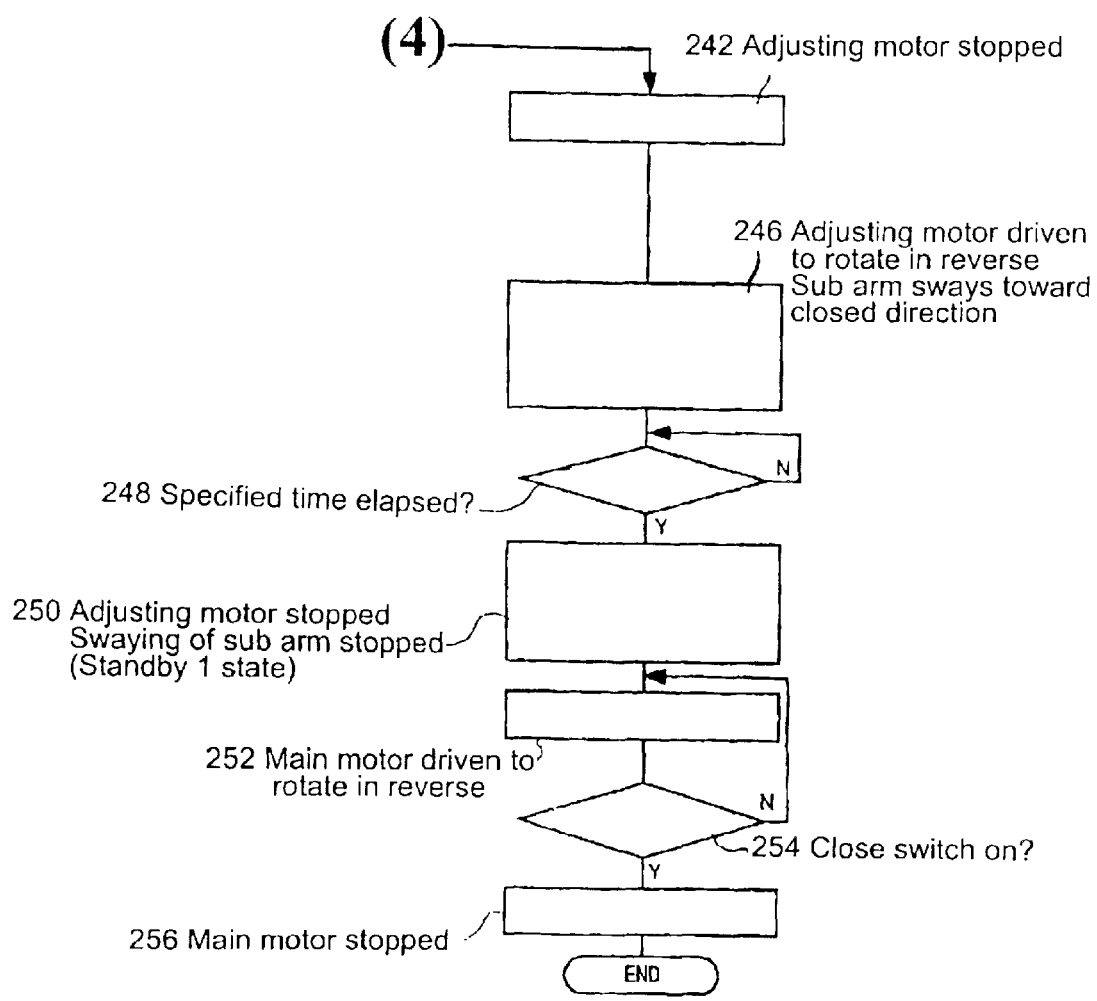
Figure 30:
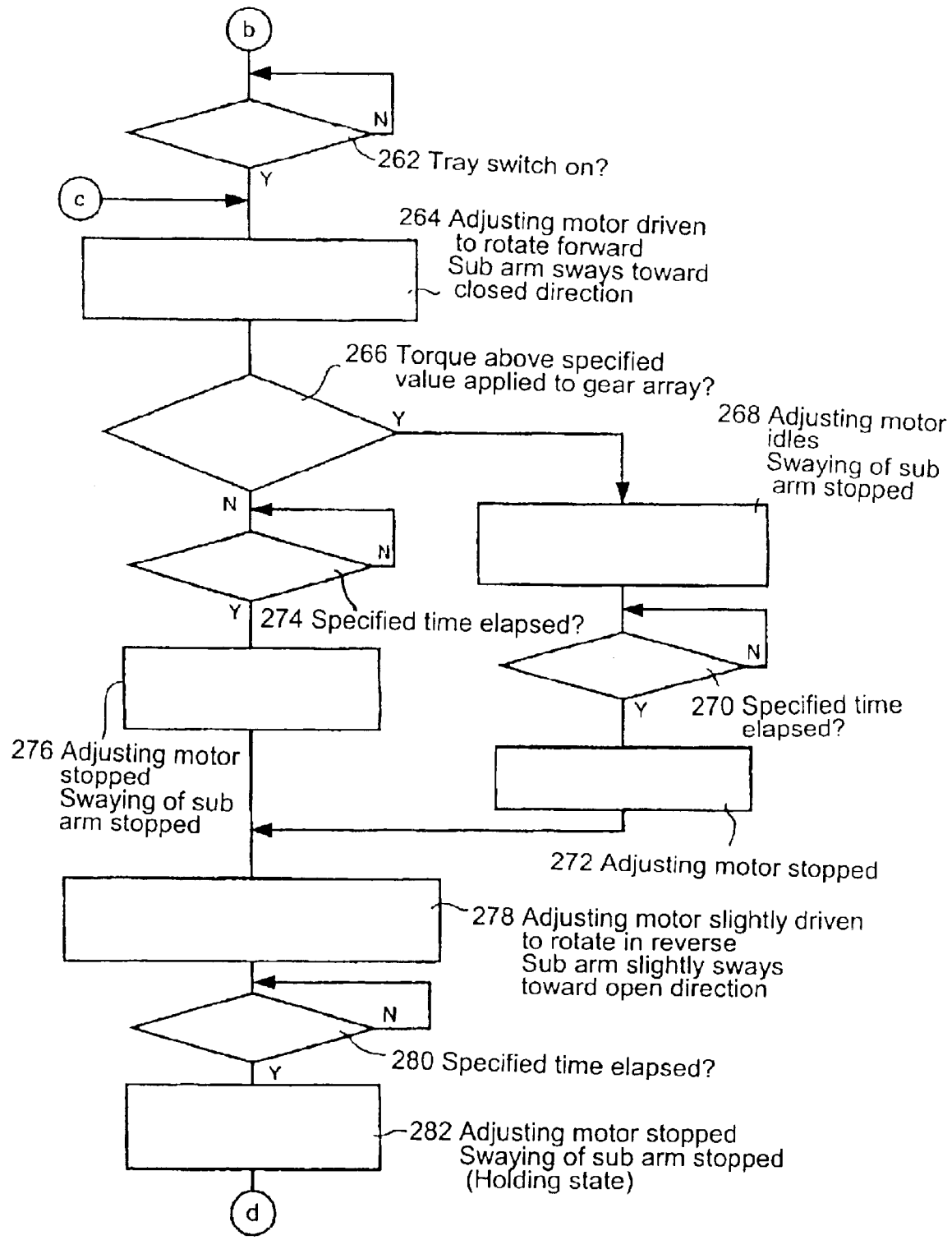
FIG. 30 is a flow chart showing the operation of the container holder in which the drawer device pertaining to the present invention is applied.
Figures 1, 31:
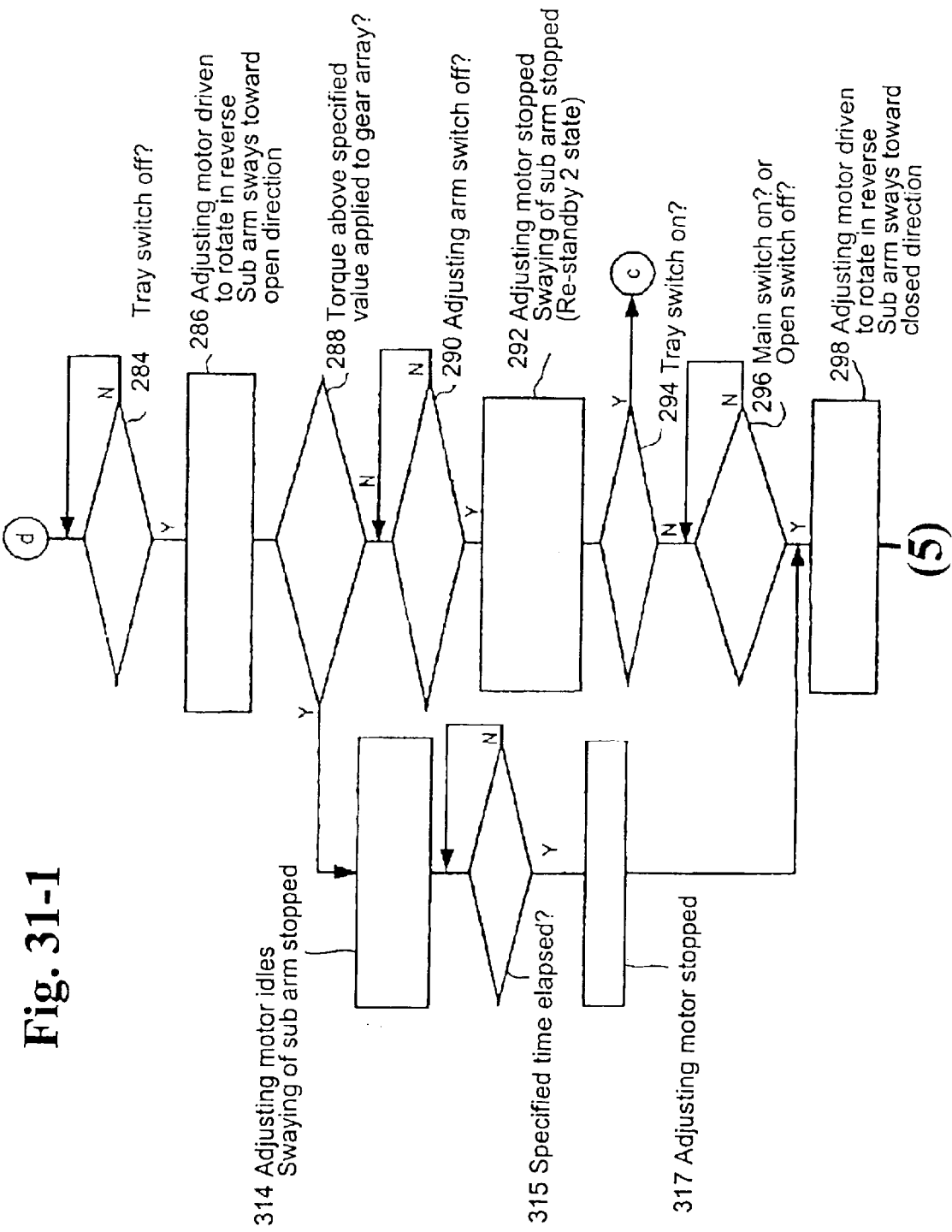
FIG. 31 is a flow chart showing the operation of the container holder in which the drawer device pertaining to the present invention is applied.
Figures 2, 31:
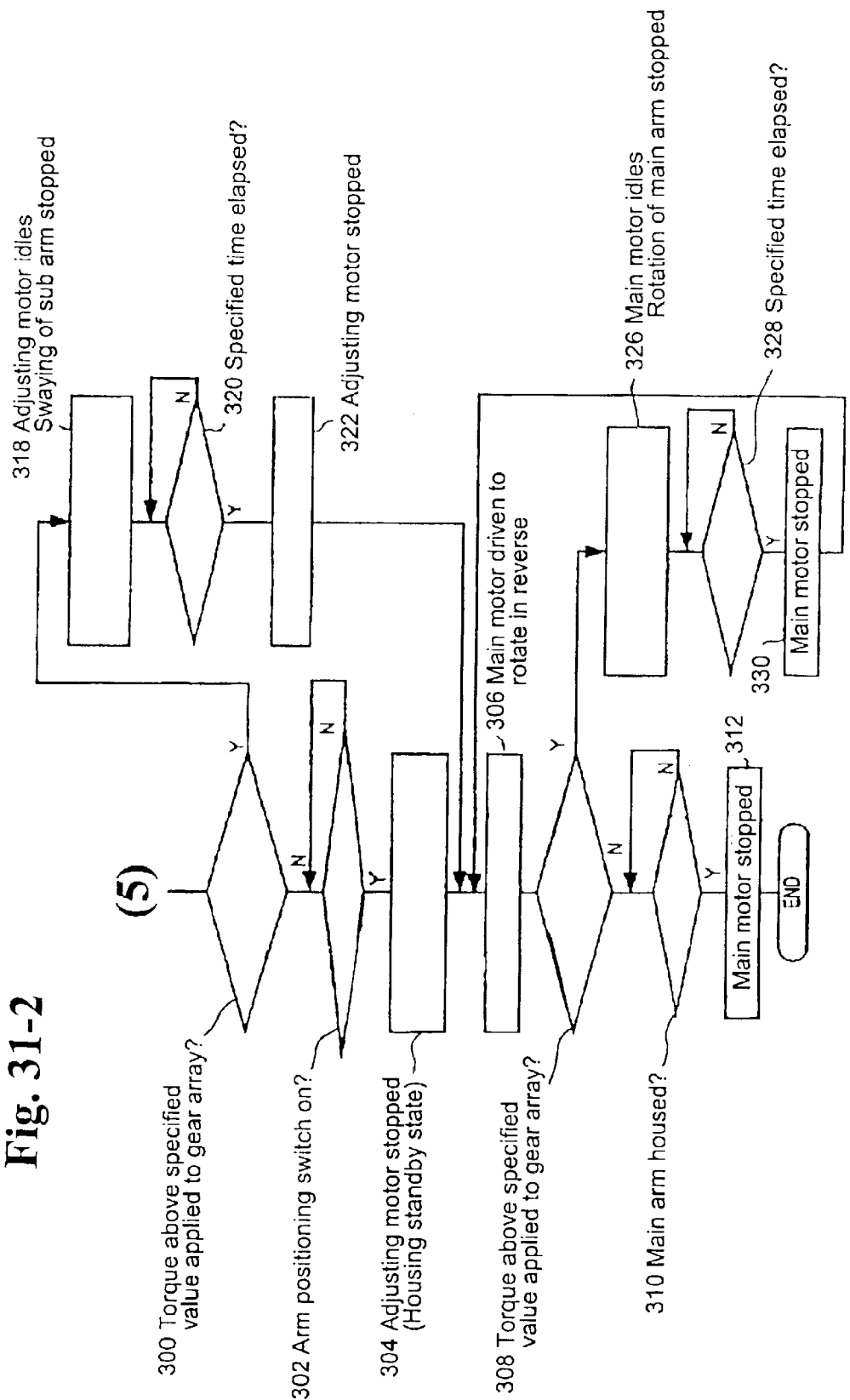
Figure 32:
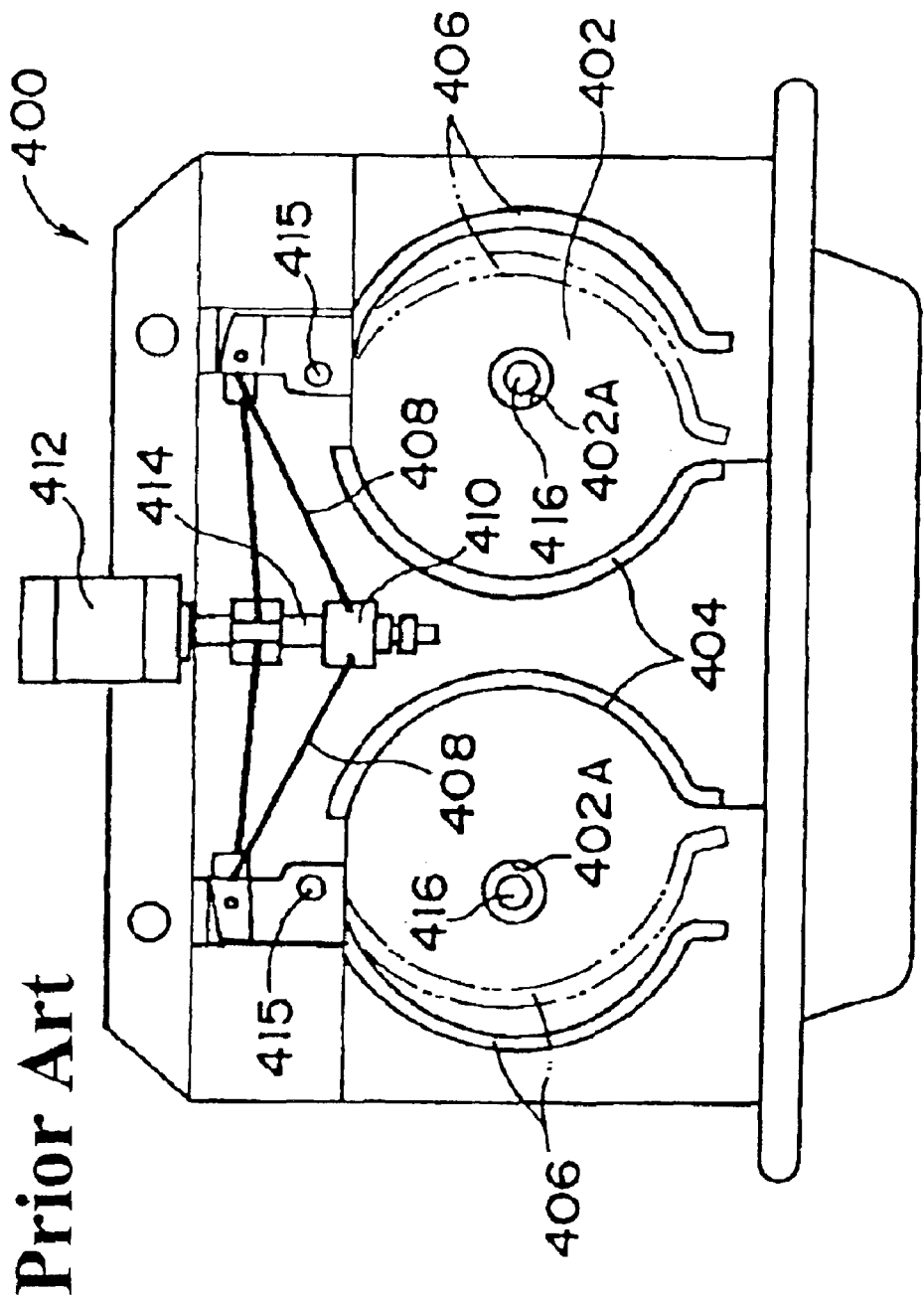
FIG. 32 is an explanatory drawing showing the conventional container holder.

Also, as shown in FIG. 26 and FIG. 27, an ultrasonic sensor 146 also may be used. It may be made such that ultrasonic waves are emitted by a wave transmitter 148 which is a constituent of this ultrasonic sensor 146, and the ultrasonic waves reflected by the container 16 are received by a wave receiver 150, and the fact that the container 16 is placed on the tray 18 can be sensed by the time required from when the ultrasonic waves are emitted from the wave transmitter 148 to when they are received by the wave receiver 150.

Furthermore, as the contactless sensing means, a transmission type ultrasonic sensor which senses by blocking of ultrasonic waves or attenuation of ultrasonic waves, a reflection type ultrasonic sensor which senses only reflecting bodies in a specified region, also, a proximity sensor such as a high-frequency oscillation type which uses electromagnetic inductance, a magnetic type which uses a magnetic, or an electrostatic capacitance type which uses change of electrostatic capacitance, or a laser sensor which uses a laser beam, or the like, also may be used.

Also, here, it was determined as to whether or not torque above the specified value was applied to the gear array 40 and the gear arrays 72, but in regard to the gear arrays 72, it is not necessary to determine whether or not torque above the specified value was applied.

Also, in the present invention, as shown in FIG. 2 and FIG. 12, the tray 18 for placing the container 16 was provided independently for each holder 86 provided on the left and right in the width direction of the vehicle, and the gap was provided between the upper surface 12A of the console box 12 and the contact part 106 of the tray 18 in the standby 2 state, such that when the container 16 is placed, the tray 18 sinks and the contact part 106 contacts the upper surface 12A of the console box 12, but it also may be made such that a contact part 106 of the tray 18 contacts the upper surface 12A of the console box 12 in the standby 2 state. Also, the tray 18 is not necessarily required, and it also may be made such that the container 16 is placed directly on the upper surface 12A of the console box 12.

Also, because it is fine as long as the adjusting plate 112 and the adjusting arm 24 for holding the container 16 together with the holder 86 are operated independently for each holder 86, it is not limited to the present embodiment. Therefore, the movements of the main arm 20, adjusting plate 112, and adjusting arm 24 also are not limited to rotational movements.

Also, the main arm 20 was automatically caused to rotate by the main motor 28 (see FIG. 3), but the main arm 20 also may be caused to appear and disappear in and out of the vehicle compartment by the manual operation. Furthermore, in the present embodiment, the sub arm 22 which sways together with the movement of the adjusting arm 24 was used, but cases in which there is no sub arm 22 according to the shape of the adjusting plate 112 also can be imagined.

Next, the operation of the container holder in which a drawer device pertaining to the invention is applied is explained following the flow charts shown in FIG. 28 to FIG. 31 and referring to FIG. 3.

As shown in FIG. 9, first, when the main switch 92 which is provided on the cosmetic plate 90 placed inside the vehicle compartment is pressed, in step 200, it is recognized by a control device not illustrated that the main switch 92 was turned on.

By this, in step 202, the main motor 28 is driven to rotate forward. Therefore, the planetary gear 50 shown in FIG. 4 revolves around the fixed gear 56 and the main base plate 26 rotates, and in addition, the planetary gear 78 revolves by the adjusting gear 82 via the main base plate 26 and the adjusting base plate 58 rotates, and as shown in FIG. 11, the main arm 20, trays 18, and adjusting arms 24 rotate and they appear inside the vehicle compartment.

Here, the open switch 108 is disposed on the upper surface of the main base plate 26, and when the main base plate 26 rotates for a specified amount, the open switch 108 contacts the ceiling surface 52B of the base box 52 such that it is pressed.

Therefore, in step 204, when a specified time has elapsed, in step 206, it is determined as to whether or not the open switch 108 was turned on, and when the open switch 108 was not turned on during the specified time, such as when there was an obstacle on the movement track of the main arm 20, in step 208, the main motor 28 is stopped, and the rotation of the container holder 10 is stopped via the main base plate 26. Also, in step 210, the main motor 28 is driven to rotate in reverse, and the container holder 10 is housed (see FIG. 9).

At this time, the close switch 96 which is disposed on the base box 52 is pressed by the assisting plate 94, and in step 212, when it is recognized that the close switch 96 was turned on, in step 214, the driving of the main motor 28 is stopped and the operation ends.

Incidentally, when the operation of the main motor 28 was performed normally, in the course that the main arm 20, trays 18, adjusting base plates 58, and adjusting arms 24 rotate via the main base plate 26, the contact pieces 102 which are formed on the base parts of the trays 18 contact the protruding pieces 104 of the base box 52.

By this, as shown in FIG. 12, the trays 18 rotate around the shafts 100 together with the rotation of the sub assisting plates 98, the trays 18 are placed beneath the main arm 20 in the state in which they are placed inside the vehicle compartment, and the containers 16 can be placed.

At this time, the open switch 108 is pressed by contacting the ceiling surface 52B of the base box 52, and in step 206, when it is recognized that it was turned on, in step 216, the driving of the main motor 28 is stopped.

By this, the rotations of the main arm 20, trays 18, adjusting base plates 58, and adjusting arms 24 are stopped via the main base plate 26. In this state, the container holder 10 is placed at the specified position inside the vehicle compartment. Also, at this time, the sub arms 22 are in the closed state (standby 1 state).

Next, in step 226, the adjusting motors 60 are driven to rotate forward. By this, as shown in FIG. 13, FIG. 17, and FIG. 18, the adjusting base plates 58 rotate, and the sub arms 22 are caused to sway toward the open directions by the cam walls 118 which are formed on the adjusting arms 24.

Also, in step 228, it is determined as to whether or not torque above the specified value was applied to the gear arrays 72 according to the change of electrical current by an electrical current detector not illustrated, and when torque above the specified value was applied to the gear arrays 72 via the adjusting arms 24, in step 230, it is determined as to whether or not the number of times in which torque above the specified value was applied to the gear arrays 72 in the course of step 226 to step 228 is one time (it is one time in the present embodiment, but the number of times can be freely set).

When the number of times in which torque above the specified value was applied to the gear arrays 72 in the course of step 226 to step 228 is one time, in step 232, the adjusting motors 60 idle, and the swaying of the sub arms 22 is stopped via the adjusting base plates 58 and the adjusting arms 24.

Also, in step 234, when it is determined that a specified time has elapsed, in step 236, the adjusting motors 60 are driven to rotate in reverse, and the sub arms 22 are caused to sway toward the closing direction.

Next, in step 238, when it is determined that the specified time has elapsed, in step 240, the adjusting motors 60 are stopped, the swaying of the sub arms 22 is stopped, and it returns to the standby 1 state (see FIG. 12). By this, the operations from step 226 are performed again.

On the other hand, when the number of times in which torque above the specified value was applied to the gear arrays 72 in the course of step 226 to step 228 is two times, in step 242, the driving of the adjusting motors 60 are stopped. By this, the swaying of the sub arms 22 is stopped via the adjusting base plates 58 and the adjusting arms 24, and in step 246, the adjusting motors 60 are driven to rotate in reverse, and the sub arms 22 sway toward the closing directions.

Also, in step 248, when it is determined that the specified time has elapsed, in step 250, the driving of the adjusting motors 60 is stopped, the swaying of the sub arms 22 is stopped, and it returns to the standby 1 state for a while (see FIG. 12).

Next, in step 252, the main motor 28 is driven to rotate in reverse, and the main arm 20, trays 18, adjusting base plates 58, and adjusting arms 24 rotate toward the housing direction via the main base plate 26. By this, as shown in FIG. 9, the container holder 10 is housed and the close switch 96 is pressed by the assisting plate 94, and in step 254, when it is recognized that the close switch 96 was turned on, in step 256, the driving of the main motor 28 is stopped and the operation ends.

Thus, when the opening and closing operations of the sub arms 22 are not performed normally, the cases in which the sub arms 22 are damaged also can be imagined. Thus, by automatically operating the container holder 10 to be housed, the container holder 10 in a state in which the sub arms 22 are damaged is prevented from being left inside the vehicle compartment.

Incidentally, when the adjusting motors are being driven to rotate forward and the operation was performed normally without applying torque above the specified value to the gear arrays 72, as shown in FIG. 13 and FIG. 18, the sub arms 22 become completely open via the adjusting base plates 58 and the adjusting arms 24, and the adjusting plates 120 which are attached to the adjusting base plates 58 contact the adjusting arm switches 122 which are fixed to the inner walls of the base box 52.

Also, in step 258, when it is recognized that these adjusting arm switches 122 were turned on, in step 260, the driving of the adjusting motors 60 is stopped and the swaying of the sub arms 22 is stopped in the completely opened state (below, this state is called "standby 2 state").

Next, as shown in FIG. 14, when the container 16 is placed on the tray 18, the tray 18 sinks by the weight of the container 16, and the tray switch 124 which is disposed on the main base plate 26 is pressed by the contact piece 102 which is placed on the side of the tray 18 which has sunk.

Also, when it is recognized by step 262 that the tray switch 124 was turned on, in step 264, the adjusting motor 60 is further driven to rotate forward (see FIG. 15). By this, the planetary gear 78 shown in FIG. 4 revolves around the adjusting gear 82, the rotation of which is stopped via the main base plate 26, the adjusting arm 24 rotates via the adjusting base plate 58 on which the planetary gear 78 is fixed, and the sub arm 22 sways toward the closing direction (see FIG. 19).

Also, in step 266, in the course of step 262 to step 266, when torque above the specified value was applied to the gear array 72 such as when the adjusting plate 112 which is attached to the front end of the adjusting arm 24 has come to contact with the container 16 which was placed on the tray 18, in step 268, the adjusting motor 60 idles, and the swaying of the sub arm 22 is stopped via the adjusting base plate 58 and the adjusting arm 24.

Next, in step 270, when it is determined that a specified time has elapsed, in step 272, the driving of the adjusting motor 60 is stopped, and in step 278, the adjusting motor 60 is slightly driven to rotate in reverse. By this, the sub arm 22 slightly sways toward the open direction, and in addition, the adjusting arm 24 slightly returns toward the housing direction. In step 280, when it is determined that the specified time has elapsed, in step 282, the driving of the adjusting motor 60 is stopped, the swaying of the sub arm 22 is stopped, and in addition, the rotation of the adjusting arm 24 is stopped (holding state).

Here, in step 278, by slightly driving the adjusting motor 60 to rotate in reverse and slightly returning the adjusting arm 24 toward the housing direction, when removing the container 16 which is held between the holder 86 and the adjusting plate 112, the container 16 can be removed easily.

Also, in the holding state, when the main switch 92 is accidentally pressed regardless of the fact that the container 16 is being held on the tray 18, the main motor 28 is controlled so as not to be driven. Therefore, the main arm does not rotate 20, and the placed container 16 does not turn over.

On the other hand, when the adjusting motor 60 is being driven to rotate forward and when the operation was performed normally without applying torque above the specified value to the gear array 72, in step 274, when it is determined that the specified time has elapsed, in step 276, the driving of the adjusting motor 60 is stopped, the swaying of the sub arm 22 is stopped, and in addition, the rotation of the adjusting arm 24 is stopped. Also, through steps 278 to 282, the container holder 10 comes to the holding state.

Here, the specified time in step 274 is set as the time until contacting with the container 16, imagining the container having the narrowest external dimensional measurement (not illustrated) among the containers 16 to be held by this container holder 10.

Also, in the case of a container that is thicker than this container (not illustrated), when the adjusting plate 112 contacts the container, in step 266, it becomes that torque above the specified value is applied to the gear array 72 via the adjusting plate 112. By this, the force to hold the container 16 by the holder 86 and the adjusting plate 112 becomes roughly equal.

Next, as shown in FIG. 16, when the container 16 which was placed on the tray 18 is removed, in step 284, it is recognized that the tray switch 124 was turned off, and in step 286, the adjusting motor 60 is driven to rotate in reverse. By this, as shown in FIG. 3 and FIG. 18, the sub arm 22 sways toward the open direction via the adjusting base plate 58 and the adjusting arm 24.

Also, in step 288, it is determined as to whether or not torque above the specified value was applied to the gear array 72 in the course of step 286 to step 288, and when the operation was performed normally without applying torque above the specified value to the gear array 72, the adjusting plate 120 which is attached to the adjusting base plate 58 is separated from the adjusting arm switch 122 which is fixed on the base box 52, and the adjusting arm switch 122 is turned off.

Next, in step 290, when it is recognized that the adjusting arm switch 122 was turned off, in step 292, the driving of the adjusting motor 60 is stopped, and the swaying of the sub arm 22 is stopped (re-standby 2 state).

In this re-standby 2 state (see FIG. 14 and FIG. 15), when the container 16 is placed back on the tray 18, the tray switch 124 is pressed by the contact piece 102, and when it is recognized by step 294 that the tray switch 124 was turned on, the flow moves to the operations from step 264.

On the other hand, in the re-standby 2 state, when the container 16 is not placed on the tray 18, because the tray switch 124 is turned off, in step 294, it is recognized that the tray switch 124 is not on. In this state, when the main switch 92 is pressed and it is recognized by step 296 that the main switch 92 was turned on, in step 298, the adjusting motors 60 are driven to rotate in reverse. By this, as shown in FIG. 12, the sub arms 22 sway toward the closing directions together with the rotation of the adjusting arms 24.

Here, in the standby 2 state, when the main arm 20 is pressed toward the housing direction for convenience, the main base plate 26 becomes capable of some swaying toward the housing direction via the main arm 20. By this, the open switch 108 which is disposed on the upper surface of the main base plate 26 may be separated from the ceiling surface 52B of the base box 52 and the open switch 108 may be turned off.

Therefore, in step 296, in addition to being recognized that the main switch 92 was turned on, when it is recognized that the open switch 108 was turned off, in step 298, the adjusting motors 60 are driven to rotate in reverse, and the sub arms 22 sway toward the closing directions together with the rotation of the adjusting arms 24.

Also, in step 300, it is determined as to whether or not torque above the specified value was applied to the gear arrays 72, and when the operation was performed normally without applying torque above the specified value to the gear arrays 72, as shown in FIG. 11, the arm positioning switches 126 which are provided on the adjusting base plates 58 are pressed by the stands 94A of the assisting plate 94. By this, when it is recognized by step 302 that the arm positioning switches 126 were turned on, in step 304, the adjusting motors 60 are stopped (housing standby state).

Also, in step 306, the main motor 28 is driven to rotate in reverse, and as shown in FIG. 10, the main arm 20, trays 18, adjusting base plates 58, and adjusting arms 24 rotate toward the housing direction via the main base plate 26.

At this time, in step 308, it is determined as to whether or not torque above the specified value was applied to the gear array 40, and when the operation was performed normally without applying torque above the specified value to the gear array 40, as shown in FIG. 9, the container holder 10 is housed, and the close switch 96 is pressed by the assisting plate 94.

Next, in step 310, when it is recognized that the close switch 96 was turned on, in step 312, the driving of the main motor 28 is turned off and the operation ends.

On the other hand, in step 288, as shown in FIG. 16, when torque above the specified value was applied to the gear array 72 after the container 16 which was placed on the tray 18 was removed, in step 314, the adjusting motor 60 idles, and the swaying of the sub arm 22 toward the open direction is stopped.

Also, in step 315, when it is determined that a specified time has elapsed, in step 317, the driving of the adjusting motor 60 is stopped, the flow is moved to the operations from step 298, and the adjusting motor is again driven to rotate in reverse to cause the sub arm 22 to sway toward the closing direction.

Incidentally, before it comes to the housing standby state, in step 300, when torque above the specified value was applied to the gear array 72, in step 318, the adjusting motor 60 idles, and the swaying of the sub arm 22 toward the closing direction is stopped.

Also, in step 320, when it is determined that the specified time has elapsed, in step 322, the driving of the adjusting motor 60 is stopped. In this state, it comes to the housing standby state, the flow is moved to the operations from step 306, and the container holder 10 is housed inside the housing part 14 (see FIG. 9).

Furthermore, before it comes to the housing state shown in FIG. 9, in step 308, when torque above the specified value was applied to the gear array 40, in step 326, the main motor 28 idles. By this, the rotation of the main arm 20, and the like, is stopped via the main base plate 26.

Also, in step 328, when it is determined that the specified time has elapsed, in step 330, the main motor 28 is stopped, it comes to the housing standby state shown in FIG. 11, the flow is moved to the operations from step 306, and the container holder 10 is housed inside the housing part 14 (see FIG. 9).

In the container holder 10 in which the drawer device pertaining to the embodiment is applied, by the fact that the open switch 108 is provided as the sensing means such that the open switch 108 is pressed when the main arm 20 rotates for a specified amount, such that it can be determined as to whether or not the main arm 20 has rotated for the specified amount, such that the container holder 10 is housed when the main arm 20 has not rotated within a specified time, the container holder 10 in a mid-course of movement is not left inside the vehicle compartment. By this, it is safe because there is no situation in which the container holder 10 is used in the mid-course of movement.

Also, in regard to the sub arms 22 as well, by the fact that in the standby 1 state, the container holder 10 is automatically housed when torque above the specified value is applied to the adjusting motors 60, there is no situation in which the container holder 10 is left inside the vehicle compartment regardless of the fact that the sub arms 22 is damaged.

Also, by the fact that torque limiters 36 and 68 are respectively provided in the gears 40 and 72 such that torque above the specified value is not applied to the main motor 28 and the adjusting motors 60, safety is assured such that the container holder 10 is not forcefully pushed out. Also, by the fact that torque above necessary value is not applied to the gears 40 and 72 in this manner, damage to the container holder 10 is prevented, and the life can be made longer.

Furthermore, here, it was made such that the time required for each operation is predefined, and it is determined that some problem has occurred by the fact that the switch indicating the end of each operation is not turned on within the specified time, so that the container holder 10 is housed. However, it is fine as long as the situation is avoided, in which the container holder 10 is left in the stopped state in a mid-course of operation when some problem has occurred in the container holder 10. Thus, it is not limited to this structure.

For example, an electrical current detector is connected also to the main motor 28, and the amount of electrical current passing to the main motor 28 is detected such that the change of torque applied to the main motor 28 is sensed. By this, it is no longer necessary to predefine the time.

Also, it was made such that, imagining the container having the narrowest external size (not illustrated) among the containers 16 to be held by the container holder 10, in the standby 2 state, when the adjusting motor 60 was driven to rotate forward in the state in which the container 16 is placed on the tray 18, in step 274, the time until contacting with this container is set and it is determined as to whether or not the specified time has elapsed. However, because it is made such that the fact that the container 16 has contacted with the adjusting plate 112 is determined from the start by the change of electrical current, the determination in step 274 is not necessarily required.

Furthermore, here, it was made such that the tray 18 for placing the container 16 is provided independently for each holder 86 provided on the left and right in the width direction of the vehicle, and the adjusting plate 112 and the adjusting arm 24 which cause the sub arm 22 to sway and hold the container 16 together with the holder 86 are caused to operate independently for each holder 86, but because it is fine as long as the container 16 is held in the independent state for each holder 86, it is not limited to the present embodiment.

Therefore, the movements of the main arm 22, adjusting plate 112, and adjusting arm 24 are not limited to the rotational movements. Also, in the present embodiment, the sub arm 22 which sways together with the movement of the adjust arm 24 was used, but it can be also imagined that no sub arm 22 is used according to the shape of the adjusting plate 112.

Also, in the present embodiment, the container holder was explained, but the present invention is not limited to this, and because it is fine as long as it is a drawer device that is capable of appearing and disappearing inside the vehicle compartment, it also may be an ash tray.

Because the present invention has the above construction, in the first aspect of the invention, the drawer member in the mid-course of movement is not left inside the vehicle compartment. Therefore, it is safe because there is no situation in which the drawer member is used in the mid-course of movement. In the second aspect of the invention, the drawer member in the mid-course of movement is not left inside the vehicle compartment, and also torque above necessary value is not applied to the driving means. In the third aspect of the invention, it is determined as to whether or not the operation of the drawer member is normal. In the fourth aspect of the invention, it is determined that torque above a specified value was applied to the driving means by sensing the change of electrical current.

In the fifth and sixth aspects of the invention, because the adjusting member moves independently respectively for each tray, the container can be securely held or smoothly placed. Also, furthermore, by the fact that the adjusting member is caused to move to hold the container together with the receiving part, it differs from the case where the container is held simply by the force of a spring, or the like. The container can be securely held by the holding force that is roughly equal regardless of the size of the container. Also, even if the sizes of the containers which are placed on the respective trays are different, the containers can be securely held by the receiving parts and adjusting members for the respective trays fitting the sizes of the containers.

In the seventh aspect of the invention, by operating the tray switch by the movement of the tray, it is judged as to whether or not a container was placed on the tray by the weight of the container, so that the placement or non-placement of the container can be surely sensed. In the eighth aspect of the invention, even when the container placed on the tray has a shape in which a constricted part is formed on the outer perimeter, for example a cola bottle, the container can be easily removed by causing the sub arm to sway toward the direction opposing the force to be opened.

In the ninth aspect of the invention, a slight gap is provided with the container which is held by the receiving part and the adjusting member, so that the container is made easier to remove. In the tenth aspect of the invention, it is safe because the main arm is not left in the stopped state in the mid-course of movement toward the specified position inside the vehicle compartment.

In the eleventh aspect of the invention, it is safe because the main arm is not forcefully pushed out toward the inside of the vehicle compartment regardless of torque above the specified value being applied to the first driving means, and torque above the necessary level is not applied to the first driving means. In the twelfth aspect of the invention, even if the main switch which drives the first driving means is accidentally pressed regardless of the fact that the container is held on the tray, the placed container does not turn over because the main arm does not rotate.

In the thirteenth aspect of the invention, when the first motor is driven, the first planetary gear revolves around the first fixed gear and the main arm rotates, and in addition, the second gear rotates via the main arm, the second planetary gear which engages this second gear is caused to revolve, and the adjusting member is caused to rotate. Also, when the second motor is driven in the state in which the driving of the first motor is stopped, the planetary gear revolves around the second gear which is stopped via the main arm which has stopped rotation, and the adjusting member rotates.

In the fourteenth aspect of the invention, by providing the contactless sensing means such that it can be sensed as to whether or not the container is placed between the receiving part and the holding member, even if the container moves up and down due to vibration during running of the vehicle, the sensing means is not influenced by this. That is, the container placed between the receiving part and the holding member can be assuredly sensed regardless of the vibration during running of the vehicle.

In the fifteenth aspect of the invention, by causing light projected from the light projecting body to be transmitted or reflected, it can be sensed as to whether the container is placed between the receiving part and the holding member by the change of luminous energy received by the light receiving body.

In the sixteenth aspect of the invention, by causing ultrasonic waves emitted from the wave transmitting body to be reflected and causing them to be received by the wave receiving body, it can be sensed as to whether or not the container is placed between the receiving part and the holding member by the time required from when the ultrasonic waves are emitted by the wave transmitter to when the ultrasonic waves are received by the wave receiver.

In the seventeenth aspect of the invention, it is convenient because the main arm does not have to be caused to appear and disappear in and out of the vehicle compartment by the manual operation. In the eighteenth aspect of the invention, it is safe because the main arm is not left in the stopped state in the mid-course of movement toward the specified position inside the vehicle compartment.

In the nineteenth aspect of the invention, when the sub arm is opened in the state in which the container is not placed between the receiving part and the holding member, and the container is placed, the sub arm sways so as to be closed accompanying the movement of the holding member.

In the twentieth aspect of the invention, even when the container placed between the receiving part and the holding member has a shape in which a constricted part is formed on the outer perimeter, for example a cola bottle, the container can be easily removed by causing the sub arm to sway toward the direction opposing the force and to be opened.

While the invention has been explained with reference to the specific embodiments of the invention, the explanation is illustrative and the invention is limited only by the appended claims.

What is claimed is:

1. A container holder comprising:
    a main arm having container receiving parts formed on two lateral ends thereof,
    first driving means connected to the main arm for moving the main arm in and out of a compartment,
    trays linked with the main arm and moving in and out of the compartment in association with the main arm, said trays being provided corresponding to and separately from each of said receiving parts,
    adjusting members provided corresponding to and separately from the receiving parts, respectively, each of said adjusting members holding a container placed on said tray together with the receiving part, and
    second driving means connected to the adjusting members for moving said adjusting members relative to the container placed on the tray along directions that the main arm is moved in and out of the compartment.

2. A container holder according to claim 1, further comprising sub arms supported to be able to sway on the main arm and swaying together with movements of the adjusting members.

3. A container holder according to claim 2, further comprising tray switches operably connected to the trays, each tray switch being operated by a movement of the tray when the container is placed on the tray, and control means connected to the second driving means for driving the second driving means to close each of the sub arms when one of the tray switches is turned on and to release each of the sub arms when the one of the tray switches is turned off.

4. A container holder according to claim 2, further comprising forcing means for urging each of the sub arms toward a closing direction, said sub arm swaying toward a direction opposite to a force of said forcing means when the sub arm is in a closing state.

5. A container holder according to claim 3, wherein said control means returns the adjusting member for a predetermined amount when said adjusting member is closed and meets the container.

6. A container holder according to claim 3, wherein said control means operates the main arm such that the main arm is housed when torque above a predetermined value is applied to the first driving means during a time until said main arm moves toward a predetermined position inside the compartment.

7. A container holder according to claim 3, wherein said control means operates such that the main arm stops when torque above a predetermined value is applied to the first driving means during a time until the main arm moves toward a predetermined position inside the compartment.

8. A container holder according to claim 3, wherein said main arm is immovable when said tray switch is in a turned-on state.

9. A container holder comprising:
    a main arm having container receiving parts formed on two lateral ends thereof,
    first driving means connected to the main arm for moving the main arm in and out of a compartment, said first driving means including a first fixed gear, a first planetary gear fixed to the main arm and revolving around the first fixed gear, and a first motor for providing a rotational force to the first planetary gear, trays linked with the main arm and moving in and out of the compartment together with the main arm, said trays being provided independently corresponding to each of said receiving parts, adjusting members provided independently corresponding to the receiving parts, respectively, each of said adjusting members holding a container placed on said tray together with the receiving part, and second driving means connected to the adjusting members for moving said adjusting members to move toward the container placed on the tray, said second driving means including a second fixed gear, a second planetary gear fixed to the adjusting member and revolving around the second gear fixed to the main arm, said second planetary gear being able to rotate integrally with the main arm, and a second motor for providing a rotational force to the second planetary gear.

10. A container holder, comprising:

a main arm having a container receiving part, a tray situated under the main arm separately from the receiving part for supporting a container, a holding member for laterally holding the container together with the receiving part, first driving means connected to the holding member for entirely moving the holding member toward the container, sensing means for contactlessly sensing the container placed between the receiving part and the holding member, and control means connected to the first driving means for driving the first driving means when it is sensed by the sensing means that the container is placed between the receiving part and the holding member.

11. A container holder according to claim 10, wherein said sensing means is a photoelectric sensor for projecting light toward the container.

12. A container holder according to claim 10, wherein said sensing means is an ultrasonic sensor for emitting ultrasonic waves toward the container.

13. A container holder according to claim 10, further comprising second driving means connected to the main arm to move the main arm in and out of a compartment.

14. A container holder according to claim 13, wherein said control means operates such that the main arm is housed when torque above a predetermined value is applied to the second driving means during a time until the main arm moves to a predetermined position inside the compartment.

15. A container holder according to claim 10, further comprising a sub arm supported on the main arm so as to be able to sway on the main arm together with a movement of the holding member.

16. A container holder according to claim 15, further comprising forcing means for urging the sub arm toward a closed direction, said sub arm being able to sway toward a direction opposite to a force of the forcing means when the sub arm is in a closed state.

17. A container holder according to claim 1, wherein said trays are arranged to move together with the main arm when the main arm is moved in and out of the compartment, and to move separately from the main arm when the main arm is properly located outside the compartment.

18. A container holder according to claim 13, wherein said tray is linked with the main arm and moves in and out of the compartment in association with the main arm, said tray being provided separately from the receiving part.

19. A container holder according to claim 1, wherein said first driving means is attached to the main arm such that the main arm rotates around a shaft thereof in moving in and out of the compartment.

20. A container holder according to claim 10, wherein said first driving means is attached to the main arm such that the main arm rotates around a shaft thereof in moving in and out of the compartment.

* * * * *